US012575692B2

(12) United States Patent
Bekiroglu et al.

(10) Patent No.: US 12,575,692 B2
(45) Date of Patent: Mar. 17, 2026

(54) SUGGESTING COFFEE BEAN GRIND SIZE FOR BEVERAGE MACHINES

(71) Applicant: SharkNinja Operating LLC, Needham, MA (US)

(72) Inventors: Korkut Bekiroglu, Newtonville, MA (US); Manan Patel, Boston, MA (US); Steven P. Carter, London (GB); Scott John Shaw, Waltham, MA (US); Eli Piscitelli, Walpole, MA (US); Ethan T. Brown, Cambridge, MA (US); James Parry, London (GB); Joshua Cole Dettmar, Essex (GB); Karol Rabalski, London (GB)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 18/651,926

(22) Filed: May 1, 2024

(65) Prior Publication Data

US 2025/0235034 A1 Jul. 24, 2025

Related U.S. Application Data

(60) Provisional application No. 63/627,571, filed on Jan. 31, 2024, provisional application No. 63/622,442, filed on Jan. 18, 2024.

(51) Int. Cl.
*A47J 31/42* (2006.01)
*A47J 31/00* (2006.01)

(52) U.S. Cl.
CPC ............. *A47J 31/42* (2013.01); *A47J 31/002* (2013.01)

(58) Field of Classification Search
CPC .......... A47J 31/42; A47J 31/002; A47J 42/18; A47J 42/08
USPC ......................................... 99/286
See application file for complete search history.

(56) References Cited

U.S. PATENT DOCUMENTS

| | | |
|---|---|---|
| D527,940 S | 9/2006 | Cohen |
| 7,219,597 B2 | 5/2007 | Eicher |
| D562,053 S | 2/2008 | Cohen |
| 7,337,704 B2 | 3/2008 | Hammad et al. |

(Continued)

FOREIGN PATENT DOCUMENTS

| | | |
|---|---|---|
| CA | 2747785 C | 5/2017 |
| CA | 2933186 C | 3/2022 |

(Continued)

OTHER PUBLICATIONS

U.S. Appl. No. 18/651,936 entitled "Milk Frothing" filed May 1, 2024, 167 pages.

(Continued)

*Primary Examiner* — Reginald Alexander
(74) *Attorney, Agent, or Firm* — Mintz, Levin, Cohn, Ferris, Glovsky and Popeo, P.C.

(57) ABSTRACT

Various illustrative systems, devices, and methods for beverage machines (e.g., drip coffee machines, espresso machines, etc.) are provided. In an exemplary implementation, an espresso machine is configured to brew and dispense espresso. In an exemplary implementation, the espresso machine is configured to determine a recommended coffee bean grind size for a beverage, e.g., an espresso or a sprover-style drink, selected by a user and to provide the recommended coffee bean grind size to the user.

20 Claims, 42 Drawing Sheets

(56) References Cited

U.S. PATENT DOCUMENTS

| | | | |
|---|---|---|---|
| 7,487,711 | B2 | 2/2009 | Carbonini |
| 7,540,232 | B2 | 6/2009 | Bates et al. |
| 7,600,467 | B2 | 10/2009 | Coccia et al. |
| 7,669,517 | B2 | 3/2010 | Boussemart et al. |
| 7,685,931 | B2 | 3/2010 | Rivera |
| 7,694,906 | B2 | 4/2010 | Fornage |
| 7,743,695 | B2 | 6/2010 | Oehninger |
| 7,766,056 | B2 | 8/2010 | Rapparini |
| 7,775,152 | B2 | 8/2010 | Kirschner et al. |
| 7,819,284 | B2 | 10/2010 | Hale |
| D629,269 | S | 12/2010 | Okamoto |
| D630,467 | S | 1/2011 | Harrod |
| D630,882 | S | 1/2011 | Cohen |
| 7,942,093 | B2 | 5/2011 | Morin et al. |
| 7,992,486 | B2 | 8/2011 | Constantine et al. |
| 8,011,290 | B2 | 9/2011 | Brouwer |
| 8,032,251 | B2 | 10/2011 | Monn |
| D653,905 | S | 2/2012 | Bodum |
| 8,151,694 | B2 | 4/2012 | Jacobs et al. |
| 8,156,858 | B2 | 4/2012 | Carbonini |
| D660,645 | S | 5/2012 | Zandona |
| 8,221,813 | B2 | 7/2012 | Boul |
| 8,235,317 | B2 | 8/2012 | Wilson et al. |
| 8,241,553 | B2 | 8/2012 | Stasin |
| 8,247,010 | B2 | 8/2012 | Nguyen et al. |
| 8,250,971 | B2 | 8/2012 | Righetti |
| 8,291,812 | B2 | 10/2012 | Rivera |
| 8,309,030 | B2 | 11/2012 | Rinker et al. |
| 8,327,753 | B2 | 12/2012 | White et al. |
| 8,337,635 | B2 | 12/2012 | Boussemart |
| 8,344,896 | B2 | 1/2013 | Ozanne |
| 8,375,845 | B2 | 2/2013 | Huiberts |
| D678,718 | S | 3/2013 | Grassia |
| 8,393,975 | B2 | 3/2013 | Widanagamage |
| 8,397,625 | B2 | 3/2013 | Garcia et al. |
| 8,408,117 | B2 | 4/2013 | De Longhi |
| 8,414,944 | B2 | 4/2013 | Staubli et al. |
| D682,027 | S | 5/2013 | Grassia |
| D685,600 | S | 7/2013 | White |
| 8,479,638 | B2 | 7/2013 | Leung et al. |
| 8,505,441 | B2 | 8/2013 | Bambi |
| 8,511,220 | B2 | 8/2013 | Garcia et al. |
| 8,523,094 | B2 | 9/2013 | De Longhi |
| 8,534,579 | B2 | 9/2013 | Carapelli |
| D694,579 | S | 12/2013 | Khubani |
| 8,601,937 | B2 | 12/2013 | Campetella et al. |
| 8,635,946 | B2 | 1/2014 | White et al. |
| 8,646,377 | B2 | 2/2014 | Stieger et al. |
| 8,667,891 | B2 | 3/2014 | Garcia et al. |
| 8,668,376 | B2 | 3/2014 | Krauchi et al. |
| 8,678,239 | B2 | 3/2014 | Abdelmoteleb et al. |
| 8,720,320 | B1 | 5/2014 | Rivera |
| 8,733,234 | B2 | 5/2014 | Boussemart et al. |
| 8,752,477 | B2 | 6/2014 | Douma |
| D708,921 | S | 7/2014 | Hoare et al. |
| 8,763,942 | B2 | 7/2014 | Hergesell et al. |
| 8,784,570 | B2 | 7/2014 | Morin et al. |
| 8,800,430 | B2 | 8/2014 | Bishop et al. |
| 8,800,432 | B2 | 8/2014 | Erba et al. |
| 8,800,899 | B2 | 8/2014 | Ford |
| D712,209 | S | 9/2014 | Hager et al. |
| 8,820,217 | B2 | 9/2014 | Doglioni Majer |
| 8,826,804 | B2 | 9/2014 | Remo et al. |
| 8,833,237 | B2 | 9/2014 | Gussmann et al. |
| 8,844,430 | B2 | 9/2014 | Mastropasqua et al. |
| 8,850,956 | B2 | 10/2014 | Bianchi et al. |
| 8,875,618 | B2 | 11/2014 | Boussemart et al. |
| 8,906,440 | B2 | 12/2014 | Otto |
| 8,914,943 | B2 | 12/2014 | Grassia |
| 8,960,077 | B2 | 2/2015 | Doglioni Major |
| 8,960,080 | B2 | 2/2015 | Saito |
| 8,962,053 | B2 | 2/2015 | Carbonini |
| D724,906 | S | 3/2015 | Kent |
| 8,967,038 | B2 | 3/2015 | Rivera |
| 8,973,435 | B2 | 3/2015 | Preston et al. |
| 8,973,487 | B2 | 3/2015 | Startz |
| 8,973,489 | B2 | 3/2015 | Baudet et al. |
| 8,991,652 | B2 | 3/2015 | Harrod |
| 9,016,196 | B2 | 4/2015 | Hensel |
| 9,032,866 | B2 | 5/2015 | White et al. |
| 9,038,529 | B2 | 5/2015 | Riessbeck et al. |
| 9,039,843 | B2 | 5/2015 | Sierro et al. |
| 9,044,119 | B2 | 6/2015 | White et al. |
| 9,060,646 | B2 | 6/2015 | Ait Bouziad et al. |
| 9,066,621 | B2 | 6/2015 | Casado Gomez et al. |
| 9,066,629 | B1 | 6/2015 | Melvin |
| D734,985 | S | 7/2015 | Furia |
| 9,072,406 | B2 | 7/2015 | Larzul et al. |
| 9,101,243 | B2 | 8/2015 | Lee et al. |
| 9,101,246 | B2 | 8/2015 | Pozzari et al. |
| 9,107,533 | B2 | 8/2015 | Volz et al. |
| 9,113,747 | B2 | 8/2015 | Rivera |
| 9,113,749 | B2 | 8/2015 | Pilone et al. |
| 9,125,519 | B2 | 9/2015 | Goeltenboth et al. |
| 9,125,522 | B2 | 9/2015 | Remo |
| 9,149,148 | B2 | 10/2015 | Jaccard et al. |
| 9,149,152 | B2 | 10/2015 | Cahen et al. |
| 9,161,658 | B2 | 10/2015 | Clark et al. |
| D742,169 | S | 11/2015 | Grassia |
| 9,179,797 | B2 | 11/2015 | Rivera |
| 9,198,535 | B2 | 12/2015 | Righetti |
| 9,211,032 | B2 | 12/2015 | Larson et al. |
| 9,232,871 | B2 | 1/2016 | Rivera |
| 9,241,499 | B2 | 1/2016 | Fischer |
| 9,242,790 | B2 | 1/2016 | Rivera |
| 9,265,379 | B2 | 2/2016 | Tonelli et al. |
| 9,289,041 | B2 | 3/2016 | Brown |
| 9,289,092 | B2 | 3/2016 | Gagné |
| 9,296,502 | B1 | 3/2016 | Hollander |
| 9,301,637 | B2 | 4/2016 | Hoare et al. |
| 9,326,637 | B2 | 5/2016 | Tonelli et al. |
| 9,332,875 | B2 | 5/2016 | White et al. |
| 9,332,876 | B2 | 5/2016 | Starr et al. |
| 9,339,141 | B2 | 5/2016 | Van Os et al. |
| 9,347,684 | B2 | 5/2016 | Wielstra |
| 9,364,021 | B2 | 6/2016 | Taitler |
| 9,364,115 | B2 | 6/2016 | Remo et al. |
| 9,364,116 | B2 | 6/2016 | Waldron et al. |
| 9,370,271 | B2 | 6/2016 | Tembaak et al. |
| 9,375,114 | B2 | 6/2016 | Meng |
| 9,386,876 | B2 | 7/2016 | Denisart et al. |
| 9,402,499 | B2 | 8/2016 | Bambi et al. |
| 9,402,502 | B2 | 8/2016 | Vanni et al. |
| 9,417,766 | B2 | 8/2016 | Delbreil et al. |
| 9,427,106 | B2 | 8/2016 | Carbonini et al. |
| 9,427,110 | B2 | 8/2016 | Hoare et al. |
| D767,331 | S | 9/2016 | Burrows |
| 9,456,714 | B2 | 10/2016 | White |
| 9,456,716 | B2 | 10/2016 | Fragniere |
| 9,463,972 | B2 | 10/2016 | Hitzelberger et al. |
| 9,474,408 | B2 | 10/2016 | Dollner et al. |
| 9,474,409 | B2 | 10/2016 | Wallerstorfer et al. |
| 9,486,108 | B1 | 11/2016 | Douglas et al. |
| 9,499,385 | B1 | 11/2016 | Studor |
| 9,521,921 | B2 | 12/2016 | Joseph |
| 9,532,677 | B2 | 1/2017 | Kelly et al. |
| 9,532,678 | B2 | 1/2017 | Steiner |
| 9,532,682 | B1 | 1/2017 | Lassota et al. |
| 9,542,151 | B2 | 1/2017 | Hoog et al. |
| 9,545,168 | B2 | 1/2017 | Gabara |
| 9,545,174 | B2 | 1/2017 | Hsiao |
| 9,560,933 | B2 | 2/2017 | Leforgeais et al. |
| 9,565,966 | B2 | 2/2017 | Fedele |
| 9,572,452 | B2 | 2/2017 | Rivera |
| 9,578,986 | B2 | 2/2017 | Ceotto et al. |
| 9,578,989 | B2 | 2/2017 | Lægdsgaard |
| 9,591,862 | B2 | 3/2017 | Kuempel et al. |
| 9,596,957 | B2 | 3/2017 | Tonelli et al. |
| 9,603,480 | B2 | 3/2017 | Van Os et al. |
| 9,603,481 | B2 | 3/2017 | Giua et al. |
| 9,609,978 | B2 | 4/2017 | Castelli et al. |
| 9,629,498 | B2 | 4/2017 | Merelli |
| 9,630,157 | B2 | 4/2017 | Li et al. |
| 9,655,470 | B2 | 5/2017 | Ruhl |

(56) References Cited

U.S. PATENT DOCUMENTS

| | | | |
|---|---|---|---|
| 9,661,950 B2 | 5/2017 | Agon |
| 9,664,264 B2 | 5/2017 | Kristlbauer |
| 9,668,452 B2 | 6/2017 | Buchholz et al. |
| 9,675,206 B2 | 6/2017 | Minard |
| 9,675,211 B2 | 6/2017 | Lehotay et al. |
| 9,687,106 B2 | 6/2017 | Boubeddi et al. |
| D790,915 S | 7/2017 | Yeh |
| 9,693,652 B2 | 7/2017 | Yoakim et al. |
| 9,706,877 B2 | 7/2017 | Tanja et al. |
| D795,288 S | 8/2017 | McColl |
| 9,723,945 B2 | 8/2017 | Mulder et al. |
| 9,744,739 B2 | 8/2017 | Grassia et al. |
| 9,756,974 B2 | 9/2017 | Rivera |
| 9,788,686 B2 | 10/2017 | Schlee |
| 9,795,243 B2 | 10/2017 | Rivera |
| 9,795,245 B2 | 10/2017 | Mulvaney et al. |
| 9,807,975 B2 | 11/2017 | Buchholz et al. |
| 9,814,346 B2 | 11/2017 | De'Longhi et al. |
| 9,820,605 B2 | 11/2017 | Coccia |
| 9,840,424 B2 | 12/2017 | Mitchell et al. |
| 9,844,290 B2 | 12/2017 | Llopis |
| 9,844,291 B2 | 12/2017 | Eicher et al. |
| 9,844,292 B2 | 12/2017 | Rivera |
| 9,844,296 B2 | 12/2017 | Stein et al. |
| 9,848,736 B2 | 12/2017 | Buffinga et al. |
| 9,854,933 B2 | 1/2018 | Radhakrishnan et al. |
| 9,854,944 B2 | 1/2018 | Ohta et al. |
| 9,867,495 B2 | 1/2018 | Choi |
| D811,148 S | 2/2018 | Harrod |
| 9,907,425 B2 | 3/2018 | Rivera |
| 9,924,828 B2 | 3/2018 | Grassia |
| 9,930,988 B2 | 4/2018 | Chalk et al. |
| 9,940,004 B2 | 4/2018 | Mayworm |
| D817,060 S | 5/2018 | McColl |
| 9,968,218 B2 | 5/2018 | Burrows |
| 9,986,600 B2 | 5/2018 | Wielstra |
| 9,986,868 B2 | 6/2018 | Vitel et al. |
| 9,986,870 B2 | 6/2018 | Reyhanloo |
| 9,993,106 B2 | 6/2018 | Majer |
| 9,999,317 B2 | 6/2018 | Douglas et al. |
| 10,004,355 B2 | 6/2018 | Rimpl |
| 10,005,658 B2 | 6/2018 | Lee |
| D823,039 S | 7/2018 | Grassia |
| 10,016,088 B2 | 7/2018 | Gross et al. |
| 10,016,093 B2 | 7/2018 | Mazzer |
| 10,028,611 B2 | 7/2018 | Gort-barten |
| 10,034,574 B2 | 7/2018 | Barnett et al. |
| 10,042,525 B2 | 8/2018 | De'Longhi et al. |
| 10,080,457 B2 | 9/2018 | Llopis |
| 10,085,588 B2 | 10/2018 | Remo et al. |
| 10,098,496 B2 | 10/2018 | Vettorel |
| 10,104,992 B2 | 10/2018 | Macdonald et al. |
| 10,105,002 B2 | 10/2018 | Grassia et al. |
| 10,111,553 B2 | 10/2018 | Rivera |
| 10,130,206 B2 | 11/2018 | Rijskamp et al. |
| 10,130,215 B2 | 11/2018 | Ioannone et al. |
| 10,143,328 B2 | 12/2018 | Vestreli et al. |
| 10,143,331 B1 | 12/2018 | Heys et al. |
| 10,143,333 B2 | 12/2018 | Pozzari et al. |
| 10,182,678 B2 | 1/2019 | Landau |
| 10,188,238 B2 | 1/2019 | Dammermann et al. |
| 10,201,248 B2 | 2/2019 | Bakke et al. |
| 10,226,150 B2 | 3/2019 | Poggioli et al. |
| 10,226,151 B2 | 3/2019 | Corti |
| 10,231,573 B2 | 3/2019 | Cahen et al. |
| 10,238,231 B2 | 3/2019 | Coccia |
| 10,240,969 B2 | 3/2019 | Rego |
| D844,379 S | 4/2019 | Simonazzi |
| D845,704 S | 4/2019 | Xu |
| 10,244,890 B2 | 4/2019 | Riessbeck et al. |
| 10,251,509 B2 | 4/2019 | Rivera et al. |
| 10,258,186 B2 | 4/2019 | Rivera |
| 10,271,677 B2 | 4/2019 | Barnett |
| 10,271,679 B2 | 4/2019 | Purton |
| 10,271,680 B2 | 4/2019 | Studor et al. |
| 10,278,238 B2 | 4/2019 | Meng et al. |
| 10,285,535 B2 | 5/2019 | Florin et al. |
| 10,317,274 B2 | 6/2019 | Beber et al. |
| D853,773 S | 7/2019 | Harrod |
| 10,342,386 B2 | 7/2019 | Day, Jr. |
| 10,349,772 B1 | 7/2019 | Fedele |
| 10,357,128 B2 | 7/2019 | Clark et al. |
| 10,362,639 B2 | 7/2019 | Davenport et al. |
| 10,368,689 B2 | 8/2019 | Rithener et al. |
| 10,368,694 B2 | 8/2019 | Hulett et al. |
| 10,376,090 B2 | 8/2019 | Radhakrishnan |
| 10,376,091 B2 | 8/2019 | Psarologos et al. |
| 10,383,474 B2 | 8/2019 | Upston et al. |
| 10,390,653 B2 | 8/2019 | Lüssi et al. |
| 10,398,251 B2 | 9/2019 | Wessels et al. |
| 10,408,533 B2 | 9/2019 | Kim et al. |
| 10,413,114 B2 | 9/2019 | De Graaff et al. |
| 10,413,128 B2 | 9/2019 | Oddera |
| 10,426,296 B2 | 10/2019 | Ryan et al. |
| 10,455,973 B2 | 10/2019 | Dollner et al. |
| 10,464,085 B2 | 11/2019 | Perrin et al. |
| 10,470,431 B2 | 11/2019 | Adriaens |
| 10,485,370 B2 | 11/2019 | Ferraro et al. |
| 10,485,374 B2 | 11/2019 | Lo Faro et al. |
| 10,485,375 B2 | 11/2019 | Wessels |
| 10,499,763 B2 | 12/2019 | Van Os et al. |
| 10,512,356 B2 | 12/2019 | Hua et al. |
| 10,517,422 B2 | 12/2019 | Tan et al. |
| 10,517,434 B2 | 12/2019 | Lammers et al. |
| 10,524,608 B2 | 1/2020 | Nichols |
| 10,524,612 B2 | 1/2020 | Chawla et al. |
| 10,531,761 B2 | 1/2020 | Apone et al. |
| 10,537,203 B2 | 1/2020 | Van Boxtel et al. |
| 10,537,205 B2 | 1/2020 | Locher |
| 10,537,206 B2 | 1/2020 | Bezzera |
| 10,542,839 B2 | 1/2020 | Leung et al. |
| 10,548,430 B2 | 2/2020 | Guard et al. |
| 10,555,642 B2 | 2/2020 | Conti |
| 10,561,268 B2 | 2/2020 | Morin et al. |
| 10,568,455 B2 | 2/2020 | Buchholz et al. |
| 10,572,114 B2 | 2/2020 | Mackinlay et al. |
| 10,575,675 B2 | 3/2020 | Fin et al. |
| 10,577,235 B2 | 3/2020 | Hecht et al. |
| 10,595,667 B2 | 3/2020 | Southern |
| 10,595,671 B2 | 3/2020 | Ottavi |
| 10,602,870 B2 | 3/2020 | Van Hattem |
| 10,610,046 B2 | 4/2020 | De'Longhi et al. |
| 10,610,048 B2 | 4/2020 | Gaillard et al. |
| 10,610,049 B2 | 4/2020 | Doglioni Majer |
| 10,617,255 B2 | 4/2020 | Pugliese |
| 10,638,870 B2 | 5/2020 | Studor et al. |
| 10,638,873 B2 | 5/2020 | Steiner |
| 10,638,875 B2 | 5/2020 | Senger |
| D887,704 S | 6/2020 | Penaflor |
| D888,488 S | 6/2020 | McColl |
| 10,682,007 B2 | 6/2020 | Fischer |
| 10,687,657 B2 | 6/2020 | Pugliese |
| 10,687,660 B2 | 6/2020 | Gatti et al. |
| 10,687,661 B2 | 6/2020 | Raimondi et al. |
| 10,702,835 B2 | 7/2020 | Tran et al. |
| 10,703,561 B2 | 7/2020 | Amin |
| 10,709,284 B2 | 7/2020 | Foglia |
| 10,709,285 B2 | 7/2020 | De'Longhi et al. |
| 10,709,294 B2 | 7/2020 | Abbiati |
| 10,713,877 B2 | 7/2020 | Illy et al. |
| 10,716,428 B2 | 7/2020 | De Graaff et al. |
| 10,722,066 B2 | 7/2020 | Rivera |
| 10,729,284 B2 | 8/2020 | Piras et al. |
| 10,743,705 B2 | 8/2020 | Glucksman et al. |
| 10,750,898 B2 | 8/2020 | Fin |
| D894,658 S | 9/2020 | Davenport |
| 10,758,076 B2 | 9/2020 | De'Longhi et al. |
| 10,783,737 B2 | 9/2020 | Ceccaroli |
| D898,051 S | 10/2020 | Baez |
| 10,791,869 B2 | 10/2020 | Al-Shaibani et al. |
| 10,799,059 B2 | 10/2020 | Abbiati |
| 10,799,063 B2 | 10/2020 | Buettiker et al. |
| 10,806,294 B2 | 10/2020 | Wessels et al. |
| 10,806,295 B2 | 10/2020 | Santini et al. |

(56) References Cited

U.S. PATENT DOCUMENTS

| | | | |
|---|---|---|---|
| 10,807,855 B2 | 10/2020 | Choi et al. |
| 10,813,487 B2 | 10/2020 | Ceriani et al. |
| 10,820,743 B2 | 11/2020 | Schnyder |
| 10,820,749 B2 | 11/2020 | Savioz |
| 10,822,219 B2 | 11/2020 | Katz et al. |
| 10,856,688 B2 | 12/2020 | Abbiati |
| 10,863,858 B2 | 12/2020 | Roth et al. |
| 10,865,039 B2 | 12/2020 | Rivera |
| 10,869,571 B2 | 12/2020 | Doglioni Majer et al. |
| 10,869,573 B2 | 12/2020 | Jagne |
| 10,874,248 B2 | 12/2020 | Picozza et al. |
| 10,881,240 B2 | 1/2021 | Grassia |
| 10,881,242 B2 | 1/2021 | Dionisio et al. |
| 10,888,869 B2 | 1/2021 | Abbiati |
| 10,893,774 B2 | 1/2021 | Purton |
| 10,897,919 B2 | 1/2021 | Steiner |
| 10,898,024 B2 | 1/2021 | Dees |
| 10,906,070 B2 | 2/2021 | Patton et al. |
| 10,912,407 B2 | 2/2021 | Rivera et al. |
| 10,912,416 B2 | 2/2021 | Carapelli |
| 10,912,417 B2 | 2/2021 | Biernatek |
| 10,918,239 B2 | 2/2021 | Hartmann et al. |
| 10,918,245 B2 | 2/2021 | Mazzer |
| 10,925,432 B2 | 2/2021 | Noordhuis |
| 10,973,366 B2 | 4/2021 | Lui et al. |
| 10,973,371 B2 | 4/2021 | Illy et al. |
| 10,986,955 B2 | 4/2021 | De'Longhi et al. |
| 10,987,643 B1 | 4/2021 | Wallace |
| 10,991,184 B2 | 4/2021 | Jee et al. |
| D919,285 S | 5/2021 | Penaflor |
| 11,000,149 B2 | 5/2021 | Vorfeld et al. |
| 11,006,777 B1 | 5/2021 | Weber |
| 11,006,779 B2 | 5/2021 | Juve |
| 11,013,364 B2 | 5/2021 | Rivera |
| 11,014,841 B2 | 5/2021 | Bruggink et al. |
| 11,026,537 B2 | 6/2021 | Wallis |
| 11,026,538 B2 | 6/2021 | Stasch et al. |
| 11,026,540 B2 | 6/2021 | Mathure et al. |
| 11,033,143 B2 | 6/2021 | Herbert et al. |
| 11,033,152 B2 | 6/2021 | Parrini |
| 11,039,712 B2 | 6/2021 | Egli et al. |
| 11,045,038 B2 | 6/2021 | De'Longhi et al. |
| 11,049,354 B2 | 6/2021 | Yoakim |
| 11,058,258 B2 | 7/2021 | Alessi et al. |
| 11,076,715 B1 | 8/2021 | Mohammad et al. |
| 11,083,323 B2 | 8/2021 | De Graaff et al. |
| 11,083,328 B2 | 8/2021 | Cummer et al. |
| 11,084,070 B2 | 8/2021 | Moll |
| 11,089,900 B2 | 8/2021 | Knip et al. |
| 11,089,901 B2 | 8/2021 | Apone et al. |
| 11,089,908 B2 | 8/2021 | Van Hoek et al. |
| 11,096,483 B2 | 8/2021 | Rehage et al. |
| 11,096,517 B2 | 8/2021 | Spijker et al. |
| 11,096,518 B2 | 8/2021 | Roberts et al. |
| 11,122,927 B2 | 9/2021 | Bianchi et al. |
| 11,122,928 B2 | 9/2021 | Rotta et al. |
| 11,122,929 B2 | 9/2021 | Colonna et al. |
| 11,129,491 B2 | 9/2021 | Park et al. |
| 11,134,806 B2 | 10/2021 | De'Longhi et al. |
| 11,147,409 B2 | 10/2021 | Cappellini |
| 11,147,411 B2 | 10/2021 | Magatti et al. |
| 11,147,414 B2 | 10/2021 | Foglia |
| 11,160,411 B2 | 11/2021 | Kettavong et al. |
| 11,160,419 B2 | 11/2021 | Rose et al. |
| 11,166,585 B2 | 11/2021 | Ceotto et al. |
| 11,166,586 B2 | 11/2021 | Zwick |
| 11,166,591 B2 | 11/2021 | Oddera |
| 11,172,782 B2 | 11/2021 | Oddera |
| 11,179,008 B2 | 11/2021 | Wiener et al. |
| 11,189,124 B2 | 11/2021 | Houtsaeger |
| 11,191,386 B2 | 12/2021 | Kim |
| 11,195,364 B2 | 12/2021 | Hartmann et al. |
| 11,197,487 B2 | 12/2021 | De'Longhi et al. |
| 11,197,576 B2 | 12/2021 | De'Longhi |
| 11,197,578 B2 | 12/2021 | Weber |
| 11,202,530 B2 | 12/2021 | Devlin et al. |
| 11,208,315 B2 | 12/2021 | Crawford et al. |
| D941,624 S | 1/2022 | Abu-Saymeh et al. |
| 11,213,161 B2 | 1/2022 | Wessels et al. |
| 11,219,330 B2 | 1/2022 | Muheim et al. |
| 11,219,331 B2 | 1/2022 | Majer |
| 11,229,313 B2 | 1/2022 | De'Longhi et al. |
| 11,229,323 B2 | 1/2022 | Jana et al. |
| 11,229,324 B2 | 1/2022 | Abo |
| 11,237,038 B2 | 2/2022 | Muheim et al. |
| 11,253,099 B2 | 2/2022 | Hartmann et al. |
| 11,275,577 B2 | 3/2022 | Sankaran et al. |
| 11,297,973 B2 | 4/2022 | De Groen et al. |
| 11,304,554 B2 | 4/2022 | Elias |
| 11,304,564 B2 | 4/2022 | Nicholson |
| 11,337,543 B2 | 5/2022 | Rivera |
| 11,337,547 B1 | 5/2022 | Posner et al. |
| 11,337,928 B2 | 5/2022 | Bacchi |
| D954,498 S | 6/2022 | Nicastro |
| 11,358,104 B2 | 6/2022 | Nagasawa et al. |
| 11,358,531 B2 | 6/2022 | Heinz et al. |
| 11,369,226 B2 | 6/2022 | Rivera |
| 11,370,580 B2 | 6/2022 | Sharpe |
| D957,183 S | 7/2022 | Pearce et al. |
| 11,378,463 B2 | 7/2022 | McColl |
| 11,382,461 B2 | 7/2022 | Chen et al. |
| 11,395,558 B2 | 7/2022 | Smith et al. |
| 11,399,652 B2 | 8/2022 | Zuidervaart et al. |
| 11,399,654 B2 | 8/2022 | De'Longhi et al. |
| 11,406,217 B2 | 8/2022 | Fain |
| 11,412,881 B2 | 8/2022 | Giordano et al. |
| 11,412,891 B2 | 8/2022 | Dunkelberg |
| 11,419,449 B2 | 8/2022 | Savioz |
| 11,420,782 B2 | 8/2022 | Lui |
| 11,432,676 B2 | 9/2022 | Huang |
| 11,439,271 B2 | 9/2022 | Epping |
| 11,457,772 B2 | 10/2022 | Zernhelt et al. |
| 11,464,354 B2 | 10/2022 | Di Maria |
| 11,464,357 B2 | 10/2022 | Rivera |
| 11,464,366 B2 | 10/2022 | Quinn |
| 11,470,995 B2 | 10/2022 | Foglia |
| D968,888 S | 11/2022 | Weber |
| D969,548 S | 11/2022 | Bodum |
| 11,484,147 B2 | 11/2022 | Koller et al. |
| 11,484,148 B2 | 11/2022 | Te Velde |
| 11,490,766 B2 | 11/2022 | Mazzer |
| 11,497,344 B2 | 11/2022 | Hendrickson et al. |
| 11,497,345 B2 | 11/2022 | Schnelle et al. |
| 11,497,353 B2 | 11/2022 | Chirciu |
| 11,503,946 B2 | 11/2022 | De'Longhi et al. |
| 11,503,947 B2 | 11/2022 | Della Pietra et al. |
| 11,503,955 B2 | 11/2022 | Ebstein et al. |
| 11,510,520 B2 | 11/2022 | Rossetto et al. |
| 11,517,137 B2 | 12/2022 | Yoon et al. |
| 11,517,150 B2 | 12/2022 | Magatti |
| 11,529,020 B2 | 12/2022 | Perentes et al. |
| 11,534,017 B2 | 12/2022 | Demiglio et al. |
| 11,534,019 B2 | 12/2022 | Eller et al. |
| 11,534,022 B2 | 12/2022 | Illy et al. |
| 11,535,504 B2 | 12/2022 | Venkatakrishnan et al. |
| 11,540,664 B2 | 1/2023 | Accursi et al. |
| 11,547,244 B2 | 1/2023 | Deuber et al. |
| 11,553,812 B2 | 1/2023 | Abu-Saymeh et al. |
| 11,559,165 B2 | 1/2023 | Heuberger |
| 11,576,518 B2 | 2/2023 | Nijsen et al. |
| 11,576,522 B2 | 2/2023 | Steiner |
| 11,576,523 B2 | 2/2023 | Grassia et al. |
| 11,583,132 B2 | 2/2023 | De'Longhi et al. |
| 11,583,143 B2 | 2/2023 | Lissandron |
| 11,589,701 B1 | 2/2023 | Abu-Saymeh et al. |
| 11,596,259 B2 | 3/2023 | Giorgella |
| 11,608,258 B2 | 3/2023 | Jenkins |
| 11,617,471 B2 | 4/2023 | Weber |
| 11,622,647 B2 | 4/2023 | Dunkelberg |
| 11,627,831 B2 | 4/2023 | Gulliver et al. |
| 11,633,062 B2 | 4/2023 | Bissen et al. |
| D986,676 S | 5/2023 | Zhang |
| 11,638,498 B2 | 5/2023 | Rossetto et al. |
| 11,641,974 B2 | 5/2023 | Teo et al. |

(56) References Cited

U.S. PATENT DOCUMENTS

| | | |
|---|---|---|
| 11,653,787 B2 | 5/2023 | Arndt et al. |
| 11,666,175 B2 | 6/2023 | Steiner |
| 11,672,373 B2 | 6/2023 | Sahoo et al. |
| 11,672,375 B2 | 6/2023 | Zuidervaart et al. |
| 11,678,762 B2 | 6/2023 | Chen et al. |
| 11,684,201 B2 | 6/2023 | Seidl |
| 11,684,205 B2 | 6/2023 | Franke |
| 11,690,472 B2 | 7/2023 | Dubief |
| 11,700,969 B2 | 7/2023 | Byun et al. |
| 11,717,107 B2 | 8/2023 | Vetterli et al. |
| 11,723,490 B2 | 8/2023 | Buettiker et al. |
| 11,730,309 B2 | 8/2023 | López Ruiz et al. |
| 11,730,311 B2 | 8/2023 | Tibbe et al. |
| 11,740,135 B2 | 8/2023 | Grassia et al. |
| 11,744,398 B2 | 9/2023 | Apostolopoulos |
| 11,751,717 B2 | 9/2023 | Grassia et al. |
| 11,759,044 B2 | 9/2023 | Al-Shaibani et al. |
| 11,779,146 B2 | 10/2023 | Dall'aglio et al. |
| 11,779,152 B2 | 10/2023 | Dessing et al. |
| 11,805,934 B1 | 11/2023 | Rivera |
| 11,812,892 B1 | 11/2023 | Barnard |
| 11,849,880 B2 | 12/2023 | Ren et al. |
| D1,009,558 S | 1/2024 | Guo |
| D1,012,610 S | 1/2024 | Bardazzi |
| 11,857,102 B2 | 1/2024 | Psarologos et al. |
| 11,857,103 B2 | 1/2024 | De'Longhi et al. |
| 11,864,685 B2 | 1/2024 | Harada et al. |
| 11,864,689 B2 | 1/2024 | Pachi et al. |
| 11,918,022 B2 | 3/2024 | Wettlaufer et al. |
| 11,925,297 B1 * | 3/2024 | Brockman ............. G06V 20/68 |
| D1,023,662 S | 4/2024 | Shi |
| 12,053,117 B1 * | 8/2024 | House ................. A47J 31/5251 |
| 2011/0283889 A1 | 11/2011 | Con et al. |
| 2012/0135119 A1 | 5/2012 | Gussmann et al. |
| 2012/0196009 A1 | 8/2012 | Casado et al. |
| 2013/0001339 A1 * | 1/2013 | Hoare ..................... A47J 42/44 |
| | | 241/101.3 |
| 2013/0043304 A1 | 2/2013 | Agon et al. |
| 2014/0069279 A1 | 3/2014 | Upston et al. |
| 2015/0056343 A1 | 2/2015 | Mori et al. |
| 2016/0150909 A1 | 6/2016 | Rivera |
| 2016/0157659 A1 | 6/2016 | Rivera |
| 2016/0157660 A1 | 6/2016 | Rivera |
| 2016/0206133 A1 | 7/2016 | Rivera |
| 2016/0374513 A1 | 12/2016 | Rego |
| 2017/0079466 A1 | 3/2017 | Chalk et al. |
| 2018/0303283 A1 | 10/2018 | Kollep et al. |
| 2019/0290050 A1 | 9/2019 | Maltoni et al. |
| 2019/0350404 A1 | 11/2019 | Pugliese et al. |
| 2019/0357720 A1 | 11/2019 | Abbiati |
| 2020/0085227 A1 | 3/2020 | Ozanne |
| 2020/0093321 A1 | 3/2020 | Schnelle et al. |
| 2020/0121113 A1 | 4/2020 | Harrod et al. |
| 2020/0138233 A1 | 5/2020 | Shalev et al. |
| 2020/0154938 A1 | 5/2020 | Teo et al. |
| 2020/0214491 A1 | 7/2020 | Malkin et al. |
| 2020/0229575 A1 | 7/2020 | Penaflor |
| 2020/0260903 A1 | 8/2020 | Widmer et al. |
| 2020/0288902 A1 | 9/2020 | De' Longhi et al. |
| 2020/0288905 A1 | 9/2020 | Ripperda et al. |
| 2020/0288906 A1 | 9/2020 | Nabeiro et al. |
| 2020/0305459 A1 | 10/2020 | Bush et al. |
| 2020/0323383 A1 | 10/2020 | De' Longhi et al. |
| 2020/0329899 A1 | 10/2020 | Zwart et al. |
| 2020/0329902 A1 | 10/2020 | Roumen et al. |
| 2020/0352389 A1 | 11/2020 | De Vries et al. |
| 2020/0359834 A1 | 11/2020 | Marchesan et al. |
| 2020/0375388 A1 | 12/2020 | Macfarlane et al. |
| 2020/0383513 A1 | 12/2020 | Leach et al. |
| 2020/0390273 A1 | 12/2020 | Volontéet al. |
| 2020/0397184 A1 | 12/2020 | Ruggiero et al. |
| 2021/0015146 A1 | 1/2021 | Chaben et al. |
| 2021/0015296 A1 | 1/2021 | Arreola |
| 2021/0030194 A1 | 2/2021 | Tessicini et al. |
| 2021/0030195 A1 | 2/2021 | Schirrmacher |
| 2021/0059467 A1 | 3/2021 | Wolbeck |
| 2021/0093120 A1 | 4/2021 | Palmer et al. |
| 2021/0106168 A1 | 4/2021 | Cingolani et al. |
| 2021/0137302 A1 | 5/2021 | Rivera |
| 2021/0169261 A1 | 6/2021 | Ceotto et al. |
| 2021/0196076 A1 | 7/2021 | Rizzuto et al. |
| 2021/0204748 A1 | 7/2021 | Della Pietra et al. |
| 2021/0204755 A1 | 7/2021 | Granot |
| 2021/0204756 A1 | 7/2021 | Tang |
| 2021/0219782 A1 | 7/2021 | Jebb et al. |
| 2021/0228019 A1 | 7/2021 | Arndt et al. |
| 2021/0235934 A1 | 8/2021 | Hensel et al. |
| 2021/0244231 A1 | 8/2021 | Lee |
| 2021/0267409 A1 | 9/2021 | Parolini et al. |
| 2021/0267411 A1 | 9/2021 | Hellmers et al. |
| 2021/0267415 A1 | 9/2021 | Guyatt et al. |
| 2021/0307556 A1 | 10/2021 | Lee et al. |
| 2021/0307557 A1 | 10/2021 | Lee et al. |
| 2021/0307558 A1 | 10/2021 | Lee et al. |
| 2021/0315415 A1 | 10/2021 | Bianchi et al. |
| 2021/0321814 A1 | 10/2021 | Doglioni Majer |
| 2021/0321817 A1 | 10/2021 | Diester et al. |
| 2021/0345815 A1 | 11/2021 | Bombeck |
| 2021/0345817 A1 | 11/2021 | Rivera |
| 2021/0353102 A1 | 11/2021 | Zhang et al. |
| 2021/0378440 A1 | 12/2021 | Zehnder |
| 2021/0386245 A1 | 12/2021 | Dayton |
| 2021/0393074 A1 | 12/2021 | Weber et al. |
| 2021/0395070 A1 | 12/2021 | Sankaran et al. |
| 2021/0401221 A1 | 12/2021 | De Nicolo |
| 2022/0007877 A1 | 1/2022 | Rivera |
| 2022/0008849 A1 | 1/2022 | Arcangeli |
| 2022/0009661 A1 | 1/2022 | Rivera |
| 2022/0022683 A1 | 1/2022 | Ceotto et al. |
| 2022/0034016 A1 | 2/2022 | Schlack |
| 2022/0039589 A1 | 2/2022 | Raimondi et al. |
| 2022/0039602 A1 | 2/2022 | Xiong |
| 2022/0047112 A1 | 2/2022 | Buford et al. |
| 2022/0047120 A1 | 2/2022 | Dionisio |
| 2022/0061583 A1 | 3/2022 | Sachtleben |
| 2022/0071438 A1 | 3/2022 | Harbers et al. |
| 2022/0071439 A1 | 3/2022 | Bentley et al. |
| 2022/0095839 A1 | 3/2022 | Dionisio et al. |
| 2022/0097883 A1 | 3/2022 | Schmuck |
| 2022/0104651 A1 | 4/2022 | Morgan et al. |
| 2022/0104660 A1 | 4/2022 | Almagor |
| 2022/0117442 A1 | 4/2022 | Dionisio |
| 2022/0125236 A1 | 4/2022 | Merati et al. |
| 2022/0133078 A1 | 5/2022 | Canet Peiro et al. |
| 2022/0133091 A1 | 5/2022 | De Groen et al. |
| 2022/0142392 A1 | 5/2022 | Rivera |
| 2022/0160165 A1 | 5/2022 | Andreis et al. |
| 2022/0175177 A1 | 6/2022 | Evangelisti et al. |
| 2022/0175181 A1 | 6/2022 | Mazzon et al. |
| 2022/0183498 A1 | 6/2022 | Mazzon et al. |
| 2022/0192412 A1 | 6/2022 | Locher et al. |
| 2022/0192417 A1 | 6/2022 | White et al. |
| 2022/0202232 A1 | 6/2022 | Hernou et al. |
| 2022/0225814 A1 | 7/2022 | Hensel et al. |
| 2022/0225816 A1 | 7/2022 | Standaar et al. |
| 2022/0233016 A1 | 7/2022 | Zhou et al. |
| 2022/0240711 A1 | 8/2022 | Hellmers et al. |
| 2022/0248895 A1 | 8/2022 | Bresciani |
| 2022/0248897 A1 | 8/2022 | Nadalet et al. |
| 2022/0257044 A1 * | 8/2022 | Venkatakrishnan ........................ A47J 31/4403 |
| 2022/0257045 A1 | 8/2022 | Hensel et al. |
| 2022/0257046 A1 | 8/2022 | Panciera et al. |
| 2022/0265091 A1 | 8/2022 | Perrin et al. |
| 2022/0273131 A1 | 9/2022 | Sinnema et al. |
| 2022/0279957 A1 | 9/2022 | Nadalet et al. |
| 2022/0279960 A1 | 9/2022 | Vu |
| 2022/0279979 A1 | 9/2022 | Locher et al. |
| 2022/0287496 A1 | 9/2022 | Steiner |
| 2022/0296031 A1 | 9/2022 | Steiner |
| 2022/0304499 A1 | 9/2022 | Hansen et al. |
| 2022/0313004 A1 | 10/2022 | Conroy et al. |
| 2022/0313007 A1 | 10/2022 | Rosetta et al. |
| 2022/0313008 A1 | 10/2022 | Hadden et al. |

(56) References Cited

U.S. PATENT DOCUMENTS

| | | | |
|---|---|---|---|
| 2022/0322869 A1 | 10/2022 | Lin et al. | |
| 2022/0330739 A1 | 10/2022 | Hsieh | |
| 2022/0330744 A1 | 10/2022 | Hadden et al. | |
| 2022/0330745 A1 | 10/2022 | Holmes et al. | |
| 2022/0346591 A1 | 11/2022 | Knowles et al. | |
| 2022/0354299 A1 | 11/2022 | Rossi et al. | |
| 2022/0361707 A1 | 11/2022 | Hansen | |
| 2022/0369849 A1 | 11/2022 | Rivera | |
| 2022/0369853 A1 | 11/2022 | Gentili | |
| 2022/0369855 A1 | 11/2022 | Rivera | |
| 2022/0378244 A1 | 12/2022 | Nista et al. | |
| 2022/0386803 A1 | 12/2022 | Duchardt et al. | |
| 2022/0386816 A1 | 12/2022 | Loopstra | |
| 2022/0400888 A1 | 12/2022 | Parrini et al. | |
| 2022/0400890 A1 | 12/2022 | Duplessis et al. | |
| 2023/0000280 A1 | 1/2023 | Grassia et al. | |
| 2023/0017236 A1* | 1/2023 | Oilmaghani | A47J 42/50 |
| 2023/0017935 A1 | 1/2023 | Kuempel et al. | |
| 2023/0031863 A1 | 2/2023 | Tibbe et al. | |
| 2023/0034233 A1 | 2/2023 | Loopstra et al. | |
| 2023/0035186 A1 | 2/2023 | Evangelisti et al. | |
| 2023/0036962 A1 | 2/2023 | Beekman et al. | |
| 2023/0044801 A1 | 2/2023 | Tibbe et al. | |
| 2023/0066349 A1 | 3/2023 | Wong | |
| 2023/0071202 A1 | 3/2023 | Parrini et al. | |
| 2023/0087585 A1 | 3/2023 | Tessicini et al. | |
| 2023/0100531 A1 | 3/2023 | Psarologos et al. | |
| 2023/0111068 A1 | 4/2023 | Altoè et al. | |
| 2023/0121117 A1 | 4/2023 | Thomas et al. | |
| 2023/0125039 A1 | 4/2023 | Hallmann et al. | |
| 2023/0140751 A1* | 5/2023 | de Warrimont | A47J 31/42 426/231 |
| 2023/0148796 A1 | 5/2023 | Hallmann et al. | |
| 2023/0157483 A1 | 5/2023 | Gennai | |
| 2023/0165398 A1 | 6/2023 | Kurnianto | |
| 2023/0172391 A1 | 6/2023 | Hanes et al. | |
| 2023/0210299 A1 | 7/2023 | Freire Falcão Teles Caramelo et al. | |
| 2023/0210300 A1 | 7/2023 | Wahhas et al. | |
| 2023/0218109 A1 | 7/2023 | Tessicini et al. | |
| 2023/0248174 A1 | 8/2023 | Guo et al. | |
| 2023/0263332 A1 | 8/2023 | Dupasquier et al. | |
| 2023/0270130 A1 | 8/2023 | Chen et al. | |
| 2023/0270280 A1 | 8/2023 | Tsuchida et al. | |
| 2023/0309735 A1 | 10/2023 | Park et al. | |
| 2023/0309737 A1 | 10/2023 | Tollefsbol et al. | |
| 2023/0320521 A1 | 10/2023 | Myers | |
| 2023/0389743 A1 | 12/2023 | Lee et al. | |
| 2023/0414030 A1* | 12/2023 | Widanagamage Don | A47J 31/521 |
| 2024/0041249 A1 | 2/2024 | Wei | |
| 2024/0044577 A1 | 2/2024 | Fonte et al. | |
| 2024/0048744 A1 | 2/2024 | Kong et al. | |
| 2024/0081583 A1 | 3/2024 | Rossetto et al. | |
| 2024/0188750 A1* | 6/2024 | Fowler | A47J 42/50 |

FOREIGN PATENT DOCUMENTS

| | | | |
|---|---|---|---|
| CN | 100463636 C | 2/2009 | |
| CN | 101171184 B | 5/2010 | |
| CN | 101904700 B | 5/2012 | |
| CN | 102599822 B | 3/2014 | |
| CN | 102512078 B | 7/2014 | |
| CN | 102670097 B | 9/2014 | |
| CN | 102612334 B | 10/2014 | |
| CN | 103271655 B | 2/2015 | |
| CN | 103070614 B | 5/2015 | |
| CN | 103505080 B | 10/2015 | |
| CN | 103505048 B | 12/2015 | |
| CN | 103249336 B | 4/2016 | |
| CN | 103300735 B | 4/2016 | |
| CN | 103874441 B | 4/2016 | |
| CN | 105595851 A | 5/2016 | |
| CN | 103654416 B | 8/2016 | |
| CN | 103860024 B | 8/2016 | |
| CN | 106720022 A | 5/2017 | |
| CN | 103988025 B | 6/2017 | |
| CN | 107049025 A | 8/2017 | |
| CN | 107149417 A | 9/2017 | |
| CN | 103619222 B | 10/2017 | |
| CN | 103792973 B | 10/2017 | |
| CN | 104172931 B | 11/2017 | |
| CN | 105326409 B | 3/2018 | |
| CN | 107836999 A | 3/2018 | |
| CN | 105249819 B | 5/2018 | |
| CN | 108175277 A | 6/2018 | |
| CN | 108478008 A | 9/2018 | |
| CN | 108478011 A | 9/2018 | |
| CN | 108478043 A | 9/2018 | |
| CN | 108567334 A | 9/2018 | |
| CN | 108652448 A | 10/2018 | |
| CN | 106235889 B | 11/2018 | |
| CN | 108888117 A | 11/2018 | |
| CN | 109124356 A | 1/2019 | |
| CN | 109381026 A | 2/2019 | |
| CN | 105996780 B | 3/2019 | |
| CN | 109528006 A | 3/2019 | |
| CN | 109549477 A | 4/2019 | |
| CN | 109579964 A | 4/2019 | |
| CN | 110338663 A | 10/2019 | |
| CN | 106073506 B | 1/2020 | |
| CN | 110693352 A | 1/2020 | |
| CN | 107427141 B | 4/2020 | |
| CN | 110974008 A | 4/2020 | |
| CN | 111493665 A | 8/2020 | |
| CN | 108720611 B | 10/2020 | |
| CN | 111759172 A | 10/2020 | |
| CN | 111759176 A | 10/2020 | |
| CN | 111938435 A | 11/2020 | |
| CN | 306246766 S | 12/2020 | |
| CN | 112237386 A | 1/2021 | |
| CN | 107105931 B | 2/2021 | |
| CN | 109875376 B | 2/2021 | |
| CN | 112315322 A | 2/2021 | |
| CN | 112336199 A | 2/2021 | |
| CN | 112471929 A | 3/2021 | |
| CN | 108784428 B | 4/2021 | |
| CN | 110192771 B | 5/2021 | |
| CN | 109497836 B | 8/2021 | |
| CN | 113384143 A | 9/2021 | |
| CN | 113520158 A | 10/2021 | |
| CN | 113842064 A | 12/2021 | |
| CN | 113854834 A | 12/2021 | |
| CN | 113995307 A | 2/2022 | |
| CN | 111184441 B | 3/2022 | |
| CN | 114158918 A | 3/2022 | |
| CN | 108143280 B | 4/2022 | |
| CN | 112890729 B | 5/2022 | |
| CN | 113455902 B | 5/2022 | |
| CN | 114431709 A | 5/2022 | |
| CN | 114557601 A | 5/2022 | |
| CN | 110432775 B | 6/2022 | |
| CN | 114585282 A | 6/2022 | |
| CN | 112244647 B | 7/2022 | |
| CN | 112368522 B | 7/2022 | |
| CN | 114747937 A | 7/2022 | |
| CN | 114766908 A | 7/2022 | |
| CN | 114794874 A | 7/2022 | |
| CN | 106388602 B | 8/2022 | |
| CN | 114847776 A | 8/2022 | |
| CN | 114903354 A | 8/2022 | |
| CN | 115153298 A | 10/2022 | |
| CN | 115153304 A | 10/2022 | |
| CN | 111699158 B | 11/2022 | |
| CN | 115363422 A | 11/2022 | |
| CN | 115381283 A | 11/2022 | |
| CN | 115486711 A | 12/2022 | |
| CN | 115624282 A | 1/2023 | |
| CN | 115670236 A | 2/2023 | |
| CN | 115768317 A | 3/2023 | |
| CN | 115886598 A | 4/2023 | |
| CN | 115989952 A | 4/2023 | |
| CN | 106308519 B | 5/2023 | |

(56) References Cited

FOREIGN PATENT DOCUMENTS

| | | | |
|---|---|---|---|
| CN | 116115070 | A | 5/2023 |
| CN | 116115072 | A | 5/2023 |
| CN | 116236061 | A | 6/2023 |
| CN | 116602546 | A | 8/2023 |
| CN | 116648173 | A | 8/2023 |
| CN | 116829034 | A | 9/2023 |
| CN | 117462005 | A | 1/2024 |
| DE | 102011081010 | B4 | 10/2014 |
| DE | 102010012788 | B4 | 5/2018 |
| DE | 102015216939 | B4 | 7/2018 |
| DE | 202018002650 | U1 | 7/2018 |
| DE | 202018002651 | U1 | 7/2018 |
| DE | 202018002971 | U1 | 7/2018 |
| DE | 202019101770 | U1 | 4/2019 |
| DE | 202019102749 | U1 | 5/2019 |
| DE | 202020102934 | U1 | 6/2020 |
| DE | 202020103163 | U1 | 7/2020 |
| DE | 102018218506 | B4 | 9/2020 |
| DE | 102019112813 | B4 | 7/2021 |
| DE | 202021002948 | U1 | 10/2021 |
| DE | 102020125325 | A1 | 3/2022 |
| DE | 102017210995 | B4 | 11/2022 |
| DE | 102018214677 | B4 | 2/2023 |
| DE | 102022101783 | A1 | 7/2023 |
| EP | 1197175 | A1 | 4/2002 |
| EP | 1776905 | B1 | 12/2007 |
| EP | 1774879 | B1 | 9/2008 |
| EP | 1749463 | B1 | 12/2008 |
| EP | 1986530 | B1 | 10/2009 |
| EP | 2087820 | B1 | 8/2010 |
| EP | 2198762 | B1 | 8/2011 |
| EP | 2303079 | B1 | 11/2011 |
| EP | 2408259 | A1 | 1/2012 |
| EP | 2293710 | B1 | 7/2012 |
| EP | 2189085 | B1 | 9/2012 |
| EP | 2370342 | B1 | 3/2013 |
| EP | 2263502 | B1 | 4/2013 |
| EP | 2033550 | B1 | 5/2013 |
| EP | 2474253 | B1 | 5/2013 |
| EP | 2254449 | B1 | 6/2013 |
| EP | 2474255 | B1 | 5/2014 |
| EP | 2647318 | B1 | 5/2014 |
| EP | 2429356 | B1 | 7/2014 |
| EP | 2532288 | B1 | 8/2014 |
| EP | 2595518 | B1 | 11/2014 |
| EP | 2460448 | B1 | 1/2015 |
| EP | 2524636 | B1 | 1/2015 |
| EP | 2695553 | B1 | 1/2015 |
| EP | 2392239 | B1 | 3/2015 |
| EP | 2698086 | B1 | 5/2015 |
| EP | 2878240 | A1 | 6/2015 |
| EP | 2589322 | B1 | 7/2015 |
| EP | 2785223 | B1 | 9/2015 |
| EP | 2915469 | A1 | 9/2015 |
| EP | 2694216 | B1 | 2/2016 |
| EP | 2654524 | B1 | 4/2016 |
| EP | 2277418 | B1 | 5/2016 |
| EP | 2897509 | B8 | 5/2016 |
| EP | 2823737 | B1 | 6/2016 |
| EP | 2759238 | B1 | 11/2016 |
| EP | 2764803 | B1 | 11/2016 |
| EP | 2067423 | B1 | 1/2017 |
| EP | 2848168 | B1 | 1/2017 |
| EP | 2898803 | B1 | 4/2017 |
| EP | 2881016 | B1 | 6/2017 |
| EP | 2962606 | B1 | 6/2017 |
| EP | 3206542 | A1 | 8/2017 |
| EP | 3064104 | B1 | 9/2017 |
| EP | 2571404 | B2 | 10/2017 |
| EP | 2584906 | B1 | 10/2017 |
| EP | 3016555 | B1 | 11/2017 |
| EP | 2595517 | B1 | 1/2018 |
| EP | 2004026 | B1 | 2/2018 |
| EP | 3108776 | B1 | 4/2018 |
| EP | 2941157 | B1 | 5/2018 |
| EP | 3078310 | B1 | 6/2018 |
| EP | 2671480 | B1 | 8/2018 |
| EP | 2792284 | B1 | 8/2018 |
| EP | 3042592 | B1 | 1/2019 |
| EP | 3216375 | B1 | 1/2019 |
| EP | 3261500 | B1 | 1/2019 |
| EP | 3305141 | B1 | 2/2019 |
| EP | 3135161 | B1 | 4/2019 |
| EP | 3078309 | B1 | 5/2019 |
| EP | 3248521 | B1 | 5/2019 |
| EP | 2875759 | B1 | 6/2019 |
| EP | 3248517 | B1 | 6/2019 |
| EP | 3305145 | B1 | 6/2019 |
| EP | 3297503 | B1 | 7/2019 |
| EP | 3536201 | A1 | 9/2019 |
| EP | 3139800 | B1 | 10/2019 |
| EP | 3192412 | B1 | 10/2019 |
| EP | 3108777 | B1 | 11/2019 |
| EP | 3158899 | B1 | 11/2019 |
| EP | 3415053 | B1 | 11/2019 |
| EP | 3228230 | B1 | 12/2019 |
| EP | 3424375 | B1 | 12/2019 |
| EP | 3372123 | B1 | 1/2020 |
| EP | 3158902 | B1 | 2/2020 |
| EP | 3162257 | B1 | 3/2020 |
| EP | 2767198 | B1 | 4/2020 |
| EP | 3628194 | A1 | 4/2020 |
| EP | 3430950 | B1 | 6/2020 |
| EP | 3446600 | B1 | 8/2020 |
| EP | 3501350 | B1 | 8/2020 |
| EP | 3694381 | A1 | 8/2020 |
| EP | 3597084 | B1 | 9/2020 |
| EP | 3708039 | A1 | 9/2020 |
| EP | 3323326 | B1 | 11/2020 |
| EP | 3424379 | B1 | 11/2020 |
| EP | 3427617 | B1 | 11/2020 |
| EP | 3533364 | B1 | 11/2020 |
| EP | 3669723 | B1 | 1/2021 |
| EP | 3785585 | A1 | 3/2021 |
| EP | 3791763 | A1 | 3/2021 |
| EP | 3653086 | B1 | 4/2021 |
| EP | 3510901 | B1 | 5/2021 |
| EP | 3827717 | A1 | 6/2021 |
| EP | 3844728 | A1 | 7/2021 |
| EP | 3695758 | B1 | 9/2021 |
| EP | 3878322 | A1 | 9/2021 |
| EP | 3881729 | A1 | 9/2021 |
| EP | 3884818 | A1 | 9/2021 |
| EP | 3763258 | B1 | 10/2021 |
| EP | 3542682 | B1 | 11/2021 |
| EP | 3705004 | B1 | 12/2021 |
| EP | 3711644 | B1 | 12/2021 |
| EP | 3797654 | B1 | 12/2021 |
| EP | 3738485 | B1 | 1/2022 |
| EP | 3954256 | A1 | 2/2022 |
| EP | 3967192 | A1 | 3/2022 |
| EP | 3970575 | A1 | 3/2022 |
| EP | 3793933 | A4 | 4/2022 |
| EP | 3838081 | B1 | 6/2022 |
| EP | 4044886 | A1 | 8/2022 |
| EP | 3429438 | B1 | 9/2022 |
| EP | 3741271 | B1 | 9/2022 |
| EP | 4052616 | A1 | 9/2022 |
| EP | 3870007 | B1 | 10/2022 |
| EP | 4070698 | A1 | 10/2022 |
| EP | 4070699 | A1 | 10/2022 |
| EP | 3718446 | B1 | 11/2022 |
| EP | 3932268 | B1 | 11/2022 |
| EP | 4081087 | A1 | 11/2022 |
| EP | 4082408 | A1 | 11/2022 |
| EP | 2918197 | B1 | 12/2022 |
| EP | 4108144 | A1 | 12/2022 |
| EP | 3275345 | B2 | 2/2023 |
| EP | 4044884 | B1 | 3/2023 |
| EP | 4147613 | A1 | 3/2023 |
| EP | 2801304 | B2 | 4/2023 |
| EP | 3970577 | B1 | 4/2023 |
| EP | 3772301 | B1 | 5/2023 |
| EP | 3960042 | B1 | 5/2023 |

(56)    References Cited

FOREIGN PATENT DOCUMENTS

| | | | |
|---|---|---|---|
| EP | 3791765 | B1 | 6/2023 |
| EP | 4193889 | A1 | 6/2023 |
| EP | 4197403 | A1 | 6/2023 |
| EP | 4197409 | A1 | 6/2023 |
| EP | 3989785 | A4 | 7/2023 |
| EP | 4205607 | A1 | 7/2023 |
| EP | 4209154 | A1 | 7/2023 |
| EP | 4262487 | A1 | 10/2023 |
| ES | 2970366 | T3 * | 5/2024 ......... A47J 31/0663 |
| GB | 2448009 | A | 10/2008 |
| GB | 2464251 | A | 4/2010 |
| GB | 2531287 | B | 6/2017 |
| GB | 2502381 | B | 3/2018 |
| GB | 2605990 | A | 10/2022 |
| GB | 2571580 | B | 2/2023 |
| WO | 9103951 | A1 | 4/1991 |
| WO | 2008119966 | A3 | 12/2008 |
| WO | 2008155538 | A2 | 12/2008 |
| WO | 2008139173 | A3 | 1/2009 |
| WO | 2009060192 | A2 | 5/2009 |
| WO | 2009010732 | A3 | 7/2009 |
| WO | 2009138736 | A3 | 3/2010 |
| WO | 2010121299 | A1 | 10/2010 |
| WO | 2016070232 | A1 | 5/2016 |
| WO | 2016139324 | A1 | 9/2016 |
| WO | 2016174535 | A1 | 11/2016 |
| WO | 2017215096 | A1 | 12/2017 |
| WO | 2019141409 | A1 | 7/2019 |
| WO | 2020097954 | A1 | 5/2020 |
| WO | 2020220084 | A1 | 11/2020 |
| WO | 2020243776 | A1 | 12/2020 |
| WO | 2021004836 | A1 | 1/2021 |
| WO | 2021074908 | A1 | 4/2021 |
| WO | 2021191910 | A1 | 9/2021 |
| WO | 2021194363 | A1 | 9/2021 |
| WO | 2021204455 | A1 | 10/2021 |
| WO | 2021214560 | A1 | 10/2021 |
| WO | 2021249675 | A1 | 12/2021 |
| WO | 2021259549 | A1 | 12/2021 |
| WO | 2021259614 | A1 | 12/2021 |
| WO | 2021259615 | A1 | 12/2021 |
| WO | 2021259616 | A1 | 12/2021 |
| WO | 2021259617 | A1 | 12/2021 |
| WO | 2022019791 | A1 | 1/2022 |
| WO | 2022024153 | A1 | 2/2022 |
| WO | 2022025379 | A1 | 2/2022 |
| WO | 2022033908 | A1 | 2/2022 |
| WO | 2022048960 | A1 | 3/2022 |
| WO | 2022060093 | A1 | 3/2022 |
| WO | 2022073523 | A1 | 4/2022 |
| WO | 2022075934 | A1 | 4/2022 |
| WO | 2022084435 | A1 | 4/2022 |
| WO | 2022105069 | A1 | 5/2022 |
| WO | 2022126199 | A1 | 6/2022 |
| WO | 2022126604 | A1 | 6/2022 |
| WO | 2022144155 | A1 | 7/2022 |
| WO | 2022157144 | A1 | 7/2022 |
| WO | 2022171470 | A1 | 8/2022 |
| WO | 2022171553 | A1 | 8/2022 |
| WO | 2022167560 | A3 | 9/2022 |
| WO | 2022195388 | A1 | 9/2022 |
| WO | 2022196247 | A1 | 9/2022 |
| WO | 2022198275 | A1 | 9/2022 |
| WO | 2022205545 | A1 | 10/2022 |
| WO | 2022205984 | A1 | 10/2022 |
| WO | 2022219656 | A1 | 10/2022 |
| WO | 2022221914 | A1 | 10/2022 |
| WO | 2022246513 | A1 | 12/2022 |
| WO | 2022248146 | A1 | 12/2022 |
| WO | 2022253853 | A1 | 12/2022 |
| WO | 2022266716 | A1 | 12/2022 |
| WO | 2022268494 | A1 | 12/2022 |
| WO | 2022203560 | A8 | 1/2023 |
| WO | 2023274895 | A1 | 1/2023 |
| WO | 2023285726 | A1 | 1/2023 |
| WO | 2023007342 | A1 | 2/2023 |
| WO | 2023019305 | A1 | 2/2023 |
| WO | 2023027635 | A1 | 3/2023 |
| WO | 2023036476 | A1 | 3/2023 |
| WO | 2023042237 | A1 | 3/2023 |
| WO | 2023044543 | A1 | 3/2023 |
| WO | 2023049223 | A1 | 3/2023 |
| WO | 2023066659 | A1 | 4/2023 |
| WO | 2023067638 | A1 | 4/2023 |
| WO | 2023067639 | A1 | 4/2023 |
| WO | 2023069457 | A1 | 4/2023 |
| WO | 2023088823 | A1 | 5/2023 |
| WO | 2023101178 | A1 | 6/2023 |
| WO | 2023105414 | A1 | 6/2023 |
| WO | 2023115097 | A1 | 6/2023 |
| WO | 2023117736 | A1 | 6/2023 |
| WO | 2023131984 | A1 | 7/2023 |
| WO | 2023158608 | A1 | 8/2023 |
| WO | 2023180410 | A1 | 9/2023 |
| WO | 2023240309 | A1 | 12/2023 |

OTHER PUBLICATIONS

U.S. Appl. No. 18/651,970 entitled "Preventing Coffee Bean Grinder Jamming" filed May 1, 2024, 190 pages.
U.S. Appl. No. 18/652,049 entitled "Descaling Beverage Machines" filed May 1, 2024, 188 pages.
U.S. Appl. No. 18/652,063 entitled "Preparation of Beverage Machines for Cold Beverage Brewing" filed May 1, 2024, 155 pages.
U.S. Appl. No. 18/652,309 entitled "Beverage Machine Filters and Portafilters" filed May 1, 2024, 204 pages.
U.S. Appl. No. 18/652,415 entitled "Beverage Machine Portafilters" filed May 1, 2024, 210 pages.
U.S. Appl. No. 18/652,514 entitled "Coffee Tamping" filed May 1, 2024, 212 pages.
International Search Report and Written Opinion for PCT Application No. PCT/US2024/027172 mailed Sep. 18, 2024. (12 pages).

* cited by examiner

128

128a
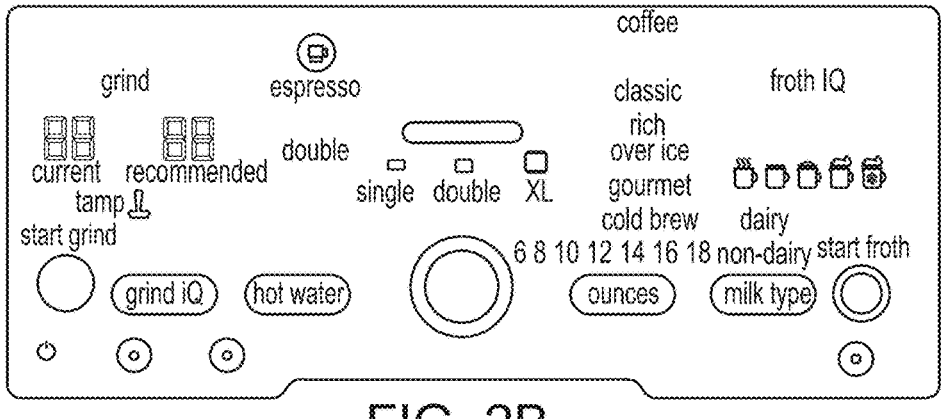
FIG. 2B
FIG. 3A

220

220a

220b

220

220c

220d

220a

220b

220e

219c
FIG. 3II
219c
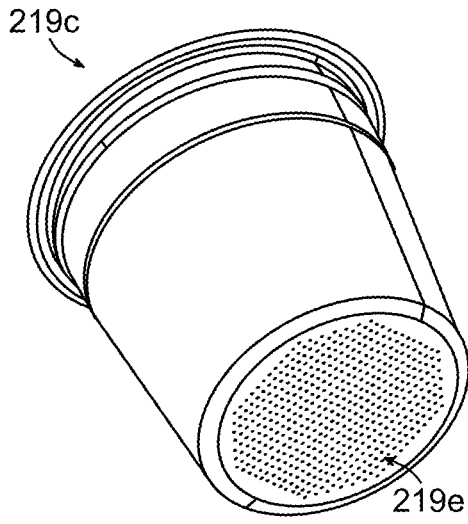
219e
FIG. 3JJ
223a
single
219a
221a
FIG. 3KK
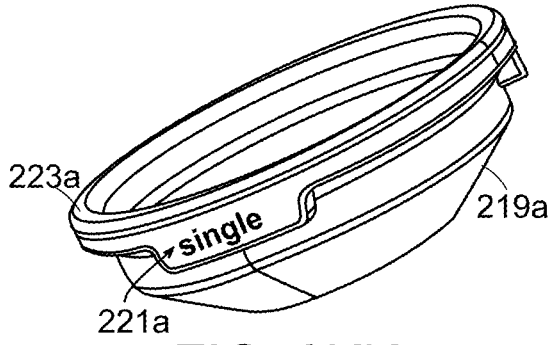
223b
double
221b
219b
FIG. 3LL
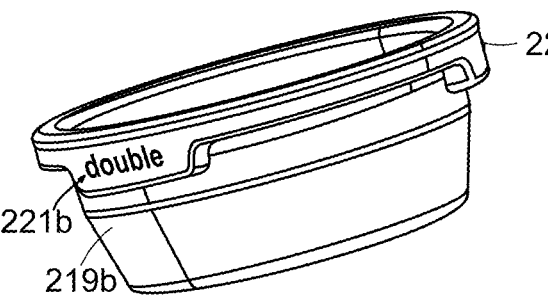
223c
luxe
221c
219c
FIG. 3MM
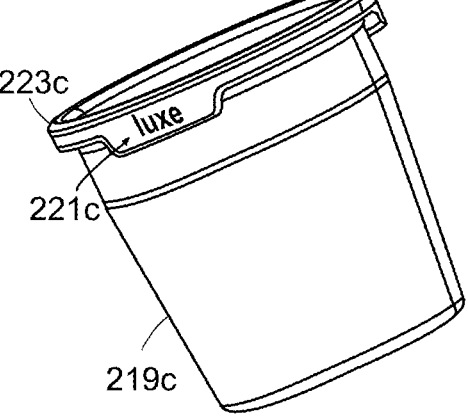

316

Identify current grind size —318

Identify brew time for selected beverage —320

322
Brew time optimal for selected beverage?

Yes

No

324
Recommended grind size is the current grind size

326
Determined grind size for optimal brew time of selected beverage

600

SUGGESTING COFFEE BEAN GRIND SIZE FOR BEVERAGE MACHINES

CROSS REFERENCE TO RELATED APPLICATIONS

The present application claims priority to U.S. Provisional Patent Application No. 63/622,442 entitled "Espresso Machines" filed on Jan. 18, 2024 and to U.S. Provisional Patent Application No. 63/627,571 entitled "Suggesting Coffee Bean Grind Size For Beverage Machines" filed on Jan. 31, 2024, which are hereby incorporated by reference in their entireties.

FIELD

The present disclosure generally relates to suggesting coffee bean grind size for beverage machines.

BACKGROUND

Various systems and methods for brewing a beverage, such as coffee or tea, are known. These systems typically include drip brewing systems in which hot water is brewed through coffee grounds and into a carafe, or French press systems in which coffee grounds and water are mixed in a container and a water-permeable plunger is pressed into the container from above to trap the ground coffee at the bottom of the container.

Existing beverage brewing systems that can brew espresso may include a grinder that grinds coffee beans. Grind size (grinding level) is one factor that affects quality of the espresso. Baristas will typically adjust the grind size in view of one or more other factors to achieve optimal espresso. Such factors include espresso beverage size (liquid amount), roasting type of the coffee beans (dark, medium, etc.), age (freshness) of the coffee beans, and type of the coffee beans (*Arabica, Robusta*, etc.). Baristas typically adjust the grind size on a daily basis because even one day of coffee bean aging affects espresso quality. However, it can be difficult even for trained baristas to accurately adjust grind size to achieve optimal espresso since it can be difficult to accurately evaluate the relevant variables in selecting a grind size. It is even more difficult for non-trained users of home espresso machines to adjust grind size to achieve optimal espresso.

SUMMARY

In general, systems, devices, and methods for beverage machines (e.g., coffee machines, espresso machines, etc.) are provided.

In one aspect, a system for recommending coffee bean grind size is provided that in one implementation includes an espresso machine including a grinder, a user interface, a controller, and a memory. The grinder is configured to grind coffee beans. The user interface is configured to receive a user input selecting an espresso beverage for formation and dispensing from the espresso machine. The memory stores instructions that, when executed by the controller, cause the controller to perform one or more operations that include determining a recommended grind size of the coffee beans based on a predetermined optimal brew time for the selected espresso beverage and based on a grind size and a brew time for a last espresso beverage formed and dispensed by the espresso machine.

The system can vary in any number of ways. For example, the one or more operations can further include providing the recommended grind size to a user via the user interface. Further, the user interface can be configured to receive a user input requesting a start of the formation and dispensing of the selected espresso beverage, and the recommended grind size can be provided via the user interface prior to the receipt of the user input requesting the start of the formation and dispensing of the selected espresso beverage. Further, the espresso machine can further include a grind size adjustment mechanism operatively coupled to the grinder and configured to be manually adjusted by a user, after the recommended grind size is provided and prior to the user input requesting the start of the formation and dispensing of the selected espresso beverage, to adjust a grind size of coffee beans to be ground by the grinder.

For another example, the espresso machine can further include a grind size adjustment mechanism operatively coupled to the grinder and configured to be manually adjusted by a user to adjust a grind size of coffee beans to be ground by the grinder. Further, the grind size adjustment mechanism can include a rotatable wheel operatively coupled to the grinder. Further, the espresso machine can further include a gear train operatively coupled to the wheel and to the grinder, the grinder can include an outer burr and an inner burr defining a space therebetween in which the coffee beans to be ground are configured to be located, and the rotation of the wheel can be configured to adjust a size of the space and thereby adjust the grind size. Further, the rotation of the wheel can be configured to cause rotation of gears of the gear train and thereby cause the outer burr to move relative to the inner burr, and/or the espresso machine can further include an encoder operatively coupled to the controller and the gear train and configured to transmit a signal to the controller indicating a current grind size setting of the grinder.

For yet another example, the user interface can be configured to receive a user input requesting the recommended grind size, and the determining of the recommended grind size can be configured to occur in response to the receipt of the user input requesting the recommended grind size.

For still another example, the user interface can be configured to receive a user input requesting a start of the formation and dispensing of the selected espresso beverage, and the determining of the recommended grind size can be configured to occur automatically in response to the receipt of the user input requesting the start.

For another example, the one or more operations can further include causing the selected espresso beverage to be formed and dispensed, and storing a grind size and a brew time of the espresso beverage that is formed and dispensed. Further, the user interface can be configured to receive a second user input selecting a second espresso beverage for formation and dispensing from the espresso machine, and the one or more operations can further include determining a second recommended grind size of the coffee beans based on a predetermined optimal brew time for the selected second espresso beverage and based on the stored grind size and brew time.

For yet another example, the one or more operations can further include causing the selected espresso beverage to be formed and dispensed; the one or more operations can further include, prior to the causing of the selected espresso beverage to be formed and dispensed, providing the recommended grind size to a user via the user interface; the user interface can be configured to receive a user input requesting a start of the formation and dispensing of the selected espresso beverage; and the recommended grind size can be provided via the user interface prior to the receipt of the user input requesting the start of the formation and dispensing of the selected espresso beverage. Further, the espresso machine can further include a grind size adjustment mechanism operatively coupled to the grinder and configured to be manually adjusted by a user, after the recommended grind size is provided and prior to the user input requesting the start of the formation and dispensing of the selected espresso beverage, to adjust a grind size of coffee beans to be ground by the grinder.

For another example, the espresso machine can further include a hopper configured to store the coffee beans, and the grinder can be configured to receive the coffee beans from the hopper.

In another implementation, a system for recommending coffee bean grind size includes a controller and a memory. The memory stores instructions that, when executed by the controller, cause the controller to perform one or more operations that include determining a recommended grind size of coffee beans to be ground by a grinder of an espresso machine based on a predetermined optimal brew time for an espresso beverage selected by a user via a user interface of the espresso machine and based on a grind size and a brew time for a last espresso beverage formed and dispensed by the espresso machine.

The system can have any number of variations. For example, the one or more operations can further include providing the recommended grind size to a user via the user interface. Further, the user interface can be configured to receive a user input requesting a start of the formation and dispensing of the selected espresso beverage, and the recommended grind size can be provided via the user interface prior to the receipt of the user input requesting the start of the formation and dispensing of the selected espresso beverage. Further, the espresso machine can include a grind size adjustment mechanism operatively coupled to the grinder and configured to be manually adjusted by a user, after the recommended grind size is provided and prior to the user input requesting the start of the formation and dispensing of the selected espresso beverage, to adjust a grind size of coffee beans to be ground by the grinder.

For another example, the espresso machine can include a grind size adjustment mechanism operatively coupled to the grinder and configured to be manually adjusted by a user to adjust a grind size of coffee beans to be ground by the grinder; the espresso machine can include an encoder operatively coupled to the grind size adjustment mechanism and to the controller; and the one or more operations can further include receiving a signal from the encoder indicating a current grind size setting of the grinder.

For yet another example, the espresso machine can include a grind size adjustment mechanism operatively coupled to the grinder and configured to be manually adjusted by a user to adjust a grind size of coffee beans to be ground by the grinder. Further, the grind size adjustment mechanism can include a rotatable wheel operatively coupled to the grinder. Further, the espresso machine can further include a gear train operatively coupled to the wheel and to the grinder, the grinder can include an outer burr and an inner burr defining a space therebetween in which the coffee beans to be ground are configured to be located, and the rotation of the wheel can be configured to adjust a size of the space and thereby adjust the grind size. Further, the rotation of the wheel can be configured to cause rotation of gears of the gear train and thereby cause the outer burr to move relative to the inner burr, and/or the espresso machine can further include an encoder operatively coupled to the controller and the gear train and configured to transmit a signal to the controller indicating a current grind size setting of the grinder.

For yet another example, the user interface can be configured to receive a user input requesting the recommended grind size, and the determining of the recommended grind size can be configured to occur in response to the receipt of the user input requesting the recommended grind size.

For still another example, the user interface can be configured to receive a user input requesting a start of the formation and dispensing of the selected espresso beverage, and the determining of the recommended grind size can be configured to occur automatically in response to the receipt of the user input requesting the start.

For another example, the one or more operations can further include causing the selected espresso beverage to be formed and dispensed, and storing a grind size and a brew time of the espresso beverage that is formed and dispensed. Further, the one or more operations can further include determining a second recommended grind size of coffee beans to be ground by the grinder of the espresso machine based on a second predetermined optimal brew time for a second espresso beverage selected by a user via the user interface of the espresso machine and based on the stored grind size and brew time.

For yet another example, the one or more operations can further include causing the selected espresso beverage to be formed and dispensed; the one or more operations can further include, prior to the causing of the selected espresso beverage to be formed and dispensed, providing the recommended grind size to a user via the user interface; the user interface can be configured to receive a user input requesting a start of the formation and dispensing of the selected espresso beverage; and the recommended grind size can be provided via the user interface prior to the receipt of the user input requesting the start of the formation and dispensing of the selected espresso beverage. Further, the espresso machine can further include a grind size adjustment mechanism operatively coupled to the grinder and configured to be manually adjusted by a user, after the recommended grind size is provided and prior to the user input requesting the start of the formation and dispensing of the selected espresso beverage, to adjust a grind size of coffee beans to be ground by the grinder.

For another example, the espresso machine can further include a hopper configured to store the coffee beans, and the grinder can be configured to receive the coffee beans from the hopper.

In another aspect, a system is provided that in one implementation includes a beverage machine including a grinder, a user interface, a controller, and a memory. The grinder is configured to grind coffee beans. The user interface is configured to receive a user input selecting a beverage for formation and dispensing from the beverage machine. The memory stores instructions that, when executed by the controller, cause the controller to perform one or more operations that include determining a recommended grind size of the coffee beans based on a predetermined optimal brew time for the selected beverage and based on a grind size and a brew time for a last beverage formed and dispensed by the beverage machine.

The system can vary in any number of ways. For example, the one or more operations can further include providing the recommended grind size to a user via the user interface. Further, the user interface can be configured to receive a user input requesting a start of the formation and dispensing of the selected beverage, and the recommended grind size can be provided via the user interface prior to the receipt of the user input requesting the start of the formation and dispensing of the selected beverage. Further, the beverage machine can further include a grind size adjustment mechanism operatively coupled to the grinder and configured to be manually adjusted by a user, after the recommended grind size is provided and prior to the user input requesting the start of the formation and dispensing of the selected beverage, to adjust a grind size of coffee beans to be ground by the grinder.

For another example, the beverage machine can further include a grind size adjustment mechanism operatively coupled to the grinder and configured to be manually adjusted by a user to adjust a grind size of coffee beans to be ground by the grinder. Further, the grind size adjustment mechanism can include a rotatable wheel operatively coupled to the grinder. Further, the beverage machine can further include a gear train operatively coupled to the wheel and to the grinder, the grinder can include an outer burr and an inner burr defining a space therebetween in which the coffee beans to be ground are configured to be located, and the rotation of the wheel can be configured to adjust a size of the space and thereby adjust the grind size. Further, the rotation of the wheel can be configured to cause rotation of gears of the gear train and thereby cause the outer burr to move relative to the inner burr, and/or the beverage machine can further include an encoder operatively coupled to the controller and the gear train and configured to transmit a signal to the controller indicating a current grind size setting of the grinder.

For yet another example, the user interface can be configured to receive a user input requesting the recommended grind size, and the determining of the recommended grind size can be configured to occur in response to the receipt of the user input requesting the recommended grind size.

For still another example, the user interface can be configured to receive a user input requesting a start of the formation and dispensing of the selected beverage, and the determining of the recommended grind size can be configured to occur automatically in response to the receipt of the user input requesting the start.

For another example, the one or more operations can further include causing the selected beverage to be formed and dispensed, and storing a grind size and a brew time of the beverage that is formed and dispensed. Further, the user interface can be configured to receive a second user input selecting a second beverage for formation and dispensing from the beverage machine, and the one or more operations can further include determining a second recommended grind size of the coffee beans based on a predetermined optimal brew time for the selected second beverage and based on the stored grind size and brew time.

For yet another example, the one or more operations can further include causing the selected beverage to be formed and dispensed; the one or more operations can further include, prior to the causing of the selected beverage to be formed and dispensed, providing the recommended grind size to a user via the user interface; the user interface can be configured to receive a user input requesting a start of the formation and dispensing of the selected beverage; and the recommended grind size can be provided via the user interface prior to the receipt of the user input requesting the start of the formation and dispensing of the selected beverage. Further, the beverage machine can further include a grind size adjustment mechanism operatively coupled to the grinder and configured to be manually adjusted by a user, after the recommended grind size is provided and prior to the user input requesting the start of the formation and dispensing of the selected beverage, to adjust a grind size of coffee beans to be ground by the grinder.

For another example, the espresso machine can further include a hopper configured to store the coffee beans, and the grinder can be configured to receive the coffee beans from the hopper.

For yet another example, the beverage machine can be a coffee machine.

For still another example, the beverage machine can be an espresso machine.

In another implementation, a system includes a controller and a memory. The memory stores instructions that, when executed by the controller, cause the controller to perform one or more operations that include determining a recommended grind size of coffee beans to be ground by a grinder of a beverage machine based on a predetermined optimal brew time for a beverage selected by a user via a user interface of the beverage machine and based on a grind size and a brew time for a last beverage formed and dispensed by the beverage machine.

The system can have any number of variations. For example, the one or more operations can further include providing the recommended grind size to a user via the user interface. Further, the user interface can be configured to receive a user input requesting a start of the formation and dispensing of the selected beverage, and the recommended grind size can be provided via the user interface prior to the receipt of the user input requesting the start of the formation and dispensing of the selected beverage. Further, the beverage machine can include a grind size adjustment mechanism operatively coupled to the grinder and configured to be manually adjusted by a user, after the recommended grind size is provided and prior to the user input requesting the start of the formation and dispensing of the selected beverage, to adjust a grind size of coffee beans to be ground by the grinder.

For another example, the beverage machine can include a grind size adjustment mechanism operatively coupled to the grinder and configured to be manually adjusted by a user to adjust a grind size of coffee beans to be ground by the grinder; the beverage machine can include an encoder operatively coupled to the grind size adjustment mechanism and to the controller; and the one or more operations can further include receiving a signal from the encoder indicating a current grind size setting of the grinder.

For yet another example, the beverage machine can include a grind size adjustment mechanism operatively coupled to the grinder and configured to be manually adjusted by a user to adjust a grind size of coffee beans to be ground by the grinder. Further, the grind size adjustment mechanism can include a rotatable wheel operatively coupled to the grinder. Further, the beverage machine can further include a gear train operatively coupled to the wheel and to the grinder, the grinder can include an outer burr and an inner burr defining a space therebetween in which the coffee beans to be ground are configured to be located, and the rotation of the wheel can be configured to adjust a size of the space and thereby adjust the grind size. Further, the rotation of the wheel can be configured to cause rotation of gears of the gear train and thereby cause the outer burr to move relative to the inner burr, and/or the beverage machine can further include an encoder operatively coupled to the controller and the gear train and configured to transmit a signal to the controller indicating a current grind size setting of the grinder.

For yet another example, the user interface can be configured to receive a user input requesting the recommended grind size, and the determining of the recommended grind size can be configured to occur in response to the receipt of the user input requesting the recommended grind size.

For still another example, the user interface can be configured to receive a user input requesting a start of the formation and dispensing of the selected beverage, and the determining of the recommended grind size can be configured to occur automatically in response to the receipt of the user input requesting the start.

For another example, the one or more operations can further include causing the selected beverage to be formed and dispensed, and storing a grind size and a brew time of the beverage that is formed and dispensed. Further, the one or more operations can further include determining a second recommended grind size of coffee beans to be ground by the grinder of the beverage machine based on a second predetermined optimal brew time for a second beverage selected by a user via the user interface of the beverage machine and based on the stored grind size and brew time.

For yet another example, the one or more operations can further include causing the selected beverage to be formed and dispensed; the one or more operations can further include, prior to the causing of the selected beverage to be formed and dispensed, providing the recommended grind size to a user via the user interface; the user interface can be configured to receive a user input requesting a start of the formation and dispensing of the selected beverage; and the recommended grind size can be provided via the user interface prior to the receipt of the user input requesting the start of the formation and dispensing of the selected beverage. Further, the beverage machine can further include a grind size adjustment mechanism operatively coupled to the grinder and configured to be manually adjusted by a user, after the recommended grind size is provided and prior to the user input requesting the start of the formation and dispensing of the selected beverage, to adjust a grind size of coffee beans to be ground by the grinder.

For another example, the beverage machine can further include a hopper configured to store the coffee beans, and the grinder can be configured to receive the coffee beans from the hopper.

For yet another example, the beverage machine can be a coffee machine.

For still another example, the beverage machine can be an espresso machine.

In another aspect, a method is provided that in one implementation can include recommending coffee bean grind size using any of the above systems. The method can have any number of variations.

In another aspect, a method for recommending coffee bean grind size is provided that in one implementation includes an espresso machine determining a recommended grind size of coffee beans based on a predetermined optimal brew time for a selected espresso beverage and based on a grind size and a brew time for a last espresso beverage formed and dispensed by the espresso machine. The espresso machine includes a grinder, a user interface, a controller, and a memory. The grinder grinds coffee beans. The user interface receives a user input selecting the espresso beverage for formation and dispensing from the espresso machine. The memory stores instructions that, when executed by the controller, cause the controller to perform one or more operations that include the determining of the recommended grind size.

The method can vary in any number of ways. For example, the method can further include providing the recommended grind size to a user via the user interface. Further, the user interface can receive a user input requesting a start of the formation and dispensing of the selected espresso beverage, and the recommended grind size can be provided via the user interface prior to the receipt of the user input requesting the start of the formation and dispensing of the selected espresso beverage. Further, the espresso machine can further include a grind size adjustment mechanism operatively coupled to the grinder and configured to be manually adjusted by a user, after the recommended grind size is provided and prior to the user input requesting the start of the formation and dispensing of the selected espresso beverage, to adjust a grind size of coffee beans to be ground by the grinder.

For another example, the espresso machine can further include a grind size adjustment mechanism operatively coupled to the grinder and configured to be manually adjusted by a user to adjust a grind size of coffee beans to be ground by the grinder. Further, the grind size adjustment mechanism can include a rotatable wheel operatively coupled to the grinder. Further, the espresso machine can further include a gear train operatively coupled to the wheel and to the grinder, the grinder can include an outer burr and an inner burr defining a space therebetween in which the coffee beans to be ground are configured to be located, and the rotation of the wheel can be configured to adjust a size of the space and thereby adjust the grind size. Further, the rotation of the wheel can be configured to cause rotation of gears of the gear train and thereby cause the outer burr to move relative to the inner burr, and/or the espresso machine can further include an encoder operatively coupled to the controller and the gear train and that transmits a signal to the controller indicating a current grind size setting of the grinder.

For yet another example, the user interface can receive a user input requesting the recommended grind size, and the determining of the recommended grind size can occur in response to the receipt of the user input requesting the recommended grind size.

For still another example, the user interface can receive a user input requesting a start of the formation and dispensing of the selected espresso beverage, and the determining of the recommended grind size can occur automatically in response to the receipt of the user input requesting the start.

For another example, the method can further include causing the selected espresso beverage to be formed and dispensed, and storing a grind size and a brew time of the espresso beverage that is formed and dispensed. Further, the user interface can receive a second user input selecting a second espresso beverage for formation and dispensing from the espresso machine, and the method can further include determining a second recommended grind size of the coffee beans based on a predetermined optimal brew time for the selected second espresso beverage and based on the stored grind size and brew time.

For yet another example, the method can further include causing the selected espresso beverage to be formed and dispensed; the method can further include, prior to the causing of the selected espresso beverage to be formed and dispensed, providing the recommended grind size to a user via the user interface; the user interface can receive a user input requesting a start of the formation and dispensing of the selected espresso beverage; and the recommended grind size can be provided via the user interface prior to the receipt of the user input requesting the start of the formation and dispensing of the selected espresso beverage. Further, the espresso machine can further include a grind size adjustment mechanism operatively coupled to the grinder and configured to be manually adjusted by a user, after the recommended grind size is provided and prior to the user input requesting the start of the formation and dispensing of the selected espresso beverage, to adjust a grind size of coffee beans to be ground by the grinder.

For another example, the espresso machine can further include a hopper configured to store the coffee beans, and the grinder can be configured to receive the coffee beans from the hopper.

In another aspect, a method is provided that in one implementation includes a beverage machine determining a recommended grind size of coffee beans based on a predetermined optimal brew time for a selected beverage and based on a grind size and a brew time for a last beverage formed and dispensed by the beverage machine. The beverage machine includes a grinder, a user interface, a controller, and a memory. The grinder grinds coffee beans. The user interface receives a user input selecting the beverage for formation and dispensing from the beverage machine. The memory stores instructions that, when executed by the controller, cause the controller to perform one or more operations that include the determining of the recommended grind size.

The method can vary in any number of ways. For example, the method can further include providing the recommended grind size to a user via the user interface. Further, the user interface can receive a user input requesting a start of the formation and dispensing of the selected beverage, and the recommended grind size can be provided via the user interface prior to the receipt of the user input requesting the start of the formation and dispensing of the selected beverage. Further, the beverage machine can further include a grind size adjustment mechanism operatively coupled to the grinder and configured to be manually adjusted by a user, after the recommended grind size is provided and prior to the user input requesting the start of the formation and dispensing of the selected beverage, to adjust a grind size of coffee beans to be ground by the grinder.

For another example, the beverage machine can further include a grind size adjustment mechanism operatively coupled to the grinder and configured to be manually adjusted by a user to adjust a grind size of coffee beans to be ground by the grinder. Further, the grind size adjustment mechanism can include a rotatable wheel operatively coupled to the grinder. Further, the beverage machine can further include a gear train operatively coupled to the wheel and to the grinder, the grinder can include an outer burr and an inner burr defining a space therebetween in which the coffee beans to be ground are configured to be located, and the rotation of the wheel can be configured to adjust a size of the space and thereby adjust the grind size. Further, the rotation of the wheel can be configured to cause rotation of gears of the gear train and thereby cause the outer burr to move relative to the inner burr, and/or the espresso machine can further include an encoder operatively coupled to the controller and the gear train and that transmits a signal to the controller indicating a current grind size setting of the grinder.

For yet another example, the user interface can receive a user input requesting the recommended grind size, and the determining of the recommended grind size can occur in response to the receipt of the user input requesting the recommended grind size.

For still another example, the user interface can receive a user input requesting a start of the formation and dispensing of the selected beverage, and the determining of the recommended grind size can occur automatically in response to the receipt of the user input requesting the start.

For another example, the method can further include causing the selected beverage to be formed and dispensed, and storing a grind size and a brew time of the beverage that is formed and dispensed. Further, the user interface can receive a second user input selecting a second beverage for formation and dispensing from the beverage machine, and the method can further include determining a second recommended grind size of the coffee beans based on a predetermined optimal brew time for the selected second beverage and based on the stored grind size and brew time.

For yet another example, the method can further include causing the selected beverage to be formed and dispensed; the method can further include, prior to the causing of the selected beverage to be formed and dispensed, providing the recommended grind size to a user via the user interface; the user interface can receive a user input requesting a start of the formation and dispensing of the selected beverage; and the recommended grind size can be provided via the user interface prior to the receipt of the user input requesting the start of the formation and dispensing of the selected beverage. Further, the beverage machine can further include a grind size adjustment mechanism operatively coupled to the grinder and configured to be manually adjusted by a user, after the recommended grind size is provided and prior to the user input requesting the start of the formation and dispensing of the selected beverage, to adjust a grind size of coffee beans to be ground by the grinder.

For another example, the beverage machine can further include a hopper configured to store the coffee beans, and the grinder can be configured to receive the coffee beans from the hopper.

For yet another example, the beverage machine can be a coffee machine.

For still another example, the beverage machine can be an espresso machine.

BRIEF DESCRIPTION OF DRAWINGS

This disclosure will be more fully understood from the following detailed description taken in conjunction with the accompanying drawings, in which:

FIG. 2B is a view of another implementation of a user interface of an espresso machine;

FIG. 3AA is a perspective view of one implementation of a tamp also illustrated in FIGS. 3B and 3C coupled to the espresso machine;

FIG. 3BB is a cross-sectional perspective view of the tamp of FIG. 3AA;

FIG. 3CC is a perspective view of the espresso machine of FIGS. 3A-3D with the tamp of FIGS. 3AA and 3BB removed therefrom;

FIG. 3DD is a perspective view of a portion of the espresso machine of FIG. 3CC;

FIG. 3EE is a perspective view of a portion of the espresso machine of FIGS. 3A-3D;

FIG. 3FF is a perspective view of a funnel;

FIG. 3GG is a perspective view of one implementation of a basket;

FIG. 3HH is a perspective view of another implementation of a basket;

FIG. 3II is a perspective view of yet another implementation of a basket;

FIG. 3JJ is another perspective view the basket of FIG. 3II;

FIG. 3KK is a perspective view the basket of FIG. 3GG with a collar secured thereto;

FIG. 3LL is a perspective view the basket of FIG. 3HH with a collar secured thereto;

FIG. 3MM is a perspective view the basket of FIG. 3II with a collar secured thereto;

FIG. 3NN is a perspective view of a portion of the portafilter of FIG. 3X with the basket of FIG. 3KK seated therein;

FIG. 3OO is an exploded view of the basket of FIG. 3KK;

FIG. 3PP is an exploded view of the basket of FIG. 3LL;

FIG. 3QQ is an exploded view of the basket of FIG. 3MM;

DETAILED DESCRIPTION

Figure 1A:
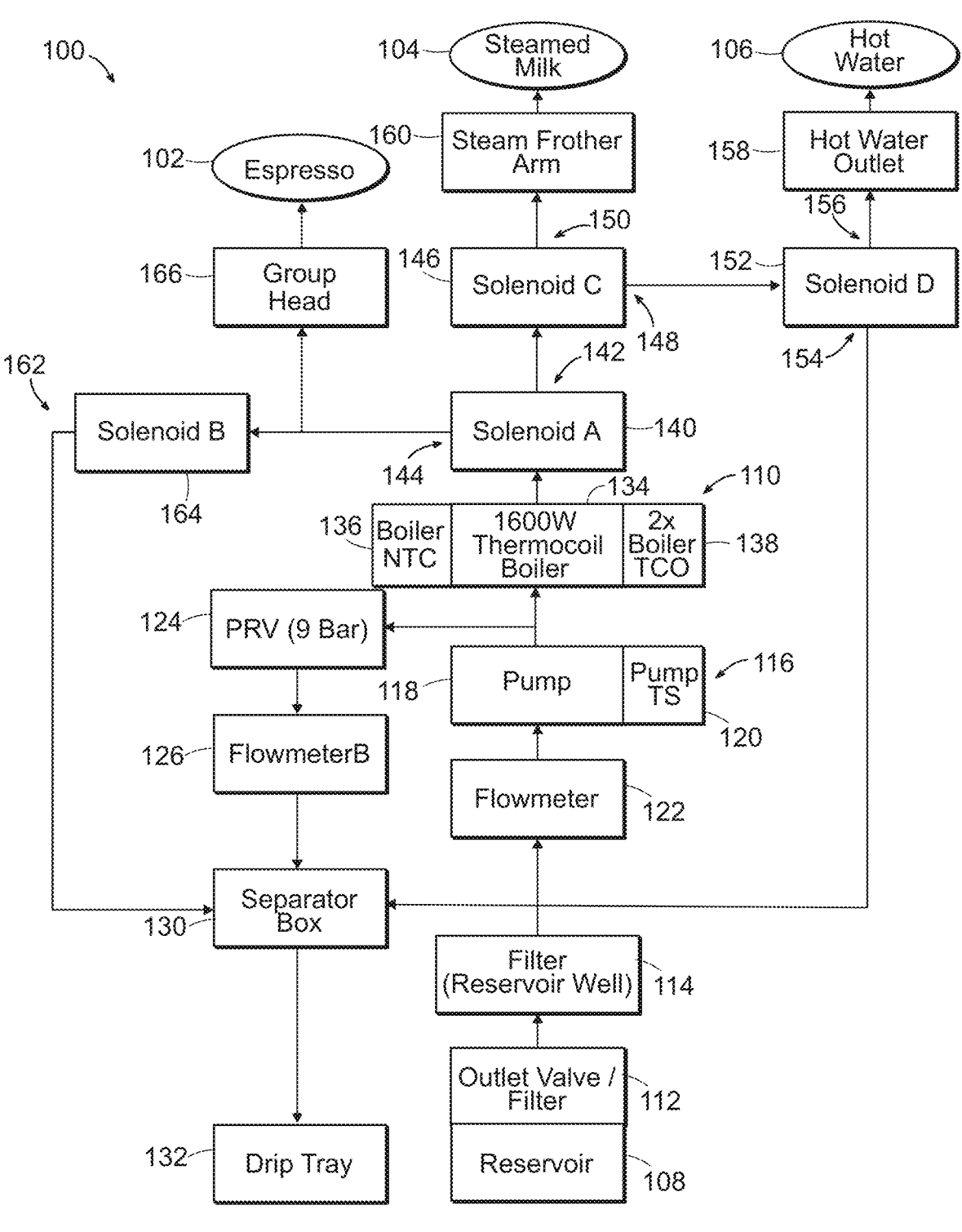
FIG. 1A is a schematic view of a portion of one implementation of an espresso machine.

Certain embodiments will now be described to provide an overall understanding of the principles of the structure, function, manufacture, and use of the devices, systems, and methods disclosed herein. One or more examples of these embodiments are illustrated in the accompanying drawings. Those skilled in the art will understand that the devices, systems, and methods specifically described herein and illustrated in the accompanying drawings are non-limiting embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

Various illustrative systems, devices, and methods for beverage machines (e.g., coffee machines, espresso machines, etc.) are provided. In an exemplary implementation, an espresso machine is configured to brew and dispense espresso. In an exemplary implementation, the espresso machine is configured to determine a recommended coffee bean grind size for a beverage, e.g., an espresso or a sprover-style drink, selected by a user and to provide the recommended coffee bean grind size to the user. The espresso machine may thus help ensure that espresso is optimally brewed for an optimal user experience regardless of a user's training for or experience with brewing espresso. However, a user is not required to accept the espresso machine's grind size recommendation. The espresso machine may thus provide the user with control that allows the user to make their own decision regarding grind size, which may be desirable for some users, such as users with espresso brewing training and/or significant espresso brewing experience. Accordingly, this subject matter addresses a need for improved devices, systems, and methods for beverage machine operation.

The systems, devices, and methods described herein are not limited to espresso machines that include a grinder. An espresso machine is one example of a device to which the systems, devices, and methods described herein apply. The systems, devices, and methods described herein also apply to other types of devices that include a grinder configured to grind coffee beans, such as a standalone grinder and a non-espresso coffee brewing device (e.g., a coffee machine). In some implementations, an espresso machine is configured to also brew non-espresso coffee beverages such as drip coffee drinks. In other implementations, an espresso machine is not configured to brew non-espresso coffee beverages such as drip coffee drinks.

FIG. 1A illustrates one implementation of an espresso machine 100 configured to brew and dispense espresso 102. The espresso machine 100 is also configured to brew and dispense sprover-style drinks (espresso pour overs). The espresso machine 100 in this illustrated implementation is also configured to froth milk 104, e.g., for adding to brewed espresso or to other food or drink. The milk can be dairy milk or can be a non-dairy milk substitute such as soy milk, oat milk, almond milk, or other substitute. The espresso machine 100 in this illustrated implementation is also configured to dispense water 106, e.g., for brewing tea, making cocoa, or other use.

The espresso machine 100 includes a housing (not shown in FIG. 1A) configured to house various components of the espresso machine 100. The housing includes a base configured to be positioned on a support surface, such as a countertop.

The espresso machine 100 includes a water reservoir (also referred to herein as a "reservoir," "tank," or "water tank") 108 configured to store water therein. The reservoir 108 is configured to be refillable with water by a user. In some implementations, the reservoir 108 is non-removably coupled to the housing, which may simplify manufacturing of the espresso machine 100. In other implementations, the reservoir 108 is removably coupled to the housing, which may facilitate cleaning of the reservoir 108 and/or facilitate refilling of the reservoir 108 because a user can bring the reservoir 108 to a sink, move the reservoir 108 to a location more convenient for refilling than where the espresso machine 100 is currently located, etc. The reservoir 108 is removably coupled to the housing in this illustrated implementation.

The espresso machine 100 includes a heating system 110 configured to heat water output from the water reservoir 108. Water stored in the reservoir 108 is configured to be output from the reservoir 108 through an outlet valve 112 of the reservoir 108 to a reservoir well 114. Each of the outlet valve 112 and the reservoir well 114 can also include a filter, as shown in this illustrated implementation. The reservoir's outlet valve 112 is configured to automatically open when the reservoir 108 is coupled to the housing and to automatically close when the reservoir 108 is removed from the housing. The outlet valve 112 is thus configured to prevent any water in the reservoir 108 from flowing out of the reservoir 108 when the reservoir 108 is not coupled to the housing (outlet valve 112 is closed) and to allow any water in the reservoir 108 to flow out of the reservoir 108 for making espresso, steam or hot water when the reservoir 108 is coupled to the housing (outlet valve 112 is open). The reservoir well 114 is configured as a water filter to catch any particles before reaching a first flowmeter 122.

The espresso machine 100 includes a pumping system 116 configured to pump water from the reservoir 108 to the heating system 110. The pumping system 116 includes a fluid pump 118 and a pump Therma switch (TS) 120. The pump 118 is a vibration pump in this illustrated implementation, but another type of pump may be used. The pump TS 120 is configured to open and prevent running of the pump 118 if the pump 118 heats above a threshold temperature.

The first flowmeter 122 is disposed in the fluid path between the reservoir 108 and the pumping system 116 (e.g., the pump 118 thereof). The first flowmeter 122 is configured to measure an amount of water flowing therethrough. The first flowmeter 122 is operatively coupled to a controller (not shown in FIG. 1A) of the espresso machine 100. The controller is configured to control the pump 118 based on the amount of water measured by the first flowmeter 122 so that a desired amount of water is provided to and heated by the heating system 110, as discussed further below. The controller is configured to execute instructions stored in a memory of the espresso machine 100 and can be, e.g., a processor, microcontroller, application specific integrated circuit (ASIC), etc. In an exemplary implementation, the espresso machine 100 includes a printed circuit board (PCB) (not shown in FIG. 1A) that includes the controller, the memory, and other electronic components.

The espresso machine 100 includes a pressure relief valve (PRV) 124 located downstream of the pumping system 116 and upstream of the heating system 110. The PRV 124 is configured to automatically open at a predetermined pressure. In some aspects, by automatically opening at the predetermined pressure, the PRV 124 can make the brew systems described herein more tolerant to a too fine of grinds, thus improving beverage quality. The predetermined pressure is 9 Bar in this illustrated implementation but can be another pressure amount and, in some implementations, can be adjusted by a user. The PRV 124 is configured as a safety mechanism to prevent buildup of water pressure by opening if water pressure reaches the predetermined pressure. As in this illustrated implementation, a T-connector can be positioned in the flow path between the pump 118 and the PRV 124 to allow fluid to either flow to the heating system 110 (PRV 124 is closed) or in a backflow channel to the PRV 124 (PRV 124 is open).

With the PRV 124 open, water is configured to flow from the pumping system 116 (e.g., the pump 118 thereof) through the PRV 124 and to a second flowmeter (labeled "Flowmeter B" in FIG. 1A) 126 located downstream of the PRV 124. In some implementations, the second flowmeter 126 is omitted. The second flowmeter 126 is configured to measure an amount of water flowing therethrough, which is indicative of a backflow volume. The second flowmeter 126 is operatively coupled to the espresso machine's controller.

The controller is configured to use measurement data from the second flowmeter 126. For example, in some implementations, the controller is configured to, during espresso or sprover-style drink brewing, compare measurement data from the second flowmeter 126 with a predetermined volume threshold, e.g., 10 ml or other value. If the measurement data from the second flowmeter 126 is greater than or equal to the predetermined volume threshold, then the coffee grind is too fine, as indicated by the backflow volume being greater than the predetermined volume threshold. In response to determining that the measurement data from the second flowmeter 126 is greater than or equal to the predetermined volume threshold, the controller is configured to cause an error message to be provided to a user via a user interface (not shown in FIG. 1A) of the espresso machine 100 indicating that an error in espresso or sprover-style drink brewing occurred.

Figure 2A:
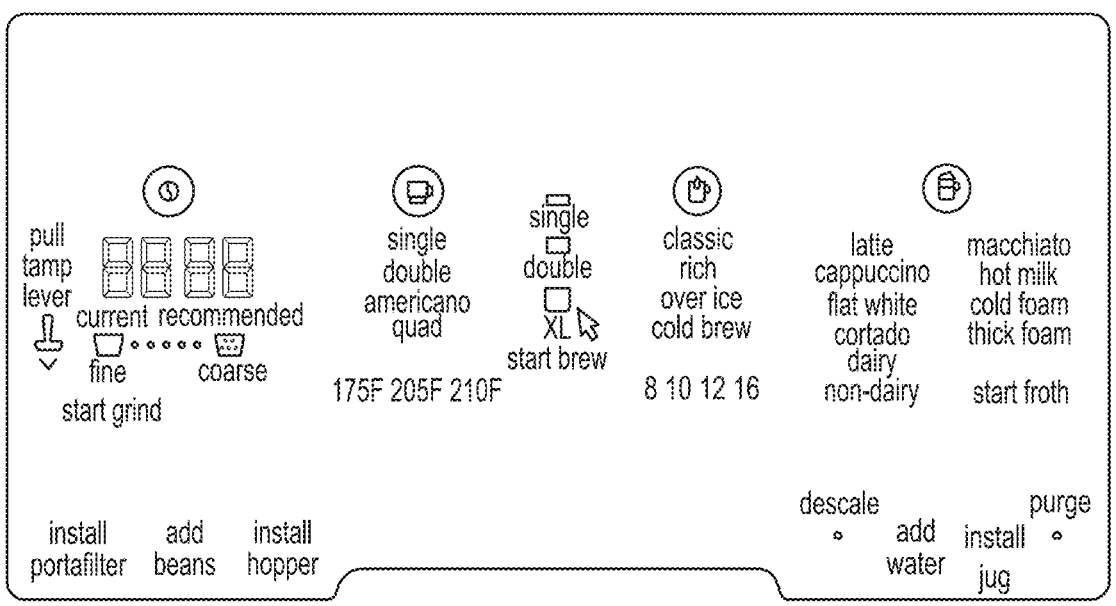
FIG. 2A is a view of one implementation of a user interface of an espresso machine.

One implementation of a user interface 128 that can be used as the espresso machine's user interface is shown in FIG. 2A. As shown in FIG. 2A, the user interface 128 includes a display (e.g., a liquid crystal display (LCD), a touchscreen, etc.) configured to show various information to a user. As in this illustrated implementation, the information on the user interface 128 can include indicators of a current grind size (in this illustrated implementation, a numerical value representing current grind size), a recommended grind size (in this illustrated implementation, a numerical value representing recommended grind size), grind level (in this illustrated implementation, on a scale from fine to course), an espresso type (in this illustrated implementation, single, double, Americano, or quad), a beverage size (in this illustrated implementation, single, double, extra-large (XL)), a brew type (in this illustrated implementation, classic, rich, over ice, or cold brew), a beverage volume (in this illustrated implementation, 8 oz, 10 oz, 12 oz, or 16 oz), a beverage temperature (in this illustrated implementation, 175° F., 250° F., or 210° F.), a output beverage type (in this illustrated implementation, latte, cappuccino, flat white, cortado, dairy, non-dairy, macchiato, hot milk, cold foam, and thick foam), and user instructions (in this illustrated implementation, pull tamp lever, install portafilter, add beans, install hopper, descale, add water, install jug, and purge). The user interface 128 is also configured to receive inputs from a user, such as by the user pressing a "start grind" button to start grinding beans at the indicated current grind size or by the user pressing a "start froth" button to start frothing milk.

Another implementation of a user interface 128a that can be used as the espresso machine's user interface is shown in FIG. 2B. As shown in FIG. 2B, the user interface 128a includes a display configured to show various information to a user. As in this illustrated implementation, the information on the user interface 128a can include indicators of a current grind size (in this illustrated implementation, a numerical value representing current grind size), a recommended grind size (in this illustrated implementation, a numerical value representing recommended grind size), espresso machine power state (on or off), an espresso type (in this illustrated implementation, single, double, or quad), a beverage size (in this illustrated implementation, single, double, extra-large (XL)), a brew type (in this illustrated implementation, classic, rich, over ice, gourmet, or cold brew), a beverage volume (in this illustrated implementation, 6 oz., 8 oz, 10 oz, 12 oz, 14 oz, 16 oz, or 18 oz), a froth selection (in this illustrated implementation, four froth level options for a hot drink and one froth option for cold foam), and user instructions (in this illustrated implementation, tamp). The user interface 128a is also configured to receive inputs from a user, such as by the user pressing a "start grind" button to start grinding beans at the indicated current grind size, a "grind IQ" button to request a recommended grind size, a "hot water" button to select hot water dispensing, a temperature button to select brew temperature, an "ounces" button to select the beverage volume, a power symbol to turn the espresso machine on/off, a "milk type" button to select dairy milk or non-dairy milk for frothing, or a "start froth" button to start frothing milk.

In some implementations, a beverage machine's user interface, e.g., the user interface 128 of FIG. 2A, the user interface 128a of FIG. 2B, or other user interface, is configured to allow user input of froth selection, e.g., one froth level option among a cold milk froth option and a plurality of hot milk froth options and/or one milk temperature option among a plurality of milk temperature options. The plurality of milk temperature options can be presented to a user as temperatures or as temperature levels (e.g., level zero being a lowest possible milk temperature and level N being a highest possible milk temperature with each level between zero and N incrementing by one degree, two degrees, three degrees, or other number of degrees) that correspond to temperatures.

In some implementations, a beverage machine's user interface, e.g., the user interface 128 of FIG. 2A, the user interface 128a of FIG. 2B, or other user interface, is configured to allow user input of a hard water test result. Any of a variety of hard water tests can be used to test water for hardness, such as a test strip configured to be inserted into water and change or show a color indicating the water's hardness. Mineral deposits from water build up in beverage machines, such as the various beverage machines described herein, due to water flowing through various components used in brewing and/or frothing. Hot water leaves more mineral residue than cold water. The beverage machine's user interface allowing user input of the hard water test result allows the beverage machine to use the hard water test result in determining when descaling should be performed to clean mineral deposits that may be in various conduits through which water flows in the beverage machine. Various implementations of descaling beverage machines are described further, for example, in U.S. patent application Ser. No. 18/652,049 entitled "Descaling Beverage Machines" filed on May 1, 2024 [Atty. Dkt. No. 057664-659001US], which is hereby incorporated by reference in its entirety.

In some implementations, a beverage machine's user interface, e.g., the user interface 128 of FIG. 2A, the user interface 128a of FIG. 2B, or other user interface, is configured to allow user input to select (or to turn off) light mode. In light mode, the beverage machine is configured to reduce an amount of coffee grounds predetermined for use with a selected non-espresso coffee beverage by a predetermined percentage. In this way a "light" version of the non-espresso coffee beverage is prepared. In an exemplary implementation, the predetermined percentage varies by a size (e.g., 6 oz, 8 oz, etc.) of the selected non-espresso coffee drink so that smaller non-espresso coffee drinks are not too weak by reducing an amount of coffee beans by a smaller percentage for smaller non-espresso coffee drinks than for larger non-espresso coffee drinks.

In some implementations, a beverage machine's user interface, e.g., the user interface 128 of FIG. 2A, the user interface 128a of FIG. 2B, or other user interface, is configured to allow user input of a grind to water ratio. In implementations in which the beverage machine is configured to prepare espresso, the "grind to water ratio" may be referred to as a "grind to espresso ratio."

The beverage machine can be configured to allow a user to select one of a plurality of predetermined grind to water ratios (e.g., two or more of 1.5:1, 2:1, 2.5:1, 3:1, and 3.5:1, or other possible ratios), the beverage machine can be configured to allow a user to input a user-chosen grind to water ratio, or the beverage machine can be configured to allow a user to choose between selecting one of a plurality of predetermined grind to water ratios or inputting a user-chosen grind to water ratio. The beverage machine is configured to use a default grind to water ratio in brewing a beverage if a user does not input a grind to water ratio. Brewing can thus occur regardless of whether or not a user inputs a grind to water ratio, which may improve user experience.

In an exemplary implementation, the grind to water ratio affects how much water is used in brewing a beverage using a certain amount of coffee grounds. Pump 118 power and duty cycle remain the same regardless of the grind to water ratio, as does an amount of grounds used for a particular selected beverage.

In some implementations, a beverage machine's user interface, e.g., the user interface 128 of FIG. 2A, the user interface 128a of FIG. 2B, or other user interface, is configured to allow user input of a ground setting for sprover-style drinks to allow the user to either increase an amount of grounds from a default amount used for a sprover-style drink or decrease an amount of grounds from the default amount used for a sprover-style drink. The ground setting can be selectable by a user as a ground level (e.g., level zero being a highest possible percentage of grounds to be decreased from the default amount and level N being a highest possible percentage of grounds to be increased from the default amount with each level between zero and N incrementing by one percent, two percent, three percent, or other percentage).

Referring again to FIG. 1A, the espresso machine 100 includes a separator box 130 that is located downstream of the PRV 124 and, if present, downstream of the second flowmeter 126. Water is thus configured to flow through the PRV 124 to the separator box 130. The separator box 130 is configured to separate steam from water so that only water exits the separator box 130 to collect in a drip tray 132 of the espresso machine 130. The separator box 130 includes a separator (not shown in FIG. 1A) therein that includes a plurality of ribs. The ribs are configured to allow water to pass therethrough to the drip tray 132 and to collect water condensation thereon from steam so the water condensation can drip off the ribs to the drip tray 132.

In some implementations, the drip tray 132 is removably coupled to the housing of the espresso machine 100. The drip tray 132 being removable from the housing may facilitate emptying and cleaning of the drip tray 132 since the drip tray 132 may be de-coupled from the housing and brought to a sink or other appropriate area for emptying and/or cleaning. In other implementations, the drip tray 132 is non-removably coupled to the housing of the espresso machine 100. The drip tray 132 being non-removable from the housing may help prevent loss of the drip tray 132, prevent the drip tray 132 from being damaged while being handled when de-coupled from the housing, and/or prevent leaks from the drip tray 132 due to the drip tray 132 accidentally not being re-coupled to the housing properly by a user. With the drip tray 132 being non-removable from the housing, the drip tray 132 includes a valve, removable plug, or other port configured to be opened and closed to selectively allow for emptying of the drip tray 132 by allowing material collected in the drip tray 132 to exit through the open port and to be retained in the drip tray 132 with the port closed.

As mentioned above, with the PRV 124 closed, the pump 118 is configured to pump water to the heating system 110. As in this illustrated implementation, the heating system 110 can include a heater 134, a temperature sensor 136, and a thermal cutoff (TCO) 138. The heater 134 is configured to heat water pumped thereto by the pump 118. The heater 134 is a 1600 W thermocoil boiler in this illustrated implementation but can be a thermocoil boiler having another power or can be another type of heater.

The temperature sensor 136 is configured to measure a temperature of the heater 134. The temperature of the heater 134 is considered to correspond to a temperature of the water being heated by the heater 134. The temperature sensor 136 is configured to measure a temperature of the heater 134 by, for example, directly contacting an exterior surface of the heater 134. The temperature sensor 136 is a negative temperature coefficient (NTC) thermistor in this illustrated implementation, but another type of temperature sensor can be used.

The temperature sensor 136 is configured to be operatively coupled to the controller such that sensed temperature data can be transmitted from the temperature sensor 136 to the controller. The controller is configured to use temperature data received from the temperature sensor 136 in controlling at least one functionality of the espresso machine 100. In an exemplary implementation, the controller is configured to use temperature data received from the temperature sensor 136 in controlling heating of the water by the heater 134 to a target temperature corresponding to a user's beverage selection input by the user via the user interface. In some implementations, water is always heated to a preset target temperature stored in the memory. In other implementations, the espresso machine's memory is configured to store therein different preset target temperatures corresponding to different user beverage selections. For example, in some implementations, water is always heated to a first preset target temperature if the water is intended for brewing espresso 102, water is always heated to a second preset target temperature if the water is intended for steam in steaming milk 104, and water is always heated to a third preset target temperature if the water is intended for dispensing as hot water 106. For another example, in some implementations, different espresso selections correspond to different preset target temperatures.

In some implementations, instead of the temperature sensor 136 measuring a temperature of the heater 134, the temperature sensor 136 is configured to measure a temperature of water being heated by the heater 134. For example, the temperature sensor 136 can be located at least partially within an area of the heater 134 containing water therein and can be configured to contact the water directly in the area of the heater 134 to measure the water's temperature.

The thermal cutoff 138 is configured to open the electrical path and makes sure that it is off if the heater 134 is heated too much for any reason. The thermal cutoff 138 includes two thermal cutoffs in this illustrated implementation, but another number may be used. For example, in another implementation, one thermal cutoff (TCO) and one thermostatic switch can be used. In such an implementation, when the TCO opens the electrical path, the thermostatic switch opens and it automatically closes back if the temperature of the heater 134 drops below a threshold value.

Water heated by the heater 134 is configured to be used selectively in brewing espresso 102, in steaming milk 104, or in being dispensed as hot water 106. The controller is configured to control a flow path of water in the espresso machine 100, e.g., through various conduits (e.g., pipes, tubes, etc.) and other elements, so water is directed appropriately for its user-selected purpose.

The espresso machine 100 includes a first solenoid valve (labeled "Solenoid A" in FIG. 1A) 140 located downstream of the heating system 110 and thus downstream of the heater 134. (A solenoid valve is also referred to herein as a "solenoid.") Water heated by the heater 134 is configured to exit the heater 134 and pass through the first solenoid valve 140 to flow in one of two flow paths, referred to as first and second flow paths for purposes of describing FIG. 1A. Which of the first and second flow paths that the water travels along depends on which outlet 142, 144 of the first solenoid valve 140 is open. The controller is configured to be operatively coupled to the first solenoid valve 140 to allow the controller to control which of the first solenoid valve's outlets 142, 144 is open. Only one of the first solenoid valve's outlets 142, 144 is configured to be open at a time.

The first solenoid valve 140 includes a first outlet 142 through which water is configured to flow if the water is intended for dispensing as steam for steamed milk 104 or if the water is intended for dispensing as hot water 106. A default position of the first solenoid valve's first outlet 142 is open.

The espresso machine 100 includes a second solenoid valve (labeled "Solenoid C" in FIG. 1A) 146 located downstream of the first solenoid valve 140 along the first flow path through the first solenoid valve's first outlet 142. Water is configured to pass out of the first solenoid valve's first outlet 142 and through the second solenoid valve 144 to one of two flow paths, referred to as third and fourth flow paths for purposes of describing FIG. 1A. Which of the third and fourth flow paths that the water travels along depends on which outlet 148, 150 of the second solenoid valve 146 is open. The controller is configured to be operatively coupled to the second solenoid valve 146 to allow the controller to control which of the second solenoid valve's outlets 148,

150 is open. Only one of the second solenoid valve's outlets 148, 150 is configured to be open at a time.

The second solenoid valve 146 includes a first outlet 148 through which water is configured to flow if the water is intended for dispensing as hot water 106. A default position of the second solenoid valve's first outlet 148 is open.

The espresso machine 100 includes a third solenoid valve (labeled "Solenoid D" in FIG. 1A) 152 located downstream of the second solenoid valve 140 along the third flow path through the second solenoid valve's first outlet 148. Water is configured to pass out of the second solenoid valve's first outlet 148 and through the third solenoid valve 152 to one of two flow paths, referred to as fifth and sixth flow paths for purposes of describing FIG. 1A. Which of the fifth and sixth flow paths that the water travels along depends on which outlet 154, 156 of the third solenoid valve 152 is open. The controller is configured to be operatively coupled to the third solenoid valve 152 to allow the controller to control which of the third solenoid valve's outlets 154, 156 is open. Only one of the third solenoid valve's outlets 154, 156 is configured to be open at a time.

The third solenoid valve 152 includes a first outlet 154 through which water is configured to flow for drainage to the drip tray 132 via the separator box 130. A default position of the third solenoid valve's first outlet 154 is open. A default flow path for water from the heater 118 is thus defined by the first, third, and fifth flow paths such that the water flows from the heater 118 to the drip tray 132. The default flow path is configured to allow any residual water to exit the housing and collect in the drip tray 132.

The third solenoid valve 152 includes a second outlet 156 through which water is configured to flow if the water is intended for dispensing as hot water 106 through a hot water outlet 158 of the espresso machine 100. A default position of the third solenoid valve's second outlet 156 is closed. The third solenoid valve's second outlet 156 being closed by default may help prevent any hot water 106 from being dispensed unless the espresso machine 100 is controlled to do so by the controller, e.g., by opening the third solenoid valve's second outlet 156 and closing the third solenoid valve's first outlet 154.

The hot water outlet 158 is configured to have a cup or other container positioned by a user below the hot water outlet 158 into which the hot water 106 is dispensed from the hot water outlet 158. In an exemplary implementation, the hot water outlet 158 is positioned above the drip tray 132 to allow any water drips from the hot water outlet 158 to collect in the drip tray 132 if a container is not positioned below the hot water outlet 158. The drip tray 132 can be configured to seat thereon the cup or other container for receiving the dispensed hot water 106.

Instead of flowing in the third flow path through the second solenoid valve's first outlet 148, water can flow in the fourth flow path. The second solenoid valve 146 includes a second outlet 150 through which water is configured to flow if the water is intended for dispensing as steam for steamed milk 104. A default position of the second solenoid valve's second outlet 150 is closed. The second solenoid valve's second outlet 150 being closed by default may help prevent any steam from exiting the espresso machine's steam frother arm 160 unless the espresso machine 100 is controlled to do so by the controller, e.g., by opening the second solenoid valve's second outlet 150 and closing the second solenoid valve's first outlet 148. In some aspects, the steam frother arm 160 can include a check valve provided between a flow path of the water used for steaming milk 104 and a vent to the atmosphere. During a frothing operation, the water that is heated to the second preset target temperature for steaming milk 104 can produce a pressure in the steam frother arm 160 which can act on the check valve to maintain it in a closed position. Once the frothing operation is complete, the pressure from the steam acting on the check valve can drop, and air within the steam frother arm 160 can contract, causing the check valve to open and allowing the flow path used for steaming milk 104 to vent to the atmosphere. Accordingly, the check valve provided in the steam frother arm 160 can advantageously prevent steamed milk 104 from being drawn up into the steam frother arm 160 (and further into the system) upon completion of the frothing operation, as the air within the steam frother arm 160 contracts.

The steam frother arm 160 is configured to form and direct steam into a milk receptacle (not shown in FIG. 1A) containing milk therein. The milk receptacle (also referred to herein as a "milk tin") is configured to be filled with milk, which as mentioned above can be dairy milk or non-dairy milk, by a user and placed under the steam frother arm 160. Flavoring can also be added to the milk tin, if desired by a user, such as one or more of flavor syrup (caramel, chocolate, or other flavor), salt, or other desired flavoring to flavor the froth that will be formed. The steam is distributed through the milk, along with air, using a mechanical mixer (not shown in FIG. 1A) to form the steamed milk 104. In an exemplary implementation, an exit opening of the steam frother arm 160 is positioned above the drip tray 132, which may allow any water drips from the steam frother arm 160 to collect in the drip tray 132 if the milk receptacle or other container is not positioned below the exit opening of steam frother arm 160. The drip tray 132 is thus configured to seat thereon the milk receptacle.

In some implementations, the mechanical mixer includes a whisk of the espresso machine 100 that is configured to be at least partially located within the milk receptacle and rotate within the milk receptacle. A whisk can have a variety of configurations. Implementations of whisks are further described in, for example, U.S. Pat. No. 11,812,892 entitled "Fluid Texturing Device" issued on Nov. 14, 2023, which is hereby incorporated by reference in its entirety.

In other implementations, the mechanical mixer includes a whisk of the milk receptacle that is configured to be at least partially located within the milk receptacle and rotate within the milk receptacle. A whisk of a milk receptacle can have a variety of configurations, such as the configuration discussed further below with respect to an espresso machine 200 of FIGS. 3A-3D.

Instead of flowing in the first flow path through the first solenoid valve's first outlet 142, water can flow in the second flow path. The first solenoid valve 140 includes a second outlet 144 through which water is configured to flow if the water is intended for brewing and dispensing espresso 102. A default position of the first solenoid valve's second outlet 144 is closed. Water is configured to pass out of the first solenoid valve's second outlet 144 to one of two flow paths, referred to as seventh and eighth flow paths for purposes of describing FIG. 1A. The flow path that the water travels along depends on whether an outlet 162 of a fourth solenoid valve (labeled "Solenoid B" in FIG. 1A) 164 is open or closed. The controller is configured to be operatively coupled to the fourth solenoid valve 164 to allow the controller to control the open/closed state of the fourth solenoid valve's outlet 162. A default position of the fourth solenoid valve's outlet 162 is closed.

If the fourth solenoid valve's outlet 162 is open and the first solenoid valve's second outlet 144 is open, water is configured to pass out of the first solenoid valve's second outlet 144, through the fourth solenoid valve 164, and out of the fourth solenoid valve's outlet 162 to the drip tray 132 via the separator box 130. The fourth solenoid valve's outlet 162 being open is thus configured to allow any residual water to exit the housing and collect in the drip tray 132.

If the fourth solenoid valve's outlet 162 is closed and the first solenoid valve's second outlet 144 is open, water is configured to pass out of the first solenoid valve's second outlet 144 to a group head 166 of the espresso machine 100. The group head 166 includes a plurality of holes through which water is configured to pass at high pressure into a portafilter 168 (see FIG. 1B) containing a tamped coffee puck (not shown in FIG. 1A) therein.

In some aspects, upon completion of each brewing operation, the espresso machine 100 can further include a pressure relief operation. During the pressure relief operation, the first solenoid valve's second outlet 144 can be configured to close and the fourth solenoid valve's outlet 162 can be configured to open to relieve the pressure in the group head 166 into the drip tray 132. By releasing the pressure in the group head 166 before the portafilter 168 is removed, the pressure relief operation advantageously mitigates any spurting that may occur as the user removes the portafilter 168. Additionally, the pressure relief operation allows brew water from the top of the puck to be evacuated into the drip tray 132, thereby resulting in less mess in the portafilter and providing an easier clean up.

From the portafilter 168, brewed espresso 102 is configured to be dispensed into a cup or other container. The portafilter 168 is configured to have a cup or other container positioned by a user below the portafilter 168 into which the brewed espresso 102 is dispensed. In an exemplary implementation, the portafilter 168 is positioned above the drip tray 132 when the espresso 102 is dispensed, which may allow any liquid drips from the portafilter 168 to collect in the drip tray 132 if a container is not positioned below the portafilter 168. The drip tray 132 is thus configured to seat thereon the cup or other container for receiving the dispensed espresso 102.

Figure 1B:
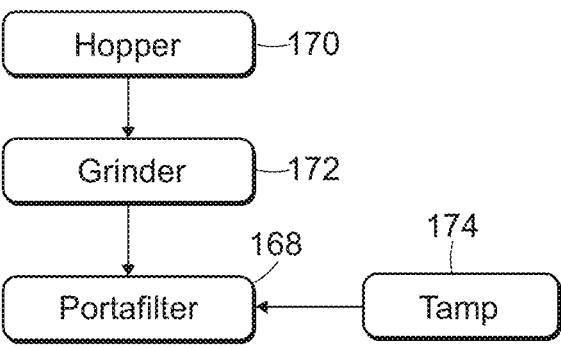
FIG. 1B is a schematic view of another portion of the espresso machine of FIG. 1A.

In an exemplary implementation, as shown in FIG. 1B, the espresso machine 100 includes the portafilter 168, a hopper 170 configured to contain coffee beans therein, a grinder 172 configured to grind whole coffee beans, and a tamp 174 configured to tamp ground coffee beans in the portafilter 168 to form a puck.

The hopper 170 is configured to store coffee beans (not shown in FIG. 1B) therein. The hopper 170 is configured to be refillable with coffee beans (also referred to herein as "beans") by a user. In some implementations, the hopper 170 is non-removably coupled to the housing, which may simplify manufacturing of the espresso machine 100. In other implementations, the hopper 170 is removably coupled to the housing, which may facilitate cleaning of the hopper 170 and/or facilitate refilling of the hopper 170 because a user can bring the hopper 170 to a countertop, move the hopper 170 to a location more convenient for refilling than where the espresso machine 100 is currently located, etc.

In an exemplary implementation, the hopper 170 is formed of a material configured to provide ultraviolet (UV) protection to contents of the hopper 170, e.g., to coffee beans in the hopper 170. UV light can adversely affect coffee beans.

Coffee beans in the hopper 170 are configured to be delivered to the grinder 172. The grinder 172 is configured to grind the coffee beans. In an exemplary implementation, a grind size to which the grinder 172 grinds the coffee beans is adjustable by a user. In such implementations the espresso machine 100 includes a grind size adjustment mechanism (e.g., wheel 222, described variously in greater detail below in reference to at least FIGS. 3P-3Q). The grind size adjustment mechanism is configured to allow adjustment of the grind size between a plurality of different grind settings. In general, the grind settings range from a finest grind size to a coarsest grind size. In some aspects, the grinder 172 can include an outer burr and an inner burr having a space defined therebetween wherein the beans are configured to be ground, as described in greater detail below. In this case, the grind size adjustment mechanism can adjust the grind size by increasing or decreasing an amount of vertical separation between the outer burr and the inner burr. In an exemplary implementation, the plurality of different grind settings includes at least seven grind settings: extra fine, fine, fine-medium, medium, medium-coarse, coarse, and extra coarse. In an exemplary implementation, the plurality of different grind settings includes a number of grind settings in a range of seven to twenty-five. Numerical values representing the different grind settings include a first number, typically zero or one, as the finest grind size with each successively coarser grind increasing in number by one. Alternatively, numerical values representing the different grind settings can decrease in number by one for each successively finer grind such that the lowest numerical value represents the coarsest grind size instead of the finest grind size. In some aspects, as described above, the machines described herein can be configured to brew both espresso and sprover-style beverages. Accordingly, in some aspects, the grind size adjustment mechanism can include a first plurality of grind settings for the espresso functionality and a second plurality of grind settings for the sprover-style functionality. For example, when operating in the espresso functionality, the first plurality of grind settings can include 20 grind settings (e.g., grind settings 1-20), wherein each sequential grind setting of the first plurality of grind settings changes a vertical separation between the outer burr and the inner burr by approximately 0.03 mm. In another example, when operating in the sprover-style functionality, the second plurality of grind settings can include 5 grind settings (e.g., grind settings 21-25), wherein each sequential grind setting of the second plurality of grind settings changes a vertical separation between the outer burr and the inner burr by approximately 0.3 mm. This variable grind size adjustment functionality advantageously allows for rapid change between the espresso and sprover-style functionalities while preserving the grind size resolution needed for good quality espresso and sprover-style beverages, respectively.

For another example, the grind size adjustment mechanism can include a rotatable wheel (not shown in FIG. 1A or FIG. 1B) operably coupled to the grinder 172 and configured to be rotated by a user, with rotation of the wheel in a first direction (e.g., one of clockwise and counterclockwise) being configured to increase the grind size and rotation of the wheel in a second direction (e.g., the other of clockwise and counterclockwise) being configured to decrease the grind size. The wheel and/or the espresso machine 100 can include markings configured to indicate the currently selected grind size. The espresso machine 100 can include an encoder (not shown in FIG. 1A or FIG. 1B) configured to sense a position of the wheel and communicate the sensed position to the controller. The controller is configured to, using the sensed position of the wheel, control the grinder 172 to achieve the currently selected grind size.

For yet another example, the grind size adjustment mechanism can include a lever (not shown in FIG. 1A or FIG. 1B) operably coupled to the grinder 172 and configured to be moved in a first direction (e.g., one of up or down or one of left or right) to increase the grind size and in a second direction, opposite to the first direction, to decrease the grind size. The lever and/or the espresso machine 100 can include markings configured to indicate the currently selected grind size. The espresso machine 100 can include an encoder (not shown in FIG. 1A or FIG. 1B) configured to sense a position of the lever and communicate the sensed position to the controller. The controller is configured to, using the sensed position of the lever, control the grinder 172 to achieve the currently selected grind size.

In some implementations, the controller is configured to cause the currently selected grind size to be shown on the user interface.

Coffee grinds are configured to be delivered from the grinder 172 to the portafilter 168. The portafilter 168 is configured to be removably coupled to the espresso machine 100. The portafilter 168 having coffee grounds therein is configured to be removed from the espresso machine 100. The portafilter 168 being removable from the espresso machine 100 allows a user to tamp the coffee grounds using the tamp 174.

In this illustrated implementation, the tamp 174 is removably coupled to the espresso machine 100 to allow the user to selectively remove the tamp 174 for tamping. The tamp 174 being removably coupled to the espresso machine 100 may help ensure that the tamp 174 is not lost and is easily available for tamping when needed. In other implementations, the tamp 174 is a standalone device that is not coupled to the espresso machine 100, which may allow a user to choose a tamp according to their personal preference. In still other implementations, the tamp 174 is non-removably coupled to the espresso machine, which may help prevent loss of the tamp 174. In such implementations, the portafilter 168 may be removed from the espresso machine 100 for tamping, or the portafilter 168 may remain coupled to the espresso machine 100 for tamping.

The portafilter 168 having tamped coffee grounds therein is configured to be positioned by a user below the group head 166 and re-coupled to the espresso machine 100 to allow water to pass through the group head 166 into the portafilter 168. The water will pass through the puck in the portafilter 168 and then exit the portafilter 168 as brewed espresso 102.

In some implementations, the espresso machine 100 is configured to perform an initial flushing process. The initial flushing process is performed at startup and flushes the espresso machine 100 before the espresso machine 100 is used to prepare any beverage. The initial flushing process runs water from the reservoir 108 through the espresso machine 100 to flush the machine 100. The water flushed through the machine and dispensed into a container is intended to be disposed of by a user rather than being consumed as a drink. Other implementations of beverage machines described herein can similarly be configured to perform an initial flushing process.

In some implementations, the espresso machine 100 is configured to perform a calibration process. The calibration process is performed when coffee beans are added to the hopper 170 before the espresso machine 100 is used to prepare any beverage using the coffee beans so the espresso machine 100 can calibrate for the particular coffee beans in the hopper 170. In an exemplary implementation, the calibration process includes two brew processes. In a first brew process, a selected beverage is prepared using a default grind size. In a second brew process, the same selected beverage is prepared using a grind size adjusted by the espresso machine 100 as described herein. The calibration process can include at least one additional brew process. Other implementations of beverage machines described herein can similarly be configured to perform a calibration process.

In some implementations, the espresso machine 100 is configured to perform a portafilter cleaning process. The portafilter cleaning process is configured to clean the portafilter 168. The portafilter cleaning process runs water from the reservoir 108 through the portafilter 168 which is coupled to the group head 166 and has a dissolvable cleanser tablet or other cleaner therein (as placed therein by a user). Other implementations of beverage machines described herein can similarly be configured to perform a portafilter cleaning process.

FIGS. 3A-3D illustrate another implementation of an espresso machine 200 configured to brew and dispense espresso. The espresso machine 200 in this illustrated implementation is also configured to dispense water, to froth milk (e.g., a dairy milk or a non-dairy milk), and to brew and dispense sprover-style drinks. The espresso machine 200 of FIGS. 3A-3D is generally configured and used similar to the espresso machine 100 of FIG. 1A, e.g., includes a housing 202, a water reservoir 204, a user interface 206, a drip tray 208, a hot water outlet 210, a steam frother arm 212, a group head 214, a hopper 216, a portafilter 218, a tamp 220, a grind adjustment mechanism in the form of a wheel 222, and elements that are obscured in FIGS. 3A-3D, including a reservoir well, a heating system, a pumping system, first and second flowmeters, a controller, a memory, a PRV, a separator box, first, second, third, and fourth solenoid valves, and a grinder. In some aspects, the reservoir well, heating system, pumping system, first and second flowmeters, PRV, separator box and first, second, third, and fourth solenoid valves of the espresso machine 200 can be similar to the reservoir well 114, heating system 110, pumping system 116, first and second flowmeters 122, 126, PRV 124, separator box 130 and first, second, third, and fourth solenoid valves 140, 146, 152 and 164 of the espresso machine 100.

Figure 3B:
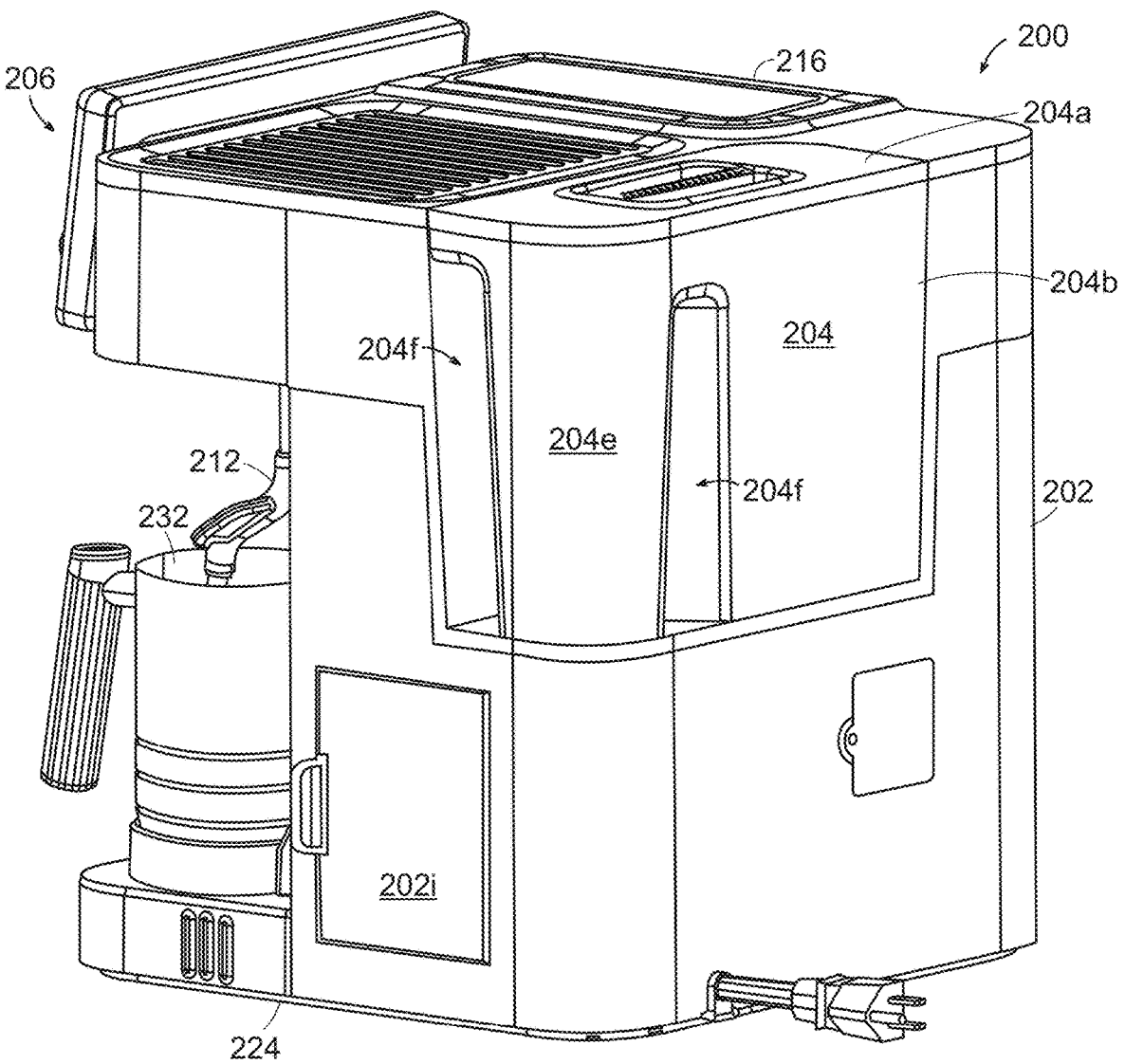
FIG. 3B is another perspective view of the espresso machine of FIG. 3A.
Figure 3C:
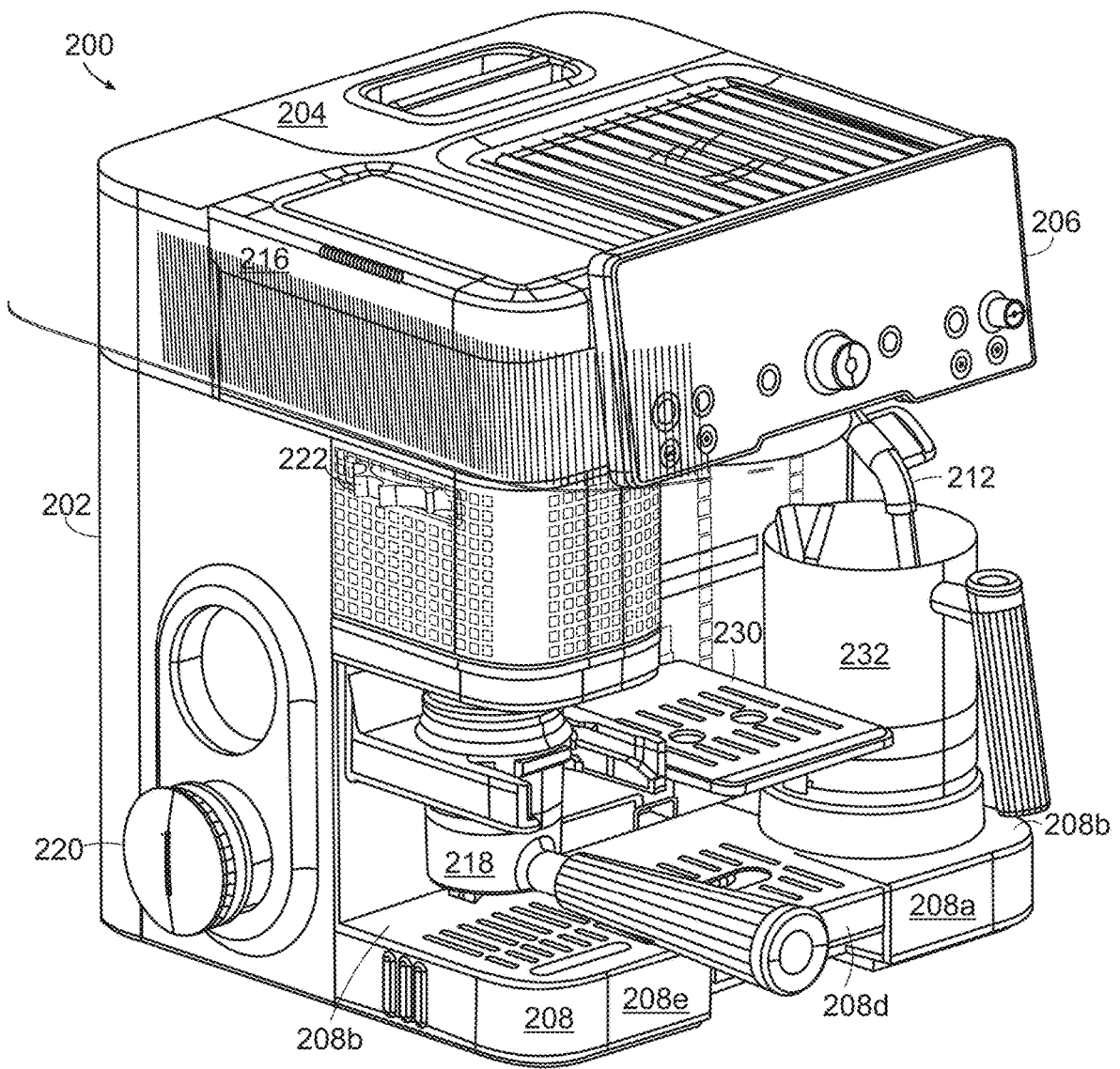
FIG. 3C is yet another perspective view of the espresso machine of FIG. 3A.
Figure 3D:
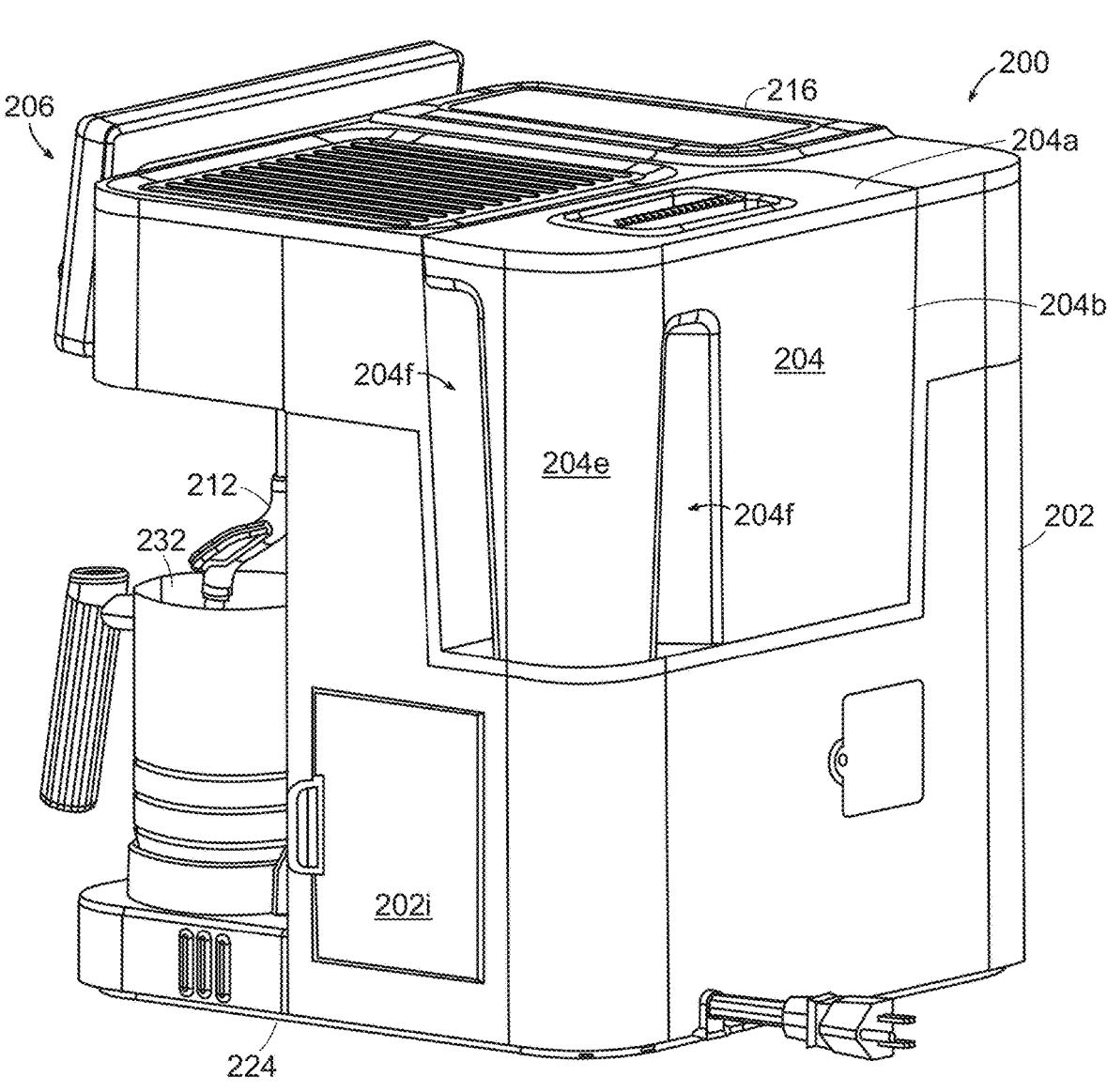
FIG. 3D is still another perspective view of the espresso machine of FIG. 3A.

As shown in FIGS. 3B and 3D, the housing 202 includes a base 224 configured to be positioned on a support surface (not shown in FIGS. 3B and 3D). The base 224 extends horizontally to allow the espresso machine 100 to rest on a horizontal support surface, such as a countertop.

Figure 3E:
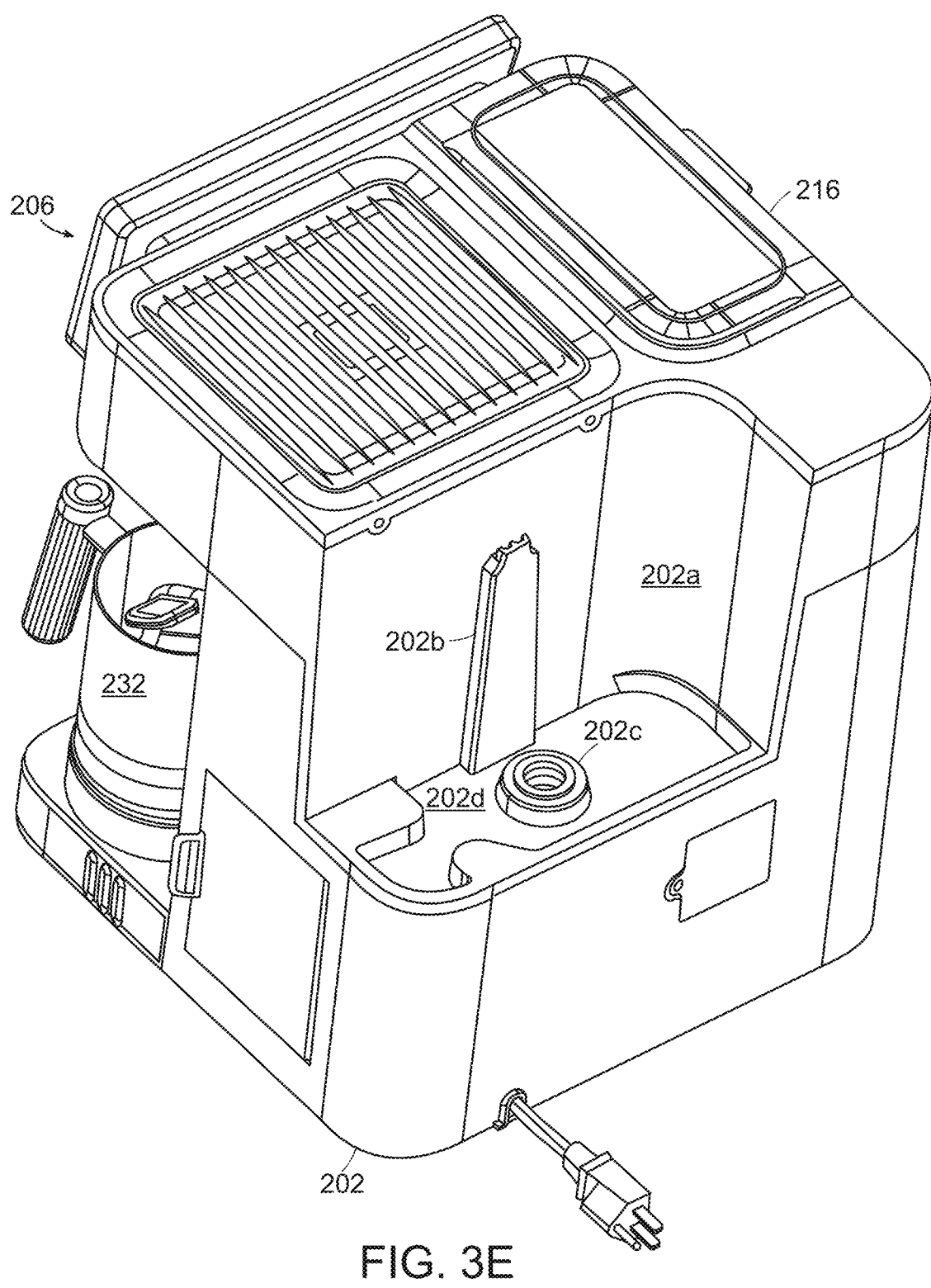
FIG. 3E is a another perspective view of the espresso machine of FIG. 3A with a water reservoir removed therefrom.

The water reservoir 204 in this illustrated implementation is removably coupled to the housing 202, but as mentioned above can instead be non-removably coupled to the housing 202. FIGS. 3A-3D show the espresso machine 200 with the water reservoir 204 coupled to the housing 202. FIG. 3E shows the espresso machine 200 with the water reservoir 204 removed therefrom. A space 202a defined by the housing 202 is configured to receive the reservoir 204 therein.

Figure 3F:
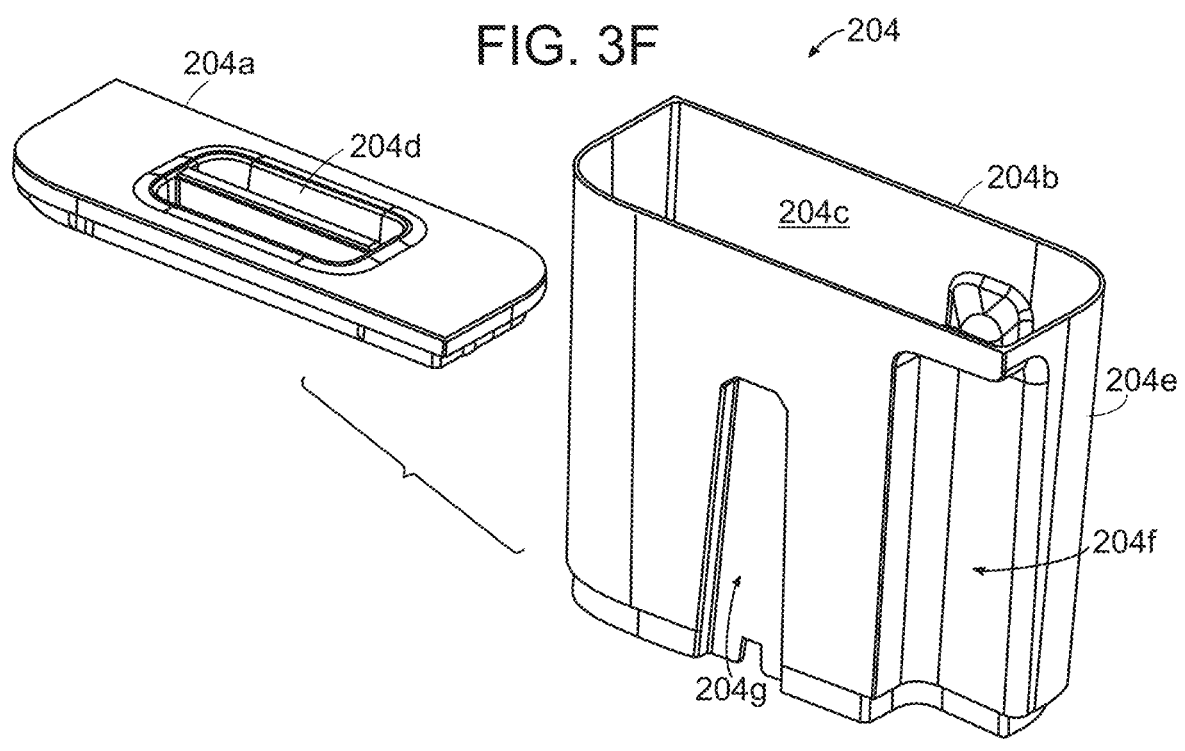
FIG. 3F is an exploded view of the water reservoir of the espresso machine of FIGS. 3A-3D.
Figure 3G:
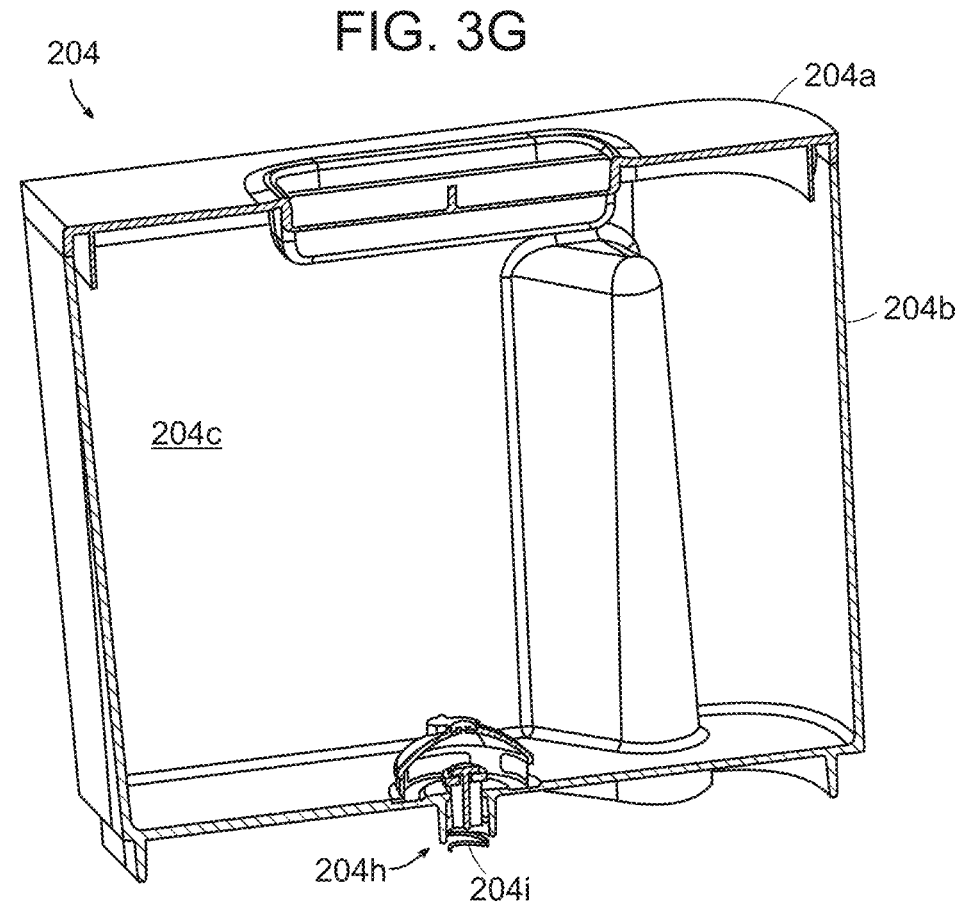
FIG. 3G is a cross-sectional perspective view of the water reservoir of the espresso machine of FIGS. 3A-3D.

FIGS. 3F and 3G show the reservoir 204 as a standalone element. FIG. 3F shows the reservoir 204 with a lid 204a of the reservoir 204 removed from a main body 204b of the reservoir 204 that defines a cavity 204c configured to hold water therein. FIGS. 3D and 3G show the reservoir 204 with the lid 204a coupled thereto. The reservoir lid 204a includes a handle 204d configured to be handheld by a user to facilitate removal of the lid 204a from the reservoir main body 204b and replacement of the lid 204a back on the main body 204b. The lid handle 204d can have other configurations. The reservoir lid 204a in this illustrated implementation is fully removable from the reservoir main body 204b to allow access to the reservoir cavity 204c. In other implementations, the reservoir lid 204a is configured to remain coupled to the reservoir main body 204b when removed to allow access to the reservoir cavity 204c, such as being hingedly attached to the main body 204b.

As shown in FIGS. 3D and 3F, the reservoir main body 204b includes a handle 204e configured to be handheld by a user to facilitate removal of the reservoir 204 (at least the main body 204b thereof) from the housing 202 and replacement of the reservoir 204 (at least the main body 204b thereof) back on the housing 202. The main body handle 204e is defined by opposed handholds 204f molded in the main body 204b. The main body handle 204e can have other configurations.

The espresso machine 200 includes a mating feature 202b configured to releasably mate with a mating element 204g of the reservoir 204. The mating feature 202b is a male member and the mating element 204g is a female member in this illustrated implementation, but instead the mating feature 202b can be a female member and the mating element 204g can be a male member. The mating of the mating feature 202b and the mating element 204g is configured to prevent the reservoir 204 from falling off the housing 202 and to help properly align an outlet valve 204h (see FIGS. 3G and 3H) of the reservoir 204 with a valve seat 202c (see FIG. 3E) of the housing 202. Additionally, a bottom of the reservoir 204 has a shape corresponding to a shape of a cut-out 202d formed in the housing 202 to further prevent the reservoir 204 from falling off the housing 202 and further help properly align the outlet valve 204h of the reservoir 204 with the valve seat 202c of the housing 202.

Figure 3H:
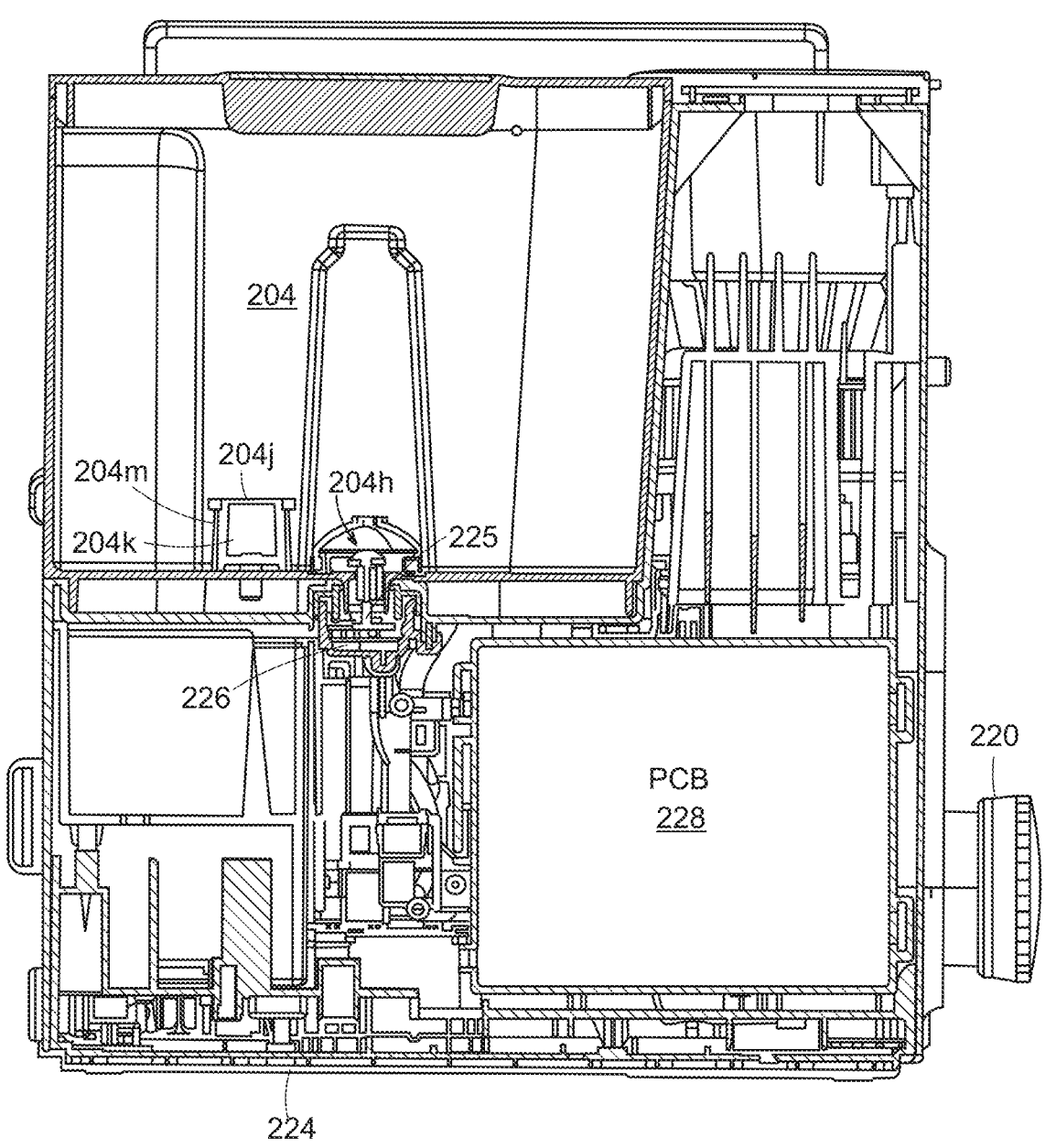
FIG. 3H is a cross-sectional rear view of the espresso machine of FIGS. 3A-3D.

As discussed above, the reservoir's outlet valve 204h is configured to automatically open when the reservoir 204 (at least the main body 204b thereof) is coupled to the housing 202 and to automatically close when the reservoir 204 (at least the main body 204b thereof) is removed from the housing 202. As shown in FIG. 3G, the outlet valve 204h is spring-loaded with a spring 204i. A biasing force provided to the outlet valve 204h by the spring 204i is configured to bias the outlet valve 204h to a closed position. The outlet valve 204h being seated on the valve seat 202c is configured to overcome the bias force provided by the spring 204i to move the outlet valve 204h from being closed to being open. As shown in FIG. 3H, the valve seat 202c includes a pin 225 configured to push on the outlet valve 204h when the reservoir 204 is seated in the space 202a defined by the housing 202 and the valve seat 202c seats the outlet valve 204h. The pin 225 pushing on the outlet valve 204h overcomes the spring's bias force.

As also discussed above, with the reservoir 204 (at least the main body 204b thereof) coupled to the housing 202, water stored in the reservoir 204, e.g., in the reservoir cavity 204c, is configured to be output from the reservoir 204 through the outlet valve 204h to a reservoir well 226 of the espresso machine 200, shown in FIG. 3H.

The reservoir 204 in this illustrated implementation includes a liquid level sensor 204j, as shown in FIG. 3H. The liquid level sensor 204j is configured to sense a level of liquid held in the reservoir 204. The liquid level sensor 204j is operably coupled to the controller of the espresso machine 200. In response to the controller receiving a signal from the water level sensor 204j, the controller is configured to cause a liquid level alert to be provided to a user, e.g., via the user interface 206, indicating low liquid level in the reservoir 204. The user may thereby be made aware that more liquid should be added to the reservoir 204.

The liquid level sensor 204j can have a variety of configurations. In this illustrated implementation, the liquid level sensor 204j includes a float 204k disposed in a housing 204m. The housing 204m has at least one opening therein configured to allow liquid in the reservoir 204 to enter the housing 204m. The float 204k is configured to float in liquid and is thus configured to float in the liquid within the housing 204m. The float 204k remains at a highest position within the housing 204m until the liquid level falls to a threshold level, at which time the float moves downward in the housing 204m as the liquid level falls below the threshold level. The liquid level sensor 204j includes a Hall effect sensor (obscured in FIG. 3H) that can "see" a magnet of the float 204k in the housing 204m until the float 204k moves downward in the housing 204m. The float 204k, e.g., the magnet thereof, moving out of the Hall effect sensor's line of sight trigger the Hall effect sensor to communicate a signal to the controller. In response to receiving the signal from the Hall effect sensor, the controller is configured to cause the liquid level alert to be provided to a user.

The pumping system of the espresso machine 200 is configured to pump water from the reservoir 204 to the heating system of the espresso machine 200, similar to that discussed above regarding the espresso machine 100 of FIG. 1A. The first flowmeter disposed in the fluid path between the reservoir 204 and the pumping system (e.g., the pump thereof) is configured to measure an amount of water flowing therethrough, and a controller of the espresso machine 200 is configured to control the pump based on the amount of water measured by the first flowmeter, also similar to that discussed above regarding the espresso machine 100 of FIG. 1A. In this illustrated implementation, as shown in FIG. 3H, the espresso machine 200 includes a PCB 228 that includes the controller, a memory, and other electronic components.

Similar to that discussed above regarding the espresso machine 100 of FIG. 1A, the controller of the espresso machine 200 is configured to control a flow path of water in the espresso machine 200, e.g., through various conduits (e.g., pipes, tubes, etc.) and other elements, so water is directed appropriately for its user-selected purpose of hot water, cold water, espresso, or steamed milk.

Figure 3I:
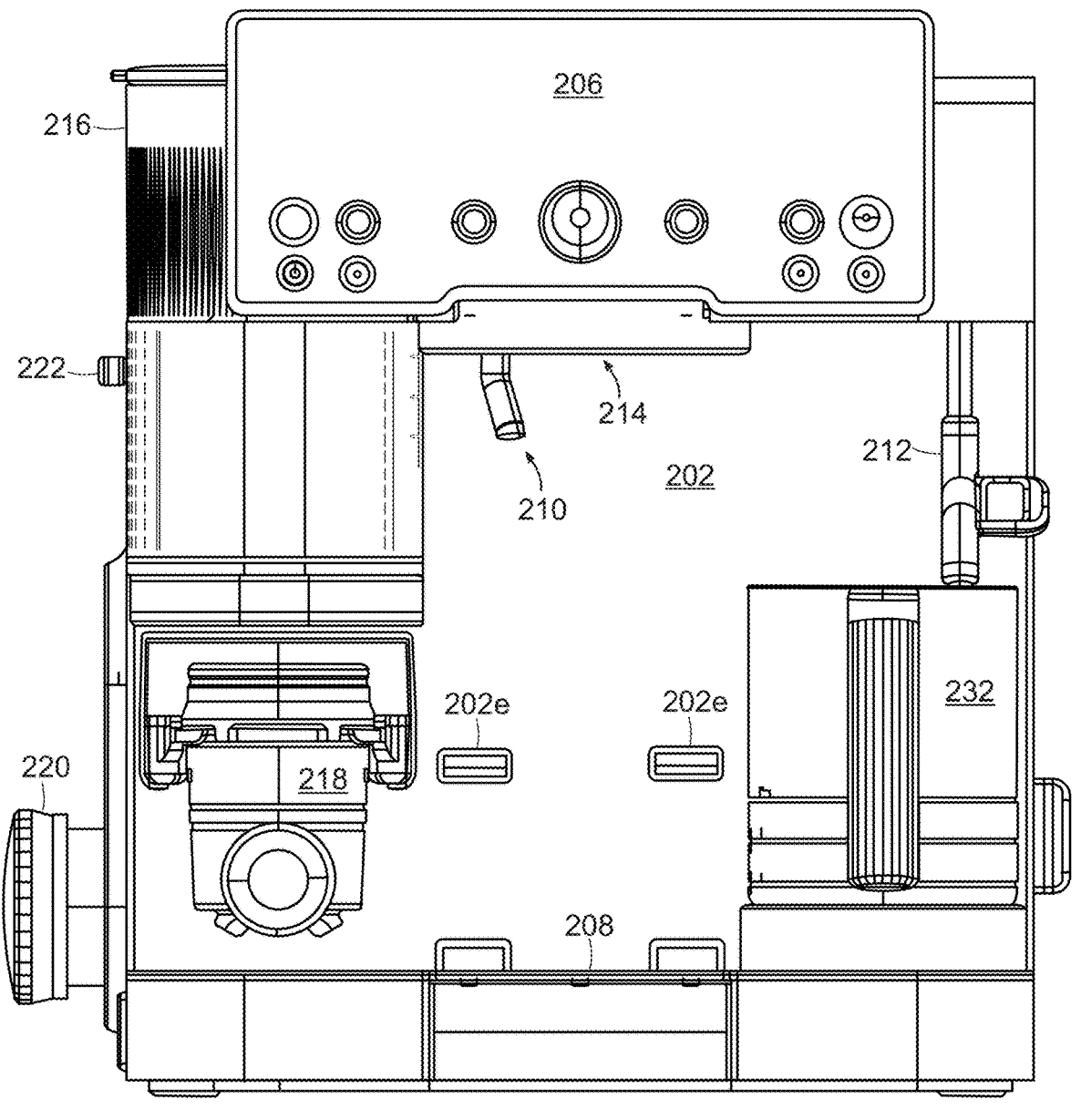
FIG. 3I is a front view of the espresso machine of FIGS. 3A-3D with a movable tray removed therefrom.
Figure 3J:
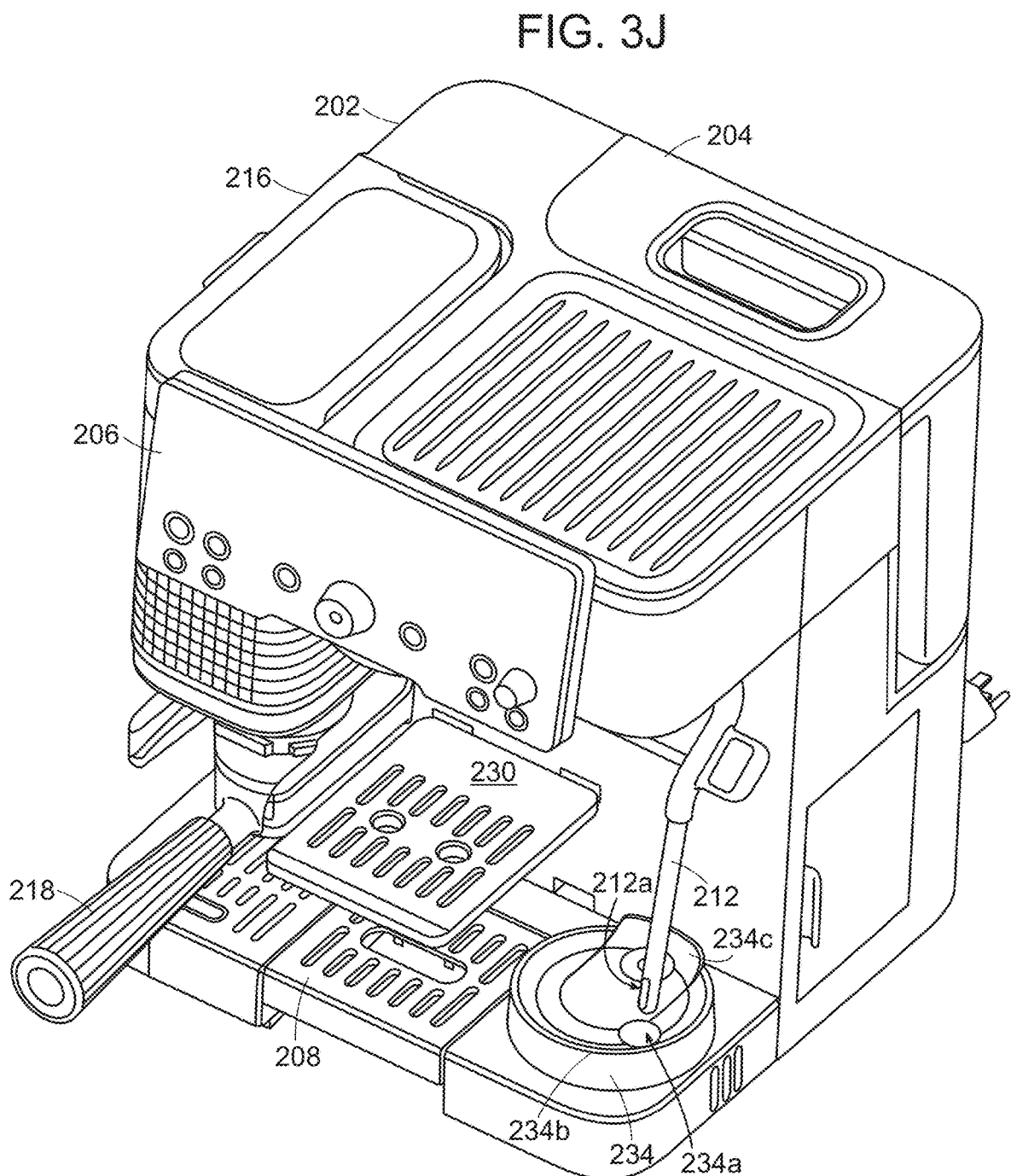
FIG. 3J is a perspective view of the espresso machine of FIGS. 3A-3D without a milk receptacle seated on a milk receptacle base of the espresso machine.

The hot water outlet 210 is configured to have a cup or other container positioned by a user below the hot water outlet 210 into which the hot water is dispensed from the hot water outlet 210. As shown in FIG. 3B, in this illustrated implementation the hot water outlet 210 is positioned above the drip tray 208 to allow any water drips from the hot water outlet 210 to collect in the drip tray 208 if a container is not positioned below the hot water outlet 210. A container is configured to be positioned below the hot water outlet 210 at a user's discretion on either the drip tray 208 or on a movable tray 230. FIG. 3A shows the movable tray 230 coupled to the housing 202. FIG. 3I shows the espresso machine 200 with the movable tray 230 removed therefrom. The movable tray 230 is configured to be used with smaller containers so the container placed on the movable tray 230 is closer to the hot water outlet 210 than if the container was placed on the drip tray 208 without the movable tray 230 being present. The movable tray 230 includes at least one opening therein (a plurality of openings are shown in FIGS. 3A-3C) that is configured to allow water to pass therethrough and reach the drip tray 208 under the force of gravity. With the movable tray 230 removed from the espresso machine 200, a container can be placed on the drip tray 208 to receive hot water therein from the hot water outlet 210.

The movable tray 230 can be configured to be coupled to the espresso machine 200 in a variety of ways. In this illustrated implementation, the movable tray 230 includes a pair of tabs configured to be releasably seated in a pair of openings 202e formed in the housing 202. The movable tray 230 is thus configured to be fully removed from the espresso machine 200. In other implementations, the movable tray 230 is configured to remain coupled to the housing 202 and to be moved out of the way to allow a larger container to be placed on the drip tray 208, such as by the movable tray being hingedly attached to the housing 202 and configured to be flipped (e.g., flipped up, etc.) out of the way by a user.

The drip tray 208 is removably coupled to the housing 202 in this illustrated implementation. However, similar to that discussed above with respect to the espresso machine 100 of FIG. 1A, the drip tray 208 can instead be non-removably coupled to the housing 202.

The drip tray 208 in this illustrated implementation includes a base 208a and a lid 208b removably coupled to the base 208a, as shown in FIG. 3C. The base 208a and the lid 208b are configured to be removed as a unit from the housing 202 and re-coupled as a unit back to the housing 202. The lid 208b is configured to help contain contents that have collected within a cavity 208c defined by the base 208a (see FIG. 3N) until emptying and/or cleaning of the drip tray 208 is desired.

The base 208a of the drip tray 208 can be a singular element. Alternatively, as in this illustrated implementation, the base 208a can include a plurality of elements with at least one of the base elements removably coupled to other(s) of the base elements. The base 208a includes a first portion 208d removably coupled to a second portion 208e of the base 208a. As shown in FIG. 3C, the first portion 208d of the drip tray 208 underlies the movable tray 230 (or the area where the movable tray 230 would be located if not currently coupled to the housing 202). The first portion 208d of the drip tray 208 being removable from the second portion 208e of the drip tray 208 allows a taller container to be placed under the group head 214 than is possible with the first portion 208d of the drip tray 208 removably coupled to the second portion 208e of the drip tray 208.

Similar to that discussed above with respect to the espresso machine 100 of FIG. 1A, the steam frother arm 212 of the espresso machine 200 of FIGS. 3A-3D is configured to form and direct steam into a milk tin 232 containing milk therein. The illustrated milk tin 232 is merely an example, as other milk receptacles may be used. FIGS. 3A-3E and 3I show the milk tin 232 positioned under the steam frother arm 212. FIG. 3J shows no milk receptacle positioned under the steam frother arm 212.

As shown in FIG. 3J, an exit opening 212a of the steam frother arm 212 is positioned above the drip tray 208, which may allow any water drips from the steam frother arm 212 to collect in the drip tray 208 if the milk tin 232 (or other milk receptacle or other container) is not positioned below the exit opening 212a of the steam frother arm 212. FIG. 3J also shows a milk receptacle base 234 of the espresso machine 200 that is configured to seat the milk tin 232 (or other milk receptacle) thereon. The milk receptacle base 234 has an opening 234a formed therein that underlies the exit opening 212a of the steam frother arm 212 to allow any water drips from the exit opening 212a to pass through the base's opening 234a and into the drip tray 208 (see also FIG. 3N). With the milk tin 232 (or other milk receptacle or other container) seated on the milk receptacle base 234, the milk tin 232 covers the opening 234a.

The milk receptacle base 234 has a rib 234b extending around a partial circumference of the milk receptacle base 234 at a top thereof. The rib 234b is configured to help constrain the milk tin 232 (or other milk receptacle or other container) to the milk receptacle base 234. The milk receptacle base 234 also has a lip 234c extending substantially vertically from the top of the milk receptacle base 234 at a rear of the milk receptacle base 234. The lip 234c is configured to help constrain the milk tin 232 (or other milk receptacle or other container) to the milk receptacle base 234 and is configured as a stop surface since a user's natural action in placing the milk tin 232 (or other milk receptacle or other container) on the milk receptacle base 234 may be with the user facing the espresso machine 200 and moving the milk tin 232 (or other milk receptacle or other container) onto the milk receptacle base 234 by moving the milk tin 232 (or other milk receptacle or other container) to the milk receptacle base 234 in a rearward direction.

Figure 3K:
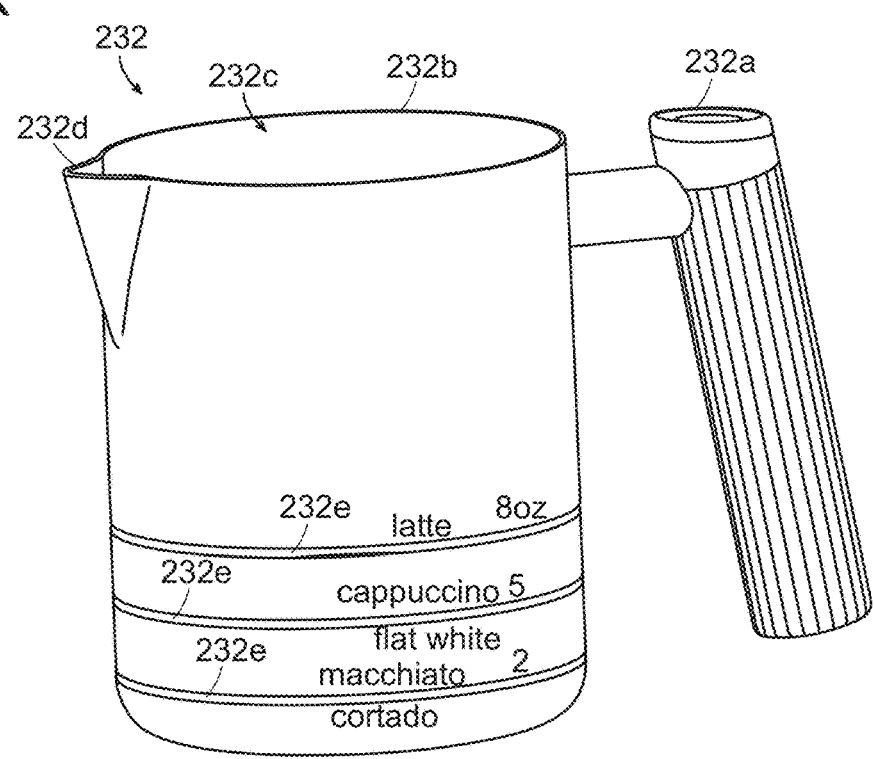
FIG. 3K is a perspective view of one implementation of a milk receptacle also illustrated in FIGS. 3A-3E seated on the milk receptacle base of the espresso machine.

FIG. 3K shows the milk tin 232 as a standalone element. The milk tin 232 includes a handle 232a and a main body 232b. The milk tin's main body 232b defines a cavity 232c configured to hold milk therein. The milk tin's main body 232b includes a spout portion 232d configured to facilitate pouring contents out of the milk tin's cavity 232c.

Figure 3L:
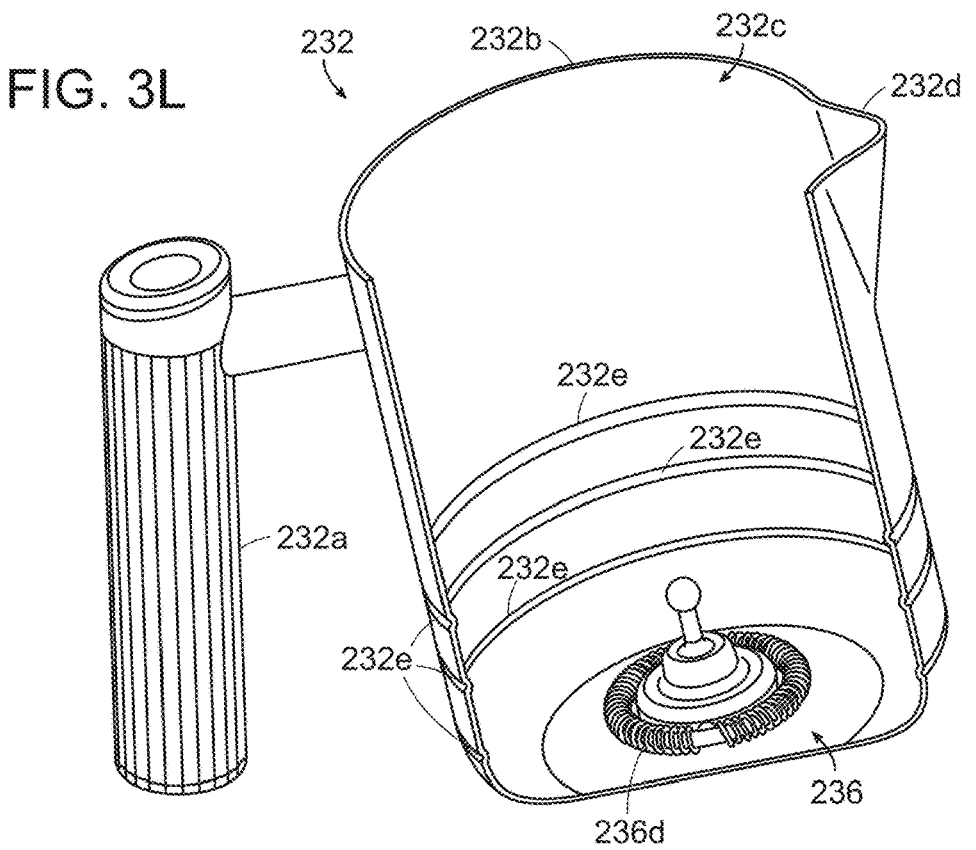
FIG. 3L is a cross-sectional perspective view of the milk receptacle of FIG. 3K.
Figure 3M:
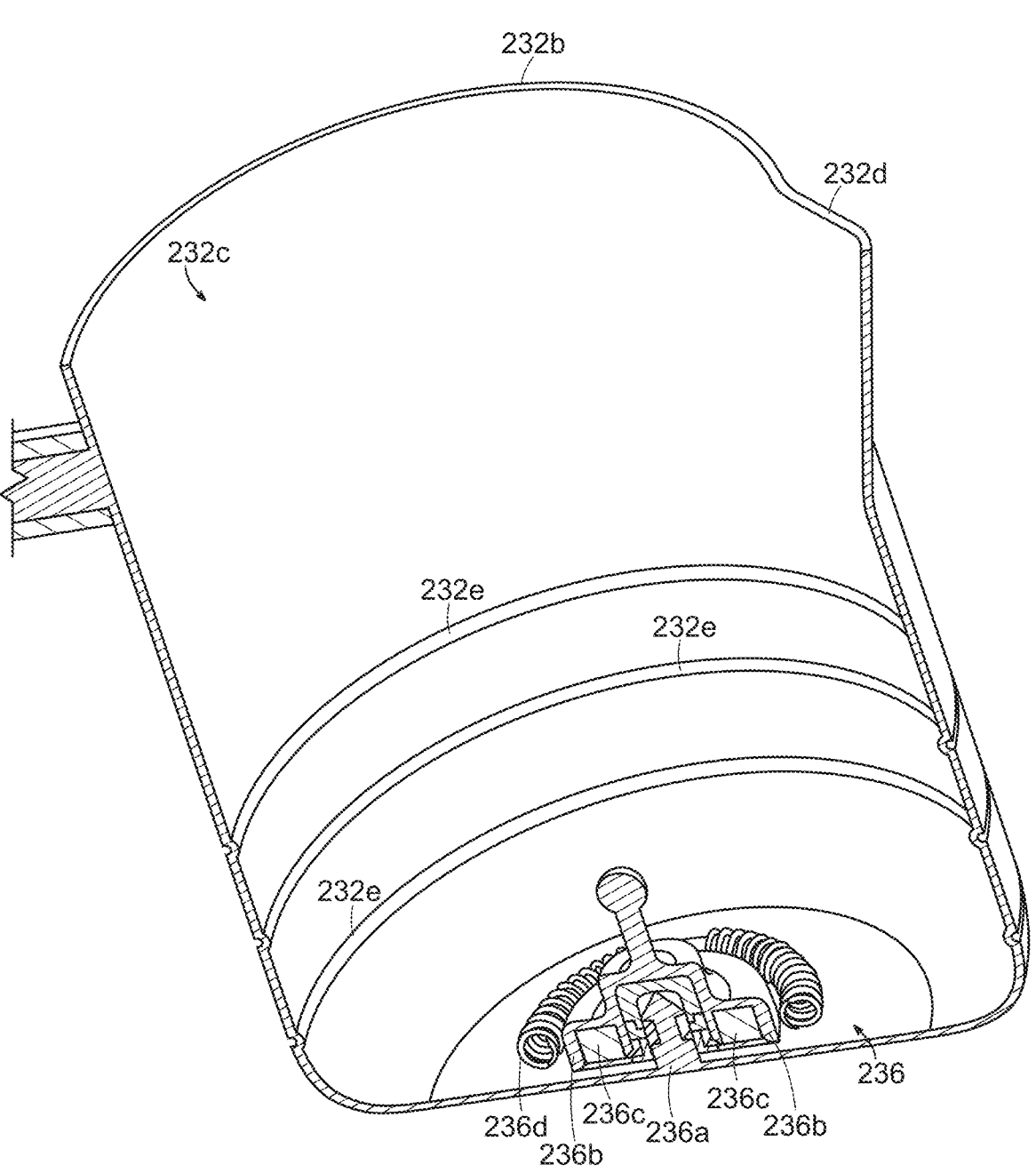
FIG. 3M is a partial, cross-sectional perspective view of the milk receptacle of FIG. 3K.

An exterior of the milk tin's main body 232b includes fill lines 232e configured to indicate milk fill levels for different types of beverages. In this illustrated implementation, the milk tin 232b includes three fill lines 232e: a 2 oz fill line 232e for a macchiato or a cortado, a 5 oz fill line 232e for a cappuccino or a flat white, and an 8 oz fill line 232e for a latte. As shown in FIGS. 3L and 3M, the fill lines 232e are also visible in an interior of the milk tin 232, e.g., within the cavity 232c. In this illustrated implementation, the fill lines 232e are each an indented ring extending around the milk tin 232. However, the fill lines 232e can have other configurations, e.g., printed lines on the milk tin 232, lines embossed in the milk tin 232, etc.

Figures 3N, 3O:
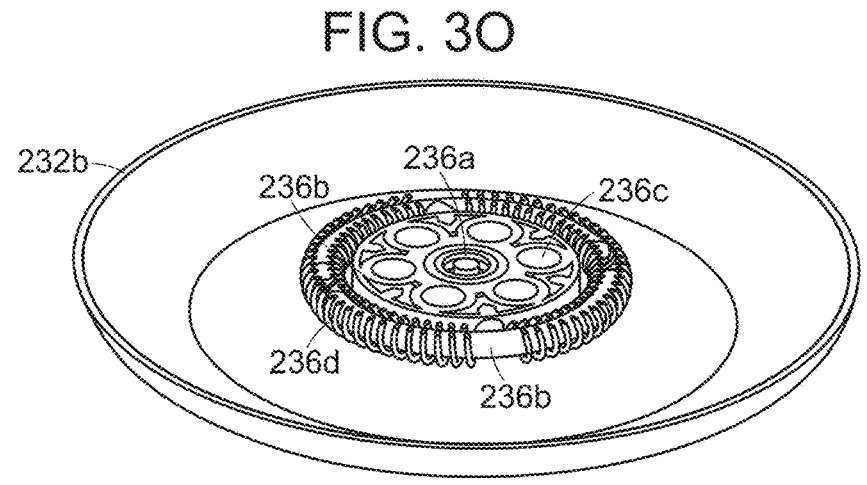
FIG. 3N is a cross-sectional perspective view of a portion of the milk receptacle and a portion of the espresso machine of FIGS. 3A-3D.
FIG. 3O is another cross-sectional perspective view of the milk receptacle of FIG. 3K.

As shown in FIG. 3N, with the milk tin 232 seated on the milk receptacle base 234, the steam frother arm 212 is configured to extend into the milk tin 232 with the exit opening 212a of the steam frother arm 212 positioned within the milk tin's cavity 232c. The milk tin 232 and the steam frother arm 212 have relative sizes to allow the steam frother arm 212 to extend down at least to a lowermost one of the fill lines 232e (the 2 oz fill line 232e in this illustrated implementation) since a user should be filling the milk tin 232 at least up to the lowermost one of the fill lines 232e.

As discussed above, steam delivered into the milk tin 232, e.g., into the milk tin's cavity 232c, is configured to be distributed through the milk in the milk tin 232, along with air, using a mechanical mixer to form steamed milk (also referred to herein as "frothed milk"). In this illustrated implementation, the mechanical mixer includes a whisk 236 of the milk tin 232 that is configured to rotate within the milk tin 232, e.g., within the milk tin's cavity 232c. The whisk 236 is located at a bottom of the milk tin 232 to help ensure that the whisk 236 is in direct contact with any milk in the milk tin 232. The whisk 236 includes a central post 236a, a base 236b, at least one magnet 236c, and an agitator 236d. The base 236b, the at least one magnet 236c, and the agitator 236d are configured to rotate as a unit about a longitudinal axis defined by the central post 236a, as discussed further below. The at least one magnet 236c is disposed in the base 236b and, with the at least one magnet 236c including a plurality of magnets in this illustrated implementation, is arranged circumferentially around the central post 236a. The whisk 236 includes six magnets 236c in this illustrated implementation, as shown in FIG. 3O, but another number of magnets 236 may be used, e.g., one, two, three, etc.

The whisk 236 of the milk tin 232 is configured to interact with a whisk driver 238 of the espresso machine 200 (see FIG. 3N). With the milk tin 232 seated in the milk receptacle base 234, the whisk driver 238 is configured to drive the rotation of the base 236b, the at least one magnet 236c, and the agitator 236d such that the agitator 236 agitates milk contained the milk tin 232 to froth the milk. The agitator 236 includes a coil in this illustrated implementation but can have another configuration.

The whisk driver 238 includes a motor 238a, a base 238b, and at least one magnet (obscured in FIG. 3N) seated in the whisk driver base 238b. The motor 238a is seated in a motor support 238c. The whisk driver base 238b and the at least one magnet of the whisk driver 238 are configured to rotate as a unit about a longitudinal axis defined by the motor 238a and the whisk driver base 238b. The motor 238a is operably coupled to the whisk driver base 238b such that the motor 238a is configured to drive the rotation of the whisk driver base 238b and the at least one magnet seated in the whisk driver base 238b. In an exemplary implementation, the whisk driver 238 includes a same number of magnets as the milk tin 232, which may facilitate rotation of the whisk driver base 236b, the at least one magnet 236c, and the agitator 236d by allowing each one of the whisk driver's one or more magnets to be magnetically attracted with one of the milk tin's one or more magnets 236c. The whisk driver 238 includes six magnets in this illustrated implementation to correspond to the milk tin's six magnets 236c. The whisk driver's at least one magnet is disposed in the whisk driver base 238b and, with the at least one magnet including a plurality of magnets in this illustrated implementation, is arranged circumferentially.

The whisk driver 238 is located in the espresso machine 200 such that, with the milk tin 232 seated in the milk receptacle base 234, the whisk driver 238 is vertically aligned with the milk tin 232 located above the whisk driver 238, as shown in FIG. 3N. With the milk tin 232 seated in the milk receptacle base 234, the motor 238a is configured to drive the rotation of the whisk driver base 238b and the at least one magnet seated in the base 238b, e.g., under the control of the espresso machine's controller. The whisk driver's at least one magnet is magnetically attracted with the at least one magnet 236c of the whisk 236 such that the rotation of the whisk driver's at least one magnet causes the at least one magnet 236c of the whisk 236 to rotate along with the whisk base 236b and the agitator 236d. If each of the one or more magnets of the whisk driver 238 is not aligned with one of the one or more magnets 236c of the whisk 236 when the milk tin 232 is initially placed on the milk receptacle base 234, each of the one or more magnets of the whisk driver 238 will tend to become aligned with one of the one or more magnets 236c of the whisk 236 during their simultaneous rotation.

Figure 3P:
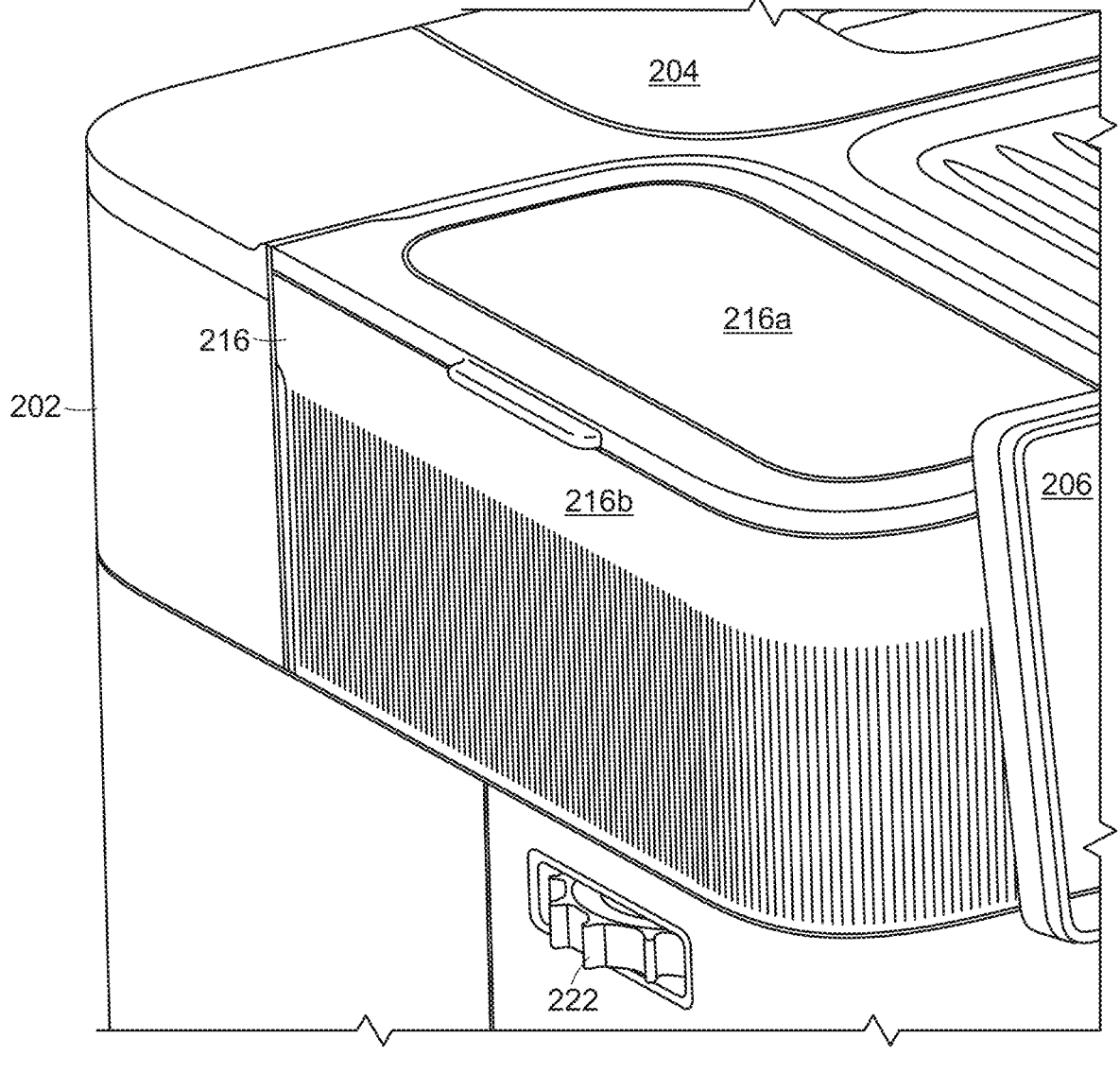
FIG. 3P is a partial, perspective view of the espresso machine of FIGS. 3A-3D.
Figure 3Q:
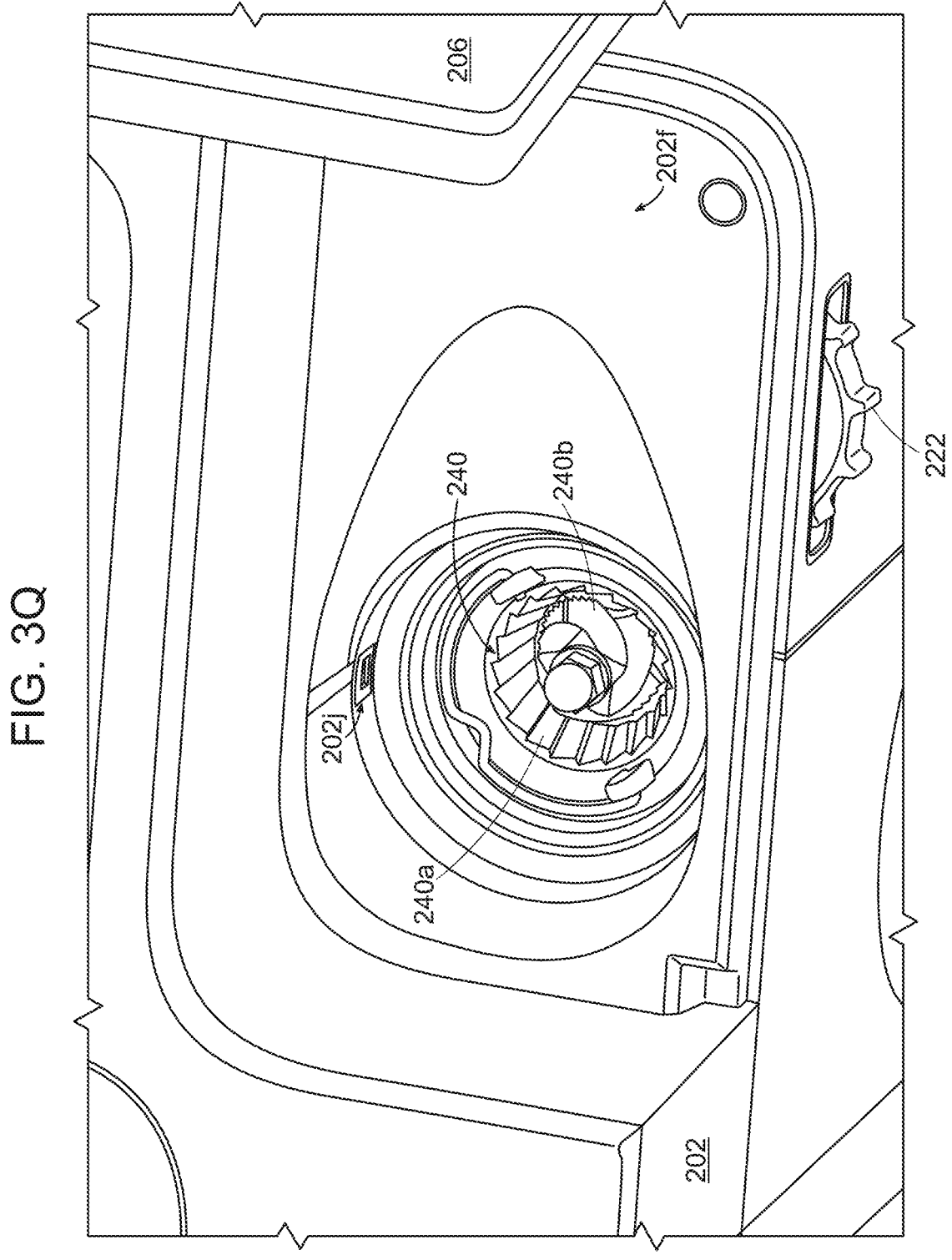
FIG. 3Q is a partial, perspective view of the espresso machine of FIGS. 3A-3D with a hopper removed therefrom.
Figure 3R:
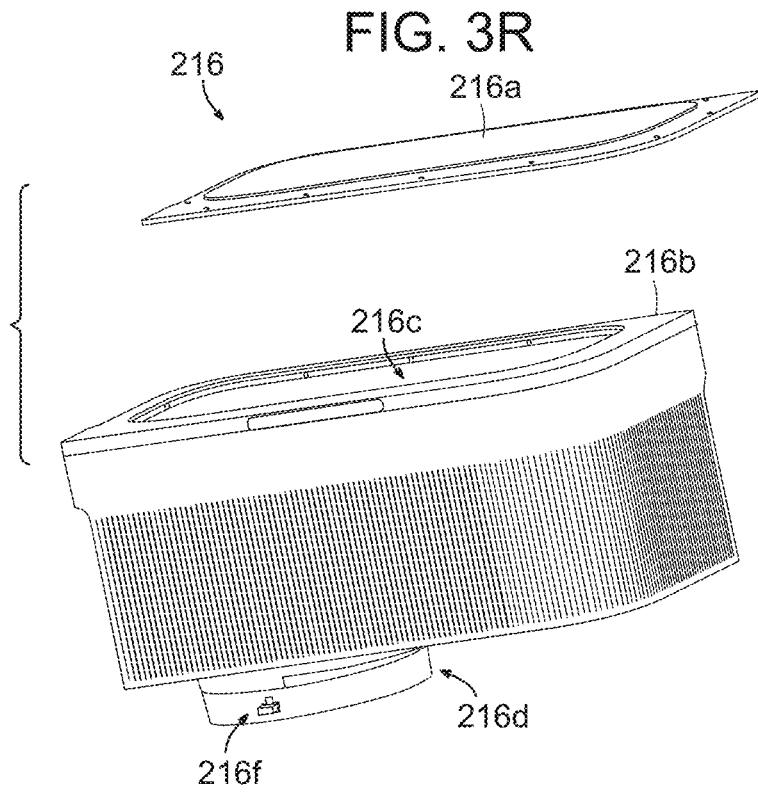
FIG. 3R is an exploded view of the hopper of the espresso machine of FIGS. 3A-3D.
Figure 3S:
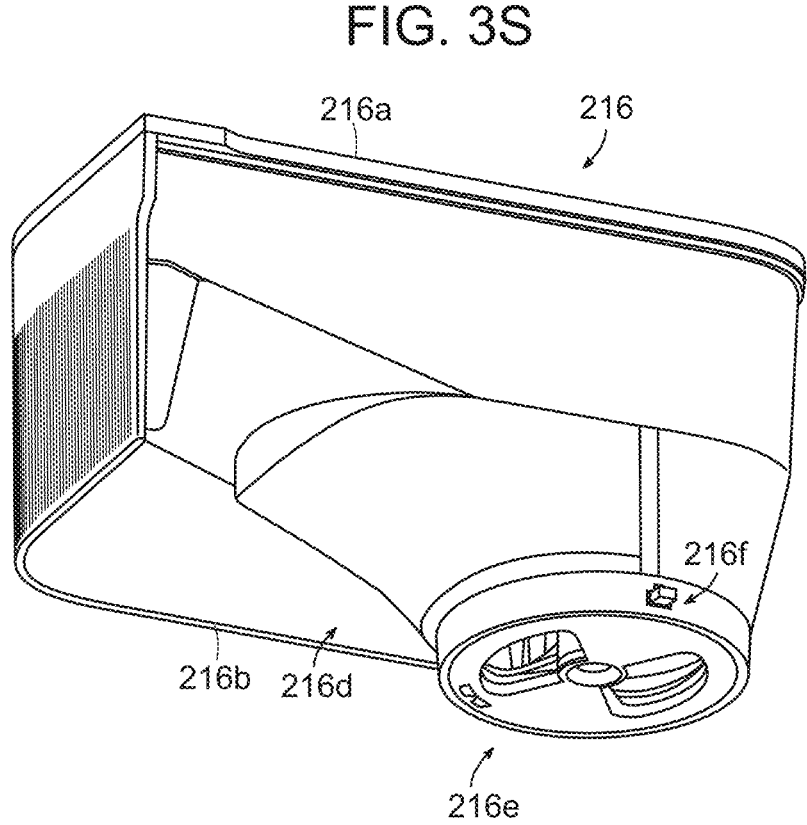
FIG. 3S is a perspective view of the hopper of the espresso machine of FIGS. 3A-3D.
Figure 3T:
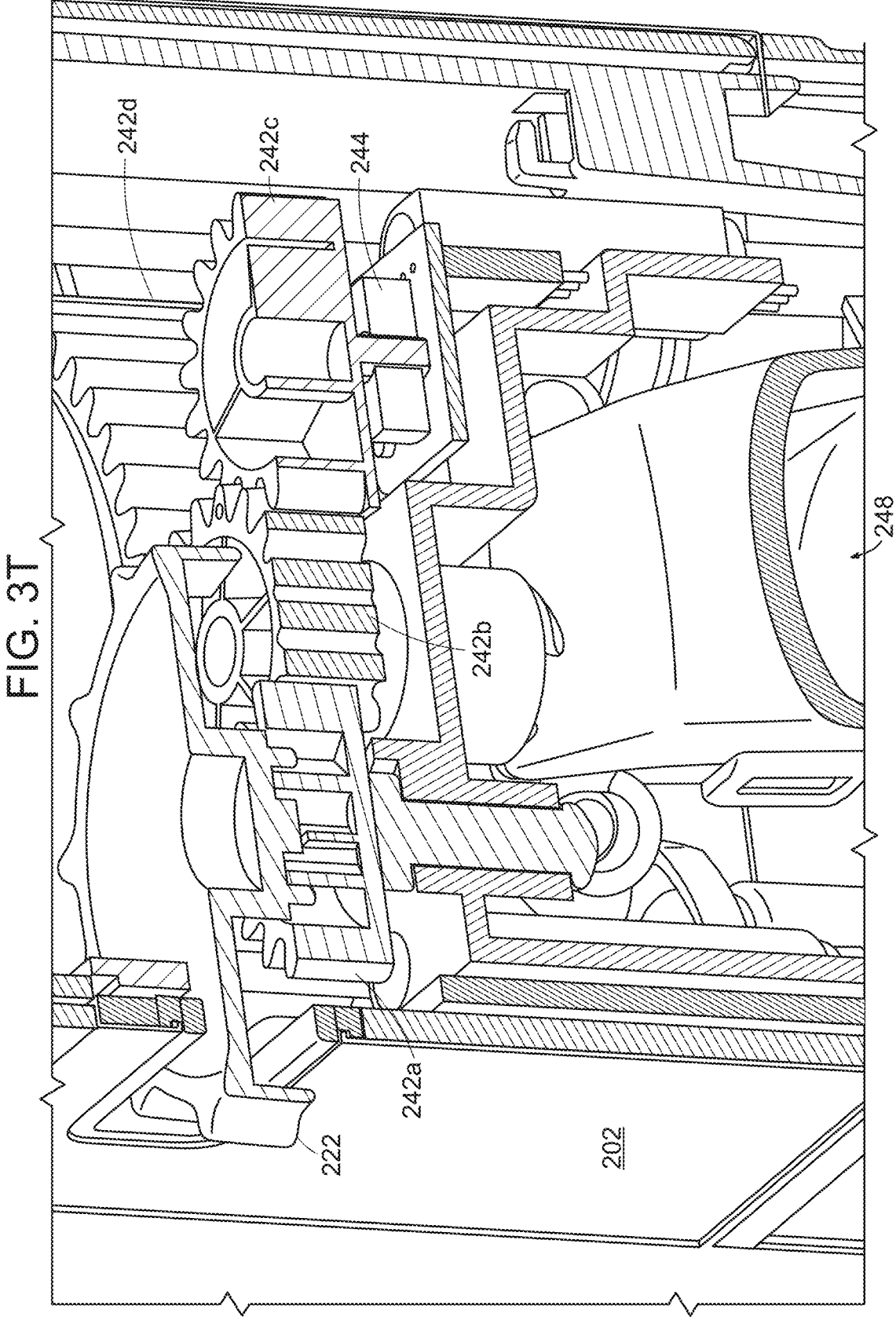
FIG. 3T is a cross-sectional perspective view of a portion of the espresso machine of FIGS. 3A-3D.
Figure 3U:
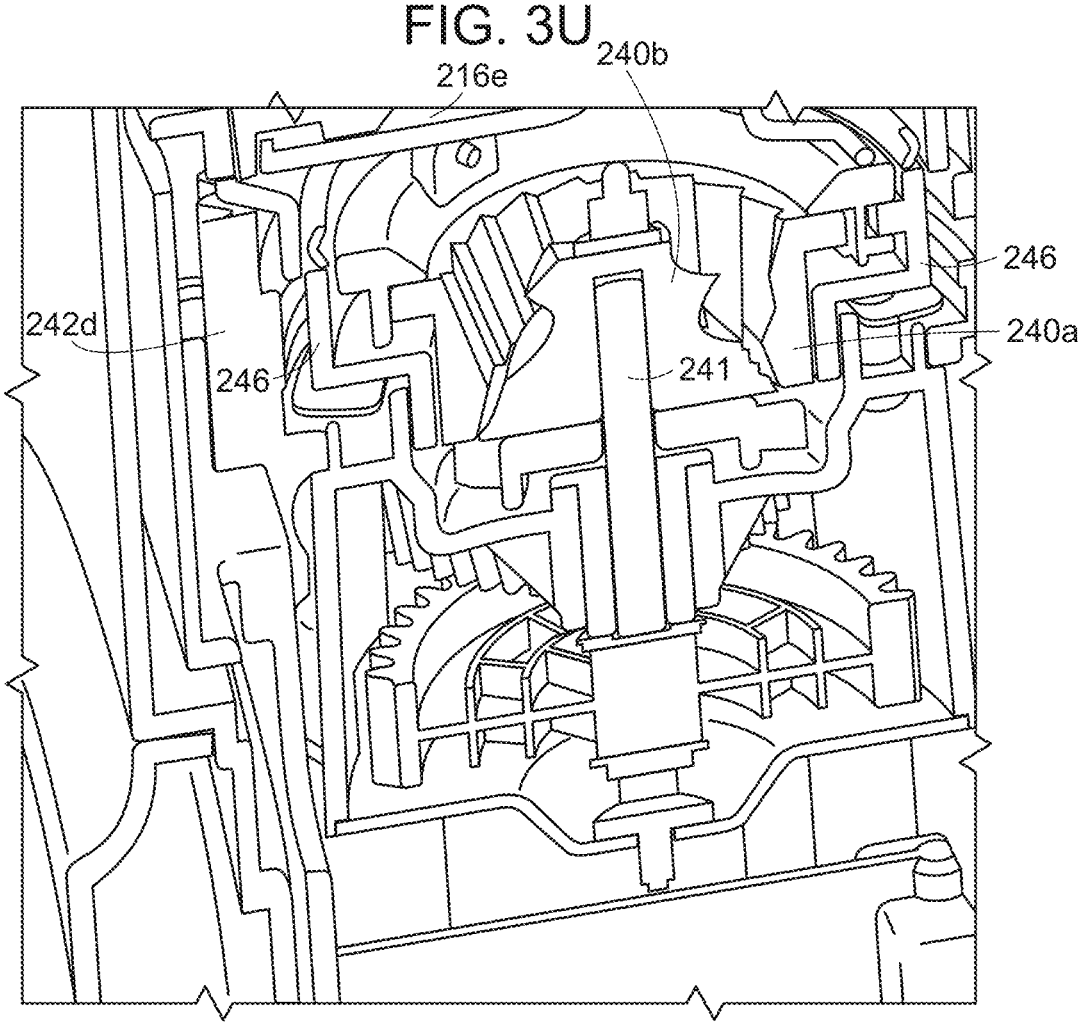
FIG. 3U is another cross-sectional perspective view of a portion of the espresso machine of FIGS. 3A-3D.
Figure 3V:
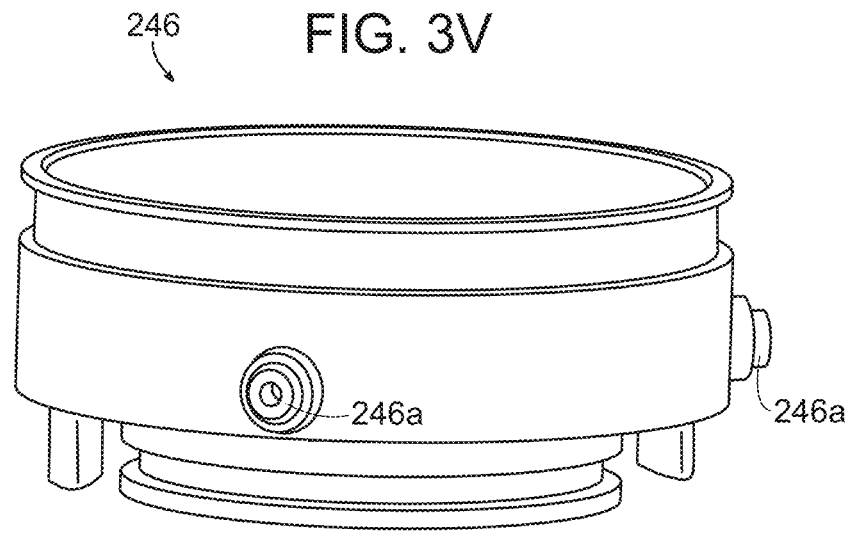
FIG. 3V is a perspective view of a carriage of the espresso machine of FIGS. 3A-3D.
Figure 3W:
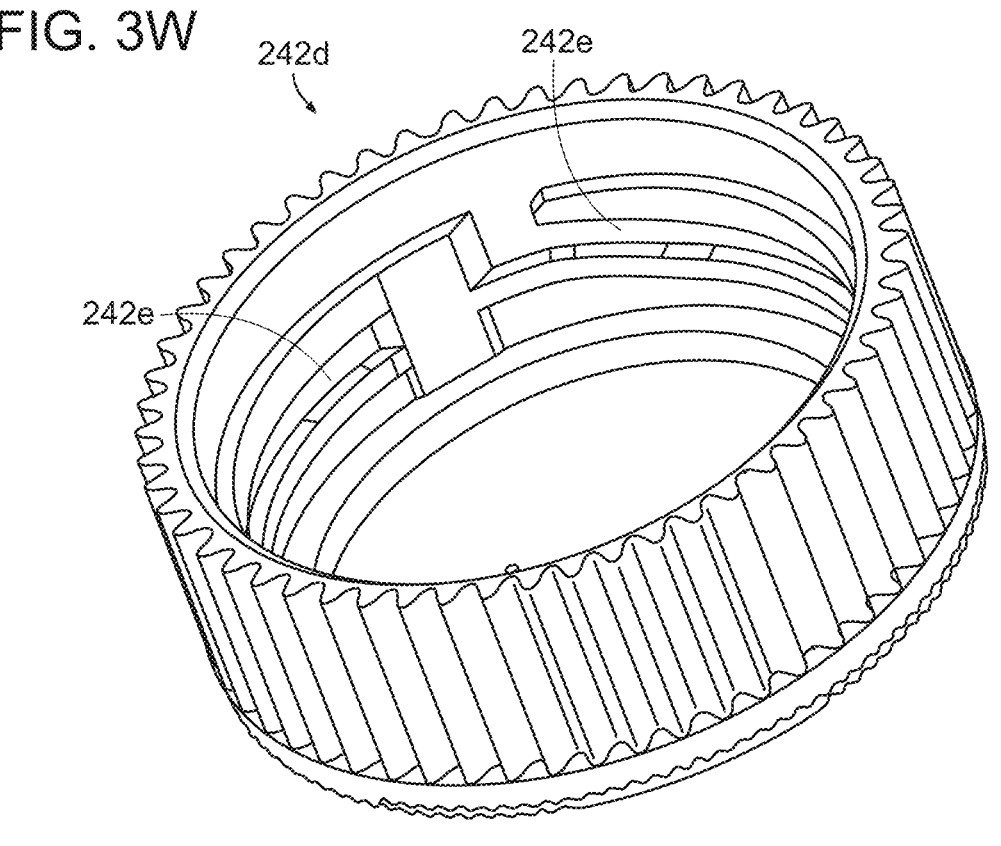
FIG. 3W is a perspective view of a gear of the espresso machine of FIGS. 3A-3D.
Figure 3X:
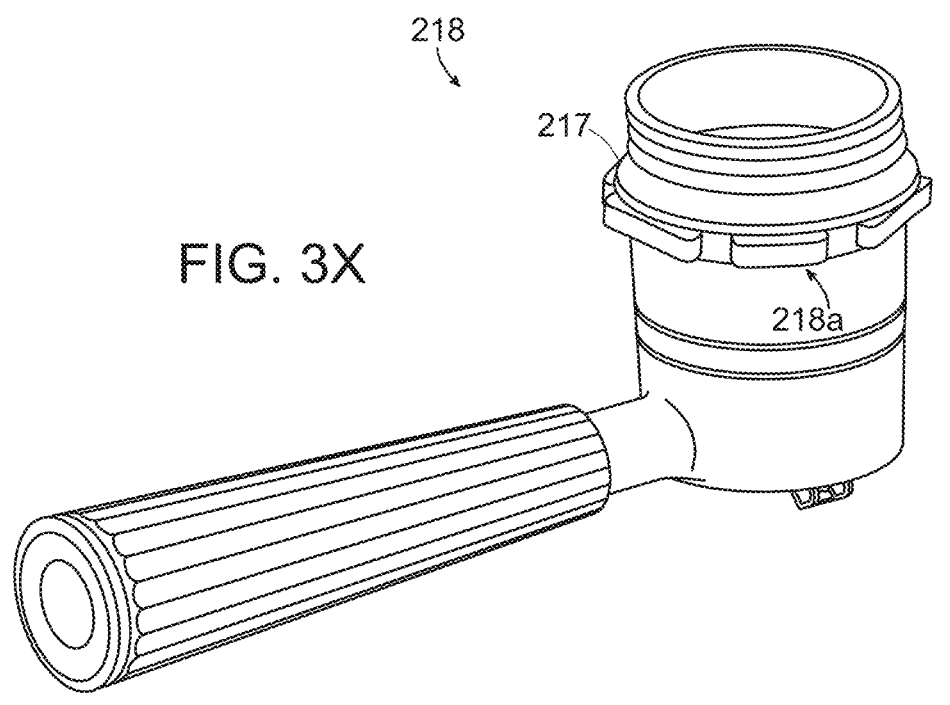
FIG. 3X is a perspective view of a portafilter of the espresso machine of FIGS. 3A-3D.
Figures 3Y, 3Z:
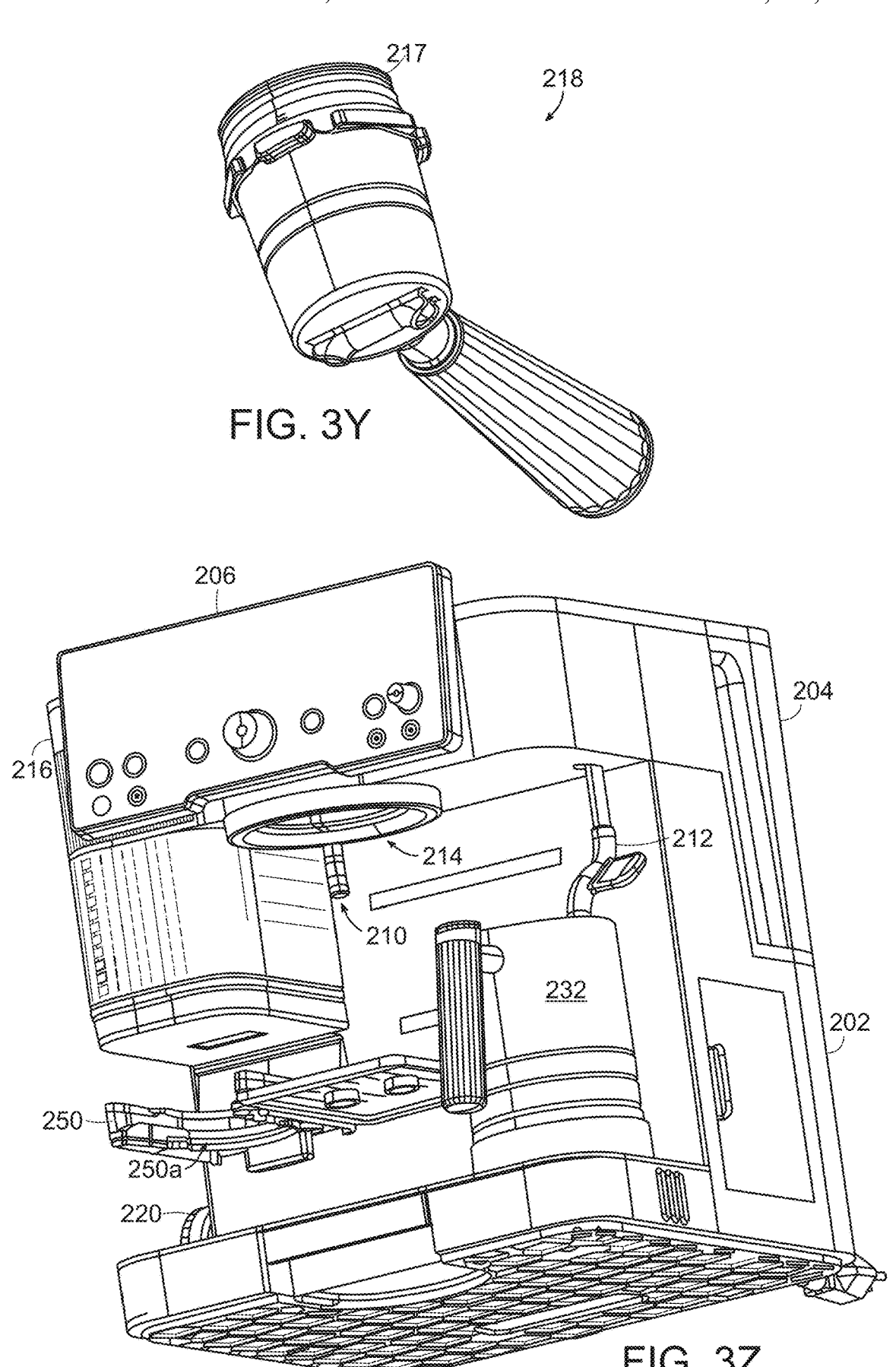
FIG. 3Y is another perspective view of a portafilter of FIG. 3X.
FIG. 3Z is a perspective view of the espresso machine of FIGS. 3A-3D with the portafilter of FIGS. 3X and 3Y removed therefrom.
Figure 3A:
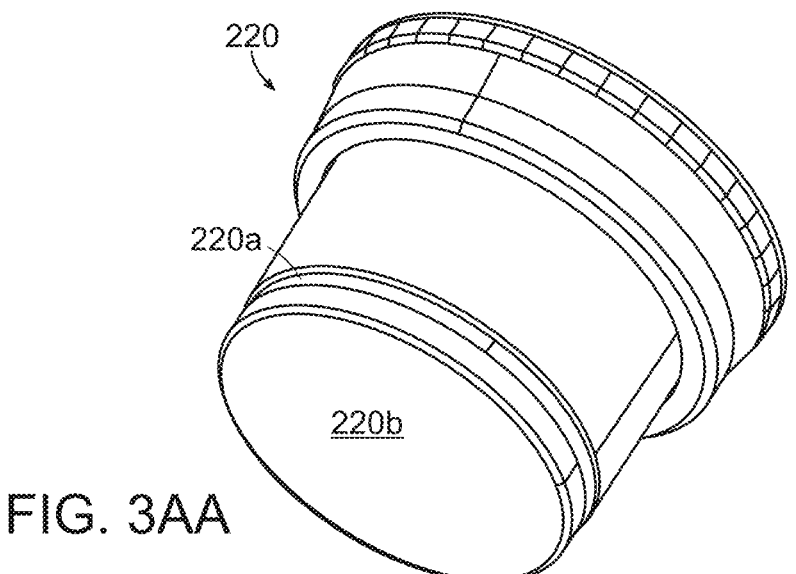
FIG. 3A is a perspective view of one implementation of an espresso machine.
Figure 3B:
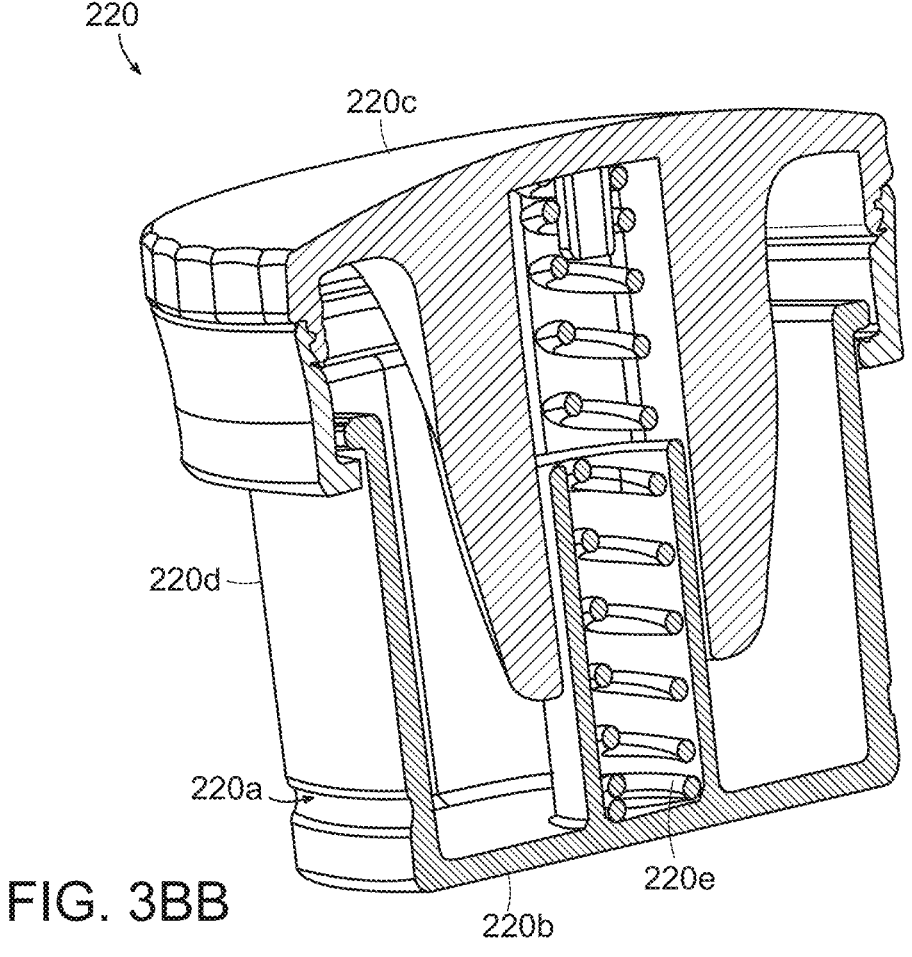
Figure 3C:
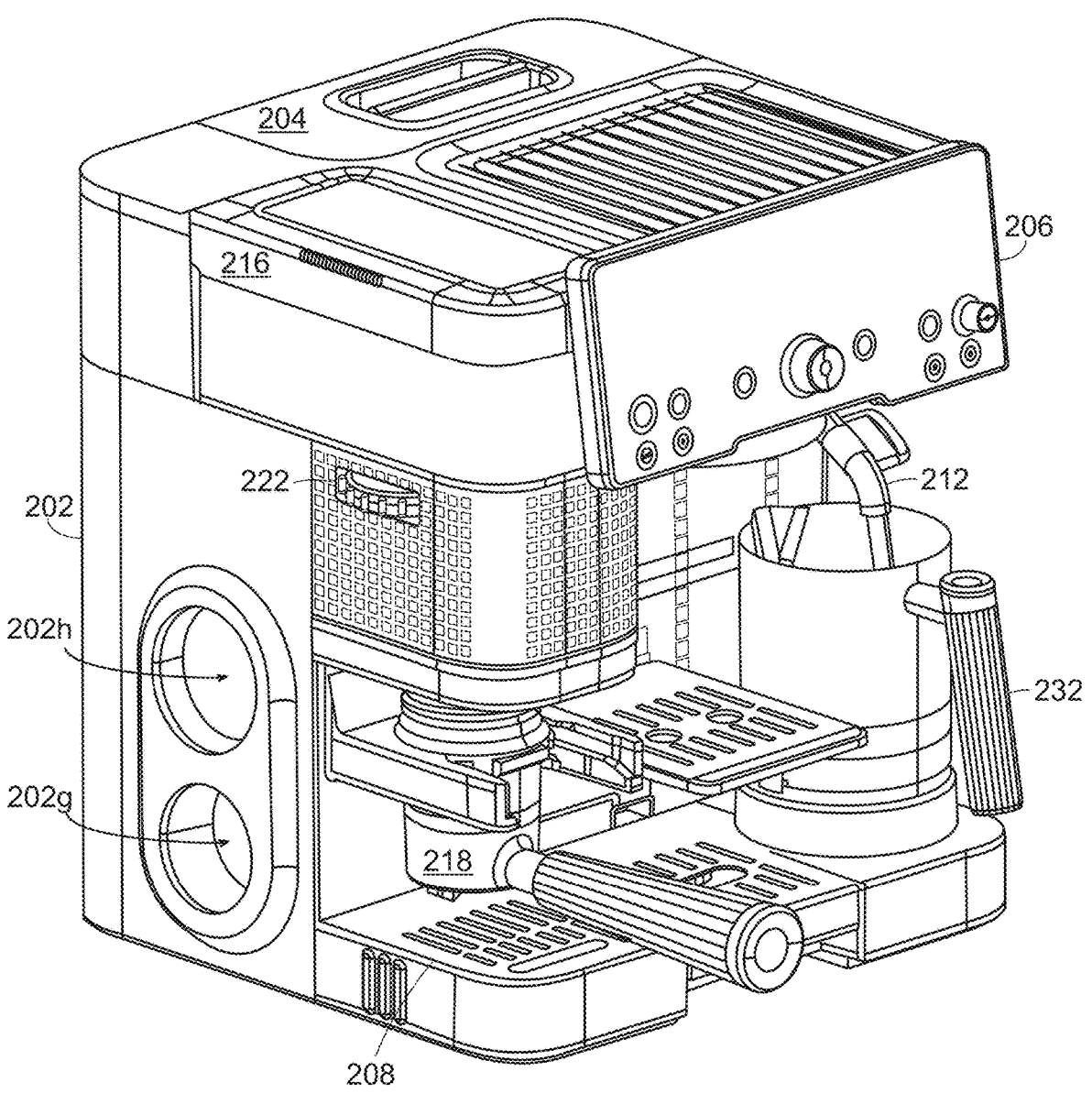
Figures 3D, 3E, 3F, 3G, 3H:
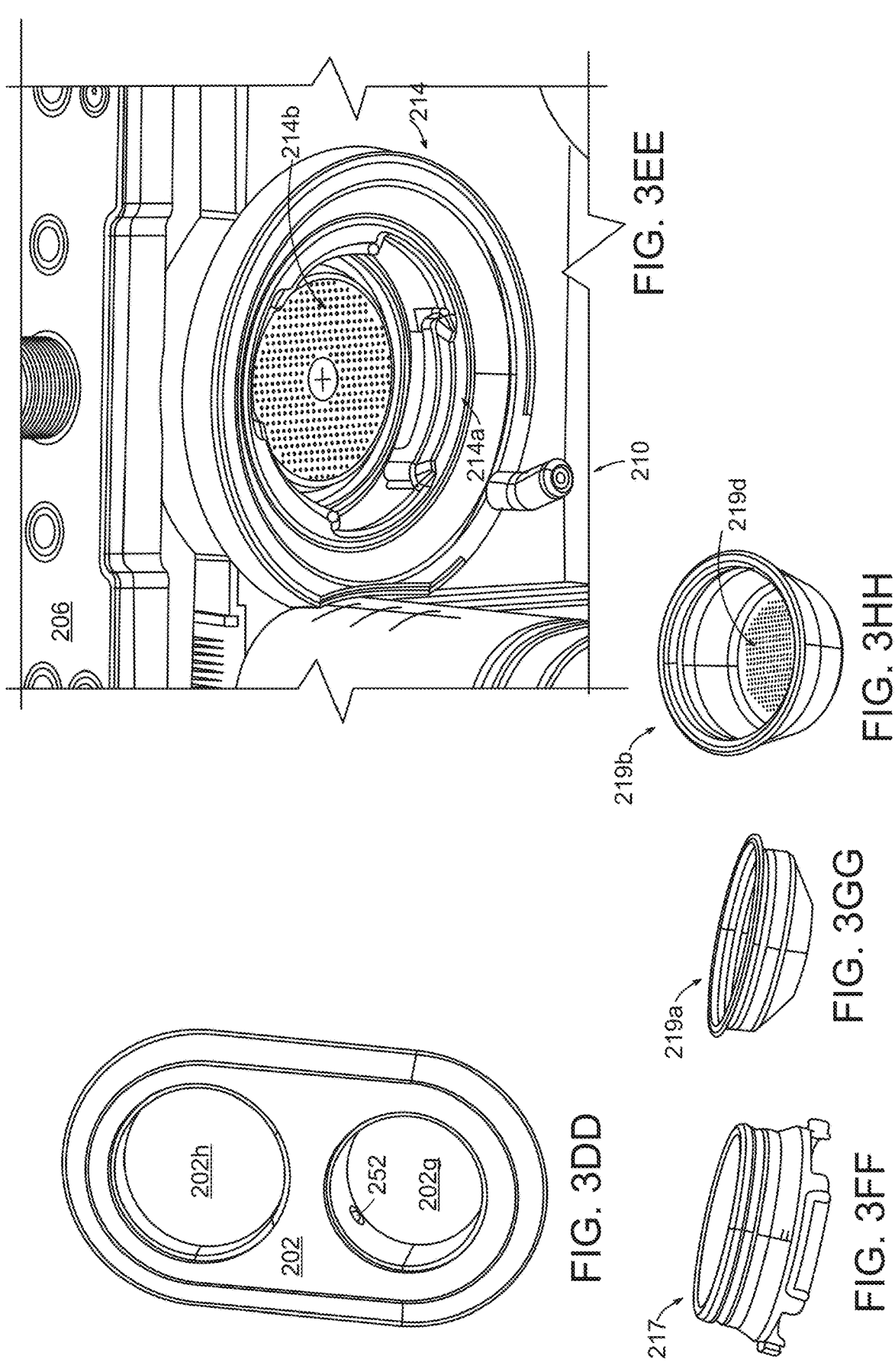
Figure 3N:
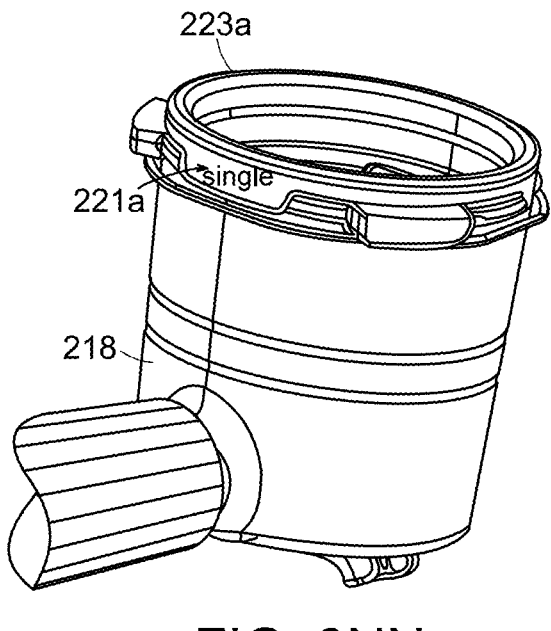
Figure 3O:
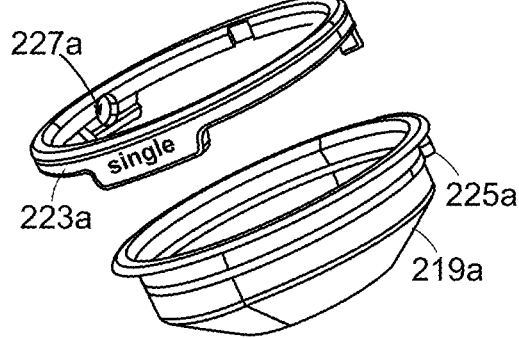
Figure 3P:
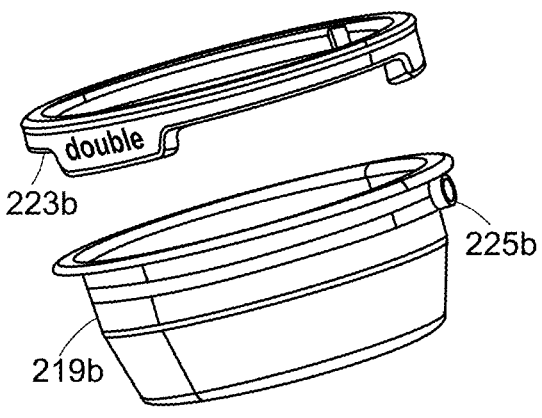
Figure 3Q:
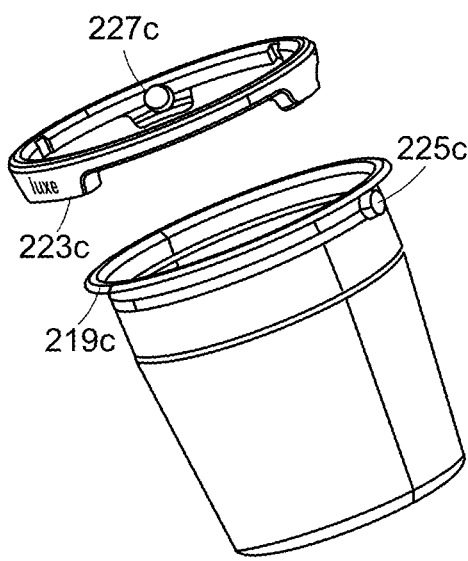

Similar to that discussed above with respect to the espresso machine 100 of FIG. 1A, the hopper 216 of the espresso machine 200 of FIGS. 3A-3D is configured to contain coffee beans therein and be refillable with coffee beans. The hopper 216 is removably coupled to the housing 202 in this illustrated implementation, but as mentioned above can instead be non-removably coupled to the housing 202. FIG. 3P shows the hopper 216 coupled to the housing 202. FIG. 3Q shows the espresso machine 200 with the hopper 216 removed therefrom. A space 202f defined by the housing 202 is configured to receive the hopper 216 therein.

FIGS. 3R and 3S show the hopper 216 as a standalone element. FIG. 3R shows the hopper 216 with a lid 216a of the hopper 216 removed from a main body 216b of the hopper 216 that defines a cavity 204c configured to hold coffee beans therein. FIGS. 3Q and 3R show the hopper 216 with the lid 216a coupled thereto. The lid 216a is configured to form a seal with the main body 216b, which may help protect any coffee beans therein from moisture and/or help the coffee beans age more slowly. The hopper lid 216a in this illustrated implementation is fully removable from the hopper main body 216b to allow access to a hopper cavity 216c of the hopper 216. In other implementations, the hopper lid 216a is configured to remain coupled to the hopper main body 216b when removed to allow access to the hopper cavity 216c, such as being hingedly attached to the main body 216b.

The hopper 216, e.g., the base 216b thereof, includes a downwardly-extending funnel portion 216d through which beans contained in the hopper 216 are configured to pass to the espresso machine's grinder 240 (see FIG. 3Q). The housing's cavity 202f for the hopper 216 includes a corresponding funnel portion (see FIG. 3Q) configured to seated the hopper's funnel portion 216d therein. The housing's cavity 202f and the hopper's funnel portion 216d are thus configured by their corresponding shapes to indicate to a user how the hopper 216 should be coupled to the housing 202 and to help properly align the hopper 216 with the grinder 240 so coffee beans are fed properly to the grinder 240, as described in greater detail below.

The hopper 216 includes a rotor 216e (see FIGS. 3S and 3U) at a bottom of the funnel portion 216d. In some aspects, the rotor 216e can be coupled to one or more tabs 216f located at an outer circumference of a funnel opening located at the bottom of the funnel portion. In some aspects, the hopper 216 can further include a locking handle (not shown) disposed within the funnel portion 216d and configured to lock/unlock the hopper 216 within the machine. In some aspects, the user can interact with the locking handle to move the locking handle between a locked position and an unlocked position, thereby rotating the rotor 216e between an open position and a closed position, respectively. When the rotor 216e is in the open position, coffee beans in the hopper 216 are allowed to pass through the funnel opening into the grinder 240, and when the rotor 216e is in the closed position, coffee beans in the hopper 216 are prevented from passing through the funnel opening into the grinder 240. FIG. 3S shows the rotor 216e in the open position, as indicated by aligned openings at the bottom of the funnel portion 216d. In some aspects, the housing's cavity 202f can further include one or more microswitches 202j, as shown in FIG. 3Q, configured to be pressed by the one or more tabs 216f when the rotor 216e is in the open position. When pressed, the one or more microswitches 202j can be configured to complete a circuit, thereby allowing for the grinder to operate. In a case where the user wishes to remove the hopper 216 from the housing's cavity 202f while there are still beans in the hopper 126, the user can move the locking handle into the unlocked position, thereby rotating the rotor 216e from the open position to the closed position. By rotating the rotor 216e from the open position to the closed position, the one or more tabs 216f can be configured to disengage from the one or more microswitches 202j and break the circuit, thus inhibiting operation of the grinder and allowing the hopper 216 to be removed without coffee beans falling out of the rotor 216e. Similarly, in a case where the user wishes to insert the hopper 216 into the housing's cavity 202f while there are still beans in the hopper 126, the user can place the hopper 216 within the housing's cavity 202f while the locking handle is in the unlocked position. Once the hopper 216 is properly placed, the user can move the locking handle into the locked position, thereby rotating the rotor 216e from the closed position to the open position. By rotating the rotor 216e from the closed position to the open position while the hopper 216 is placed within the housing's cavity 202f, the one or more tabs 216f can engage the one or more microswitches 202j, thereby completing the circuit and allowing for the grinder to operate.

The grinder 240 can have a variety of configurations. In this illustrated implementation, the grinder 240 includes an outer burr 240a and an inner burr 240b defining a space therebetween into which beans are configured to be delivered from the hopper 216. The inner burr 240b is configured to rotate, relative to the outer burr 240a, about a longitudinal axis of the inner burr 240b to grind beans contained in the space defined between the outer and inner burrs 240a, 240b. The espresso machine 200 includes a motor (obscured in FIG. 3Q) operably coupled to the inner burr 240b via a shaft 241 (see FIG. 3U) and is configured to drive the rotation of the inner burr 240b. As shown FIG. 3Q, in this illustrated implementation the outer burr 240a is a ring burr surrounding the inner burr 240b, which is a 5-point frustoconical burr.

In this illustrated implementation, a grind size to which the grinder 240 grinds the coffee beans is adjustable by a user. The espresso machine 200 thus includes a grind size adjustment mechanism, which as mentioned above is a wheel 222 in this illustrated implementation. Similar to that discussed above with respect to the espresso machine 100 of FIG. 1A, the wheel 222 is operably coupled to the grinder 240 and is configured to be rotated by a user, with rotation of the wheel 222 in a first direction being configured to increase the grind size and rotation of the wheel 222 in a second, opposite direction being configured to decrease the grind size. The wheel 222 has a plurality of predetermined positions, e.g., eight, ten, twelve, fifteen, sixteen, eighteen, twenty, twenty-five, or other number, with each of the predetermined positions corresponding to a grind size.

The espresso machine 200 includes an encoder (obscured in FIG. 3Q) configured to sense a position of the wheel 222 and communicate the sensed position to the controller. The controller is configured to, using the sensed position of the wheel 222, control the grinder 240 to achieve the currently selected grind size. In some implementations, the controller is configured to cause the currently selected grind size to be shown on the user interface 206.

The wheel 222 is operatively coupled to a gear train of the espresso machine 100 that is operably coupled to the outer burr 240a of the grinder 240. As discussed further below, rotation of the wheel 222 is configured to cause rotation of gears of the gear train, which causes the outer burr 240a to travel upward or downward vertically depending on the direction that the wheel 222 is turned. The outer burr's upward or downward vertical movement is relative to the inner burr 240b. A diameter of the inner burr 240b decreases in an upward direction due to the frustoconical shape of the inner burr 240b. Thus, the higher vertically that the outer burr 240a is located relative to the inner burr 240b, the coarser the grinder 140 will grind the beans using the outer and inner burrs 240a, 240b. Correspondingly, the lower vertically that the outer burr 240a is located relative to the inner burr 240b, the finer the grinder 140 will grind the beans using the outer and inner burrs 240a, 240b. An uppermost position of the inner burr 240b corresponds to the coarsest grind, and a lowermost position of the inner burr 240b corresponds to the finest grind.

As shown in FIG. 3T, the gear train includes a first gear 242a engaged with the wheel 222, a second gear 242b engaged with the first gear 242b, a third gear 242c engaged with the second gear 242b, and a fourth gear 242d engaged with the second gear 242b. The third gear 242c is also engaged with an encoder 244 operatively coupled to the controller. The fourth gear 242d is also engaged with a carriage 246 in which the outer burr 240a is disposed, as shown in FIG. 3U.

The carriage 246 is shown as a standalone element in FIG. 3V, and the fourth gear 242d is shown as a standalone element in FIG. 3W. The carriage 246 includes at least one pin 246a that extends radially outward. The four gear 242d includes at least one track 242e formed in an inner surface thereof. Each of the one or more tracks 242e is helical, although not necessarily extending helically around an entire circumference of the inner surface of the four gear 242d. The one or more tracks being helical help the grinder 240 produce a more consistent coffee grind particle size as compared to a blade grinder, which may be particularly important for espresso and sprover-style drinks since particle size affects beverage quality. The carriage 246 is engaged with the fourth gear 242d with the at least one pin 246a of the carriage 246 being slidably seated in the at least one track 242e formed in the fourth gear 242d. The carriage 246 includes three pins 246a (one of the pins 246a is obscured in FIG. 3V), and the fourth gear 242d includes three tracks 242e (one of the tracks 242e is obscured in FIG. 3W) each configured to seat one of the pins 246a therein. Another number of pins 246a and tracks 242e may be used, e.g., one, two, four, etc. In other implementations, the carriage 246 can include at least one track, and the fourth gear 242d can include at least one pin.

In response to rotation of the wheel 222, the first gear 242a is configured to rotate, which causes the second gear 242b to rotate, which causes each of the third and fourth gears 242c, 242d to rotate. The encoder 244 is configured to measure a position of the third gear 242c and transmit a signal indicative of the measured position to the controller, similar to that discussed above regarding the espresso machine 100 of FIG. 1A. The rotation of the fourth gear 242d is in a horizontal plane. The fourth gear 242d does not move upward or downward during its rotation. The rotation of the fourth gear 242d causes the one or more pins 246a of the carriage 246 to slide within the fourth gear's one or more tracks 242e, which causes the carriage 246 to either move vertically upward or downward due to the helical nature of the one or more tracks 242e, depending on the direction of fourth gear's rotation and thus depending on the direction the user's rotation of the wheel 222.

Coffee grinds are configured to exit the grinder 240 through a chute 248 (see FIG. 3T) to be delivered to the portafilter 218. FIGS. 3A-3C, 3I, and 3J show the portafilter 218 coupled to the espresso machine 200 in a first position in which the portafilter 218 is configured to receive coffee grinds through an upper opening of the portafilter 218. FIGS. 3X and 3Y show the portafilter 218 as a standalone element with the portafilter 218 removably coupled with a funnel 217. FIG. 3Z shows the espresso machine 200 with the portafilter 218 (and funnel 217) removed therefrom. The portafilter 218 includes a bayonet mechanism 218a, in the form of radially extending tabs, that is configured to mate with a bayonet mechanism 250a of a portafilter dock 250 of the espresso machine 200. The portafilter 218 in the first position is configured to be seated in the portafilter dock 250 with the bayonet mechanisms 218a, 250a mated together. The portafilter 218 can include the bayonet mechanism 218a, or, as in this illustrated implementation as shown in FIGS. 3X, 3Y, and 3FF, the funnel 217 includes the bayonet mechanism 218a that is configured to engage the bayonet mechanism 250a of the portafilter dock 250. The funnel 217 including the bayonet mechanism 218a may help ensure that the funnel 217 is coupled to the portafilter 218 before the portafilter 218 is coupled to the espresso machine 200 via the portafilter dock 250 and thus allow the funnel 217 to provide various benefits as discussed herein.

In an exemplary implementation, the portafilter dock 250 includes a weight sensor, such as a load cell or other sensor configured to measure weight, configured to sense a weight of coffee grounds in the portafilter 218. The weight sensor is configured to be operatively coupled to the controller such that sensed weight data can be transmitted from the weight sensor to the controller. The controller is configured to use weight data received from the weight sensor in controlling at least one functionality of the espresso machine 200. In an exemplary implementation, the controller is configured to use weight data received from the weight sensor in controlling the delivery of coffee beans from the grinder 240 to the portafilter 218, thereby allowing a certain amount of coffee to be ground by the grinder 240 for a particular user-selected beverage and delivered to the portafilter 218 through the chute 248.

In implementations in which the user interface 208 is configured to allow user input of a ground setting for sprover-style drinks, the controller is configured to use weight data received from the weight sensor in achieving the selected ground setting by controlling the delivery of coffee beans from the grinder 240 to the portafilter 218, thereby allowing the certain amount of coffee to be ground by the grinder 240 for the selected ground setting and delivered to the portafilter 218 through the chute 248.

In some implementations, controlling the delivery of coffee beans from the grinder 240 to the portafilter 218 is performed without use of a weight sensor. In such implementations, the espresso machine 200 omits the weight sensor and can optionally include another element, such as a counter or other timer, configured to facilitate the controller's controlling of the delivery of coffee beans from the grinder 240 to the portafilter 218.

The funnel 217 is configured to help guide the coffee grounds from the chute 248 into the portafilter 218 to help prevent loose coffee grounds from escaping from the espresso machine 200 and causing a mess. As mentioned above, the funnel 217 is configured to be removably coupled with the portafilter 218, such as by engaging the portafilter's bayonet mechanism 250a as shown in FIGS. 3X and 3Y. The funnel 217 is shown as a standalone element in FIG. 3FF.

The portafilter 218 is configured to removably seat therein a selected one of a plurality of baskets 219a, 219b, 219c, as shown in FIGS. 3GG-3II, respectively, which can be selectively used for making a plurality of different drink styles. The baskets 219a, 219b, 219c are each configured to receive the coffee grounds therein and for water (heated or not heated) to pass therethrough. Each of the baskets 219a, 219b, 219c has a plurality of openings defining a filter in a bottom thereof. The baskets 219a, 219b, 219c are thus each configured as a filter. Each of the openings has a size configured to allow water to pass therethrough but not allow coffee grounds to pass therethrough. FIG. 3HH shows the plurality of openings 219d at the bottom of the second basket 219b. FIG. 3JJ shows the plurality of openings 219e at the bottom of the third basket 219c. The selected one of the baskets 219a, 219b, 219c removably coupled to the portafilter 218 is configured to be removed from the portafilter 218 to allow for a user to easily swap between the plurality of baskets 219a, 219b, 219c based on a desired drink style of the plurality of different drink styles.

The plurality of baskets 219a, 219b, 219c each has a different capacity, so each of the baskets 219a, 219b, 219c is configured to hold therein a different maximum amount of coffee grinds. This illustrated implementation includes three baskets 219a, 219b, 219c, but another number of baskets may be used, e.g., one, two, four, etc. The first basket 219a is configured for use in preparing single espresso shots, the second basket 219b is configured for use in preparing double espresso shots, and the third basket 219c is configured for use in preparing other beverages (e.g., quad espresso shots and other coffee beverages). The first basket 219a has a smaller capacity than the second basket 219b, which has a smaller capacity than the third basket 219c. In this illustrated implementation, the second basket 219b has a volume that is about 53 mL. The volume of the second basket 219b can vary. For example, the volume of the second basket 219b can range from about 43 mL to 63 mL. Additionally, the first basket 219a has a volume that is about 42 mL. The volume of the first basket 219a can vary. For example, the volume of the first basket 219a can range from about 32 mL to about 52 mL. Additionally, the third basket 219c has a volume that is about 121 mL. The volume of the third basket 219c can vary. For example, the volume of the third basket 219c can range from about 105 mL to 135 mL.

In an exemplary implementation, the second basket 219b can have a volume that is about two times a volume of the first basket 219a, and the third basket 219c can have a volume that is at least two times a volume of the second basket 219b, e.g., a volume of about two times the volume of the second basket 219b, a volume of about 2.2 times the volume of the second basket 219b, a volume of about 2.4 times the volume of the second basket 219b, a volume of about 2.5 times the volume of the second basket 219b, etc. Since the first basket 219a can have a capacity that is less than the second basket 219b, the volume of the third basket 219c can thus also be at least two times a volume of the first basket 219a.

In an exemplary implementation, each of the plurality of baskets 219a, 219b, 219c includes an identifier configured to identify a size of the basket to a user, which may help a user easily select a desired one of the plurality of baskets 219a, 219b, 219c. For example, the identifier can include a marking, e.g., letter(s) and/or number(s), printed on, embossed on, adhered on, or otherwise visible on the basket. For another example, the identifier can include a color with the plurality of baskets 219a, 219b, 219c being color-coded, e.g., each of the plurality of baskets 219a, 219b, 219c being a different color at least in part. For yet another example, the identifier can include a marking and a color.

Because the portafilter 218 is configured to interchangeably seat a selected one of the plurality of baskets 219a, 219b, 219c, a user will not know whether a particular basket is the correct, intended basket or not based on whether or not the basket is able to be seated in the portafilter 218. The identifier may thus help a user know that the correct, intended basket is seated in the portafilter 218.

FIGS. 3KK-3MM respectively illustrate each of the plurality of baskets 219a, 219b, 219c including an identifier 221a, 221b, 221c in the form of text. The identifier 221a of the first basket 219a is "single," indicating that the first basket 219a is configured for use in brewing a single (1x) espresso shot. The identifier 221b of the second basket 219b is "double," indicating that the second basket 219b is configured for use in brewing a double (2x) espresso shot. The identifier 221c of the third basket 219c is "luxe," indicating that the third basket 219c is configured for use in brewing deluxe beverages, such as a quad (4x) espresso shot and filter coffee style drinks having a volume in a range of 6 oz to 18 oz.

The identifiers 221a, 221b, 221c are shown in FIGS. 3KK-3MM on collars 223a, 223b, 223c at upper, open ends of the baskets 219a, 219b, 219c. The identifiers 221a, 221b, 221c being located on the collars 223a, 223b, 223c allows the identifier 221a, 221b, 221c of the one of the plurality of baskets 219a, 219b, 219c seated in the portafilter 218 to be visible to a user. The user may thus know which of the plurality of baskets 219a, 219b, 219c is currently seated in the portafilter 218 without having to remove the seated basket from the portafilter 218. For example, FIG. 3NN shows the first basket 219a seated in the portafilter 218 and the identifier 221a of the first basket 219a being visible. In other implementations, the identifiers 221a, 221b, 221c can be on another portion of the baskets 219a, 219b, 219c, e.g., a bottom surface, a side surface, etc., instead of or in addition to the collars 223a, 223b, 223c. In implementations in which the baskets 219a, 219b, 219c do not include collars, such as shown in FIGS. 3GG-3JJ, the identifiers can be in any of a variety of one or more locations of the basket, such as a bottom surface, a side surface, etc.

The collars 223a, 223b, 223c are fixedly secured to their respective baskets 219a, 219b, 219c. The identifiers 221a, 221b, 221c being at the collars 223a, 223b, 223c, e.g., as text, color, etc., may thus help assure proper identifying of a basket.

Each of the collars 223a, 223b, 223c is configured to facilitate user handling of its associated one of the baskets 219a, 219b, 219c. The collars 223a, 223b, 223c being located at upper, open ends of the baskets 219a, 219b, 219c allows a user to hold a selected one of the baskets 219a, 219b, 219c by its collar 223a, 223b, 223c and drop or place the selected one of the baskets 219a, 219b, 219c in the portafilter 218 through the portafilter's upper opening. Additionally, the collars 223a, 223b, 223c being located at upper, open ends of the baskets 219a, 219b, 219c allows a user to remove a one of the baskets 219a, 219b, 219c seated in the portafilter 218 by holding the basket's collar 223a, 223b, 223c and pulling up to remove the one of the baskets 219a, 219b, 219c from the portafilter 218. A user handling the collars 223a, 223b, 223c instead of another portion of the baskets 219a, 219b, 219c when coupling the basket with the portafilter 218 may help keep clean the portions of the baskets 219a, 219b, 219c that will likely contact coffee grounds and/or water. A user handling the collars 223a, 223b, 223c instead of another portion of the baskets 219a, 219b, 219c when de-coupling the basket from the portafilter 218 may help prevent the user from touching a wet surface and/or used coffee grounds.

Each of the collars 223a, 223b, 223c extends around an entire perimeter of its associated one of the baskets 219a, 219b, 219c around the upper, open end thereof, e.g., around an entire circumference of the illustrated substantially circular upper, open ends. The collars 223a, 223b, 223c so extending may help prevent a user from touching another portion of the baskets 219a, 219b, 219c when coupling to or de-coupling from the portafilter 218.

In an exemplary implementation, the espresso machine 200 is configured to automatically detect which of the plurality of baskets 219a, 219b, 219c is seated in the portafilter 218. Because different ones of the plurality of baskets 219a, 219b, 219c are configured to be used when brewing different beverages, as discussed herein, detecting which of the plurality of baskets 219a, 219b, 219c is seated in the portafilter 218 may help the espresso machine 200 present more relevant options to a user via the user interface 206. The user being presented only with relevant options may help produce a higher quality beverage since improper selections cannot be selected. Relevant options associated with each of the different baskets 219a, 219b, 219c are stored in the espresso machine's memory, such as in a lookup table or database, and are accessible to the espresso machine's controller. If the first basket 219a is detected as being seated in the portafilter 218, the espresso machine 200, e.g., the controller thereof, can only present options on the user interface 206 that are relevant to brewing a single espresso shot. For example, the user interface 206 may not allow the user to select a beverage size (volume) because a single espresso shot has a predetermined size. If the second basket 219b is detected as being seated in the portafilter 218, the espresso machine 200, e.g., the controller thereof, can only present options on the user interface 206 that are relevant to brewing a double espresso shot. For example, the user interface 206 may not allow the user to select a beverage size (volume) because a double espresso shot has a predetermined size. If the third basket 219c is detected as being seated in the portafilter 218, the espresso machine 200, e.g., the controller thereof, can only present options on the user interface 206 that are relevant to brewing a quad espresso shot or a filter coffee style drink. For example, the user interface 206 may not allow the user to select a beverage size (volume) below a certain volume, e.g., below 6 oz, because a quad espresso shot has a predetermined size and filter coffee style drinks typically have a size in a range of 6 oz to 18 oz.

The espresso machine 200 can be configured to automatically detect which of the plurality of baskets 219a, 219b, 219c is seated in the portafilter 218 in a variety of ways. In the illustrated implementation, the espresso machine 200 is configured to automatically detect which of the plurality of baskets 219a, 219b, 219c is seated in the portafilter 218 using a reed switch. The reed switch is located at the portafilter dock 250 configured to dock the portafilter 218 for delivery of ground coffee into the portafilter 218. The reed switch being located at the portafilter dock 250 allows the espresso machine 200, e.g., the controller thereof, to detect which of the plurality of baskets 219a, 219b, 219c is seated in the portafilter 218 before any ground coffee is delivered into the portafilter 218.

The reed switch is configured react to a magnetic field applied thereto from at least one magnet of the one of the plurality of baskets 219a, 219b, 219c seated in the portafilter 218. The reaction of the reed switch to the magnetic field closes a circuit operably coupled to the controller of the espresso machine 200, thereby allowing the controller to identify that the portafilter 218 is seated in the portafilter dock 250 and that a particular one of the plurality of baskets 219a, 219b, 219c is seated in the portafilter 218.

As shown in FIGS. 3OO-3QQ, respectively, each of the plurality of baskets 219a, 219b, 219c includes at least one magnet 225a, 225b, 225c. Each of the collars 223a, 223b, 223c is configured to help secure the at least one magnet 225a, 225b, 225c to its associated basket 219a, 219b, 219c with the at least one magnet 225a, 225b, 225c sandwiched between the collar and a body of the basket.

The at least one magnet 225a, 225b, 225c of the one of the plurality of baskets 219a, 219b, 219c seated in the portafilter 218 is configured to apply the magnetic field to the reed switch with the portafilter 218 seated in the portafilter dock 250. Each of the plurality of baskets 219a, 219b, 219c is configured to provide a different magnetic strength with each of the baskets having a different number of magnets 225a, 225b, 225c and/or different strengths of magnets 225a, 225b, 225c.

In this illustrated implementation, the first basket 219a includes two magnets 225a, the second basket 219b includes one magnet 225b, and the third basket 219c includes two magnets 225c, but other numbers of magnets per basket are possible. One of the first basket's magnets 225a is obscured in FIG. 3OO. A seat 227a configured to seat the obscured magnet 225a of the first basket 219a is shown formed in an internal surface of the first collar 223a. One of the third basket's magnets 225c is obscured in FIG. 3QQ. A seat 227c configured to seat the obscured magnet 225c of the third basket 219c is shown formed in an internal surface of the third collar 223c.

Different magnetic field strengths will differently affect the reed switch such that the controller of the espresso machine 200 will receive a different signal based on which of the plurality of baskets 219a, 219b, 219c is seated in the portafilter 218. The controller is thus configured to identify which one of the plurality of baskets 219a, 219b, 219c is seated in the portafilter 218 based on the signal. If no signal is received, the controller is configured to determine that no basket is seated in the portafilter 218 and thus not allow a brewing process to begin, e.g., lock out brewing until a basket is detected.

In another implementation, the espresso machine 200 is configured to automatically detect which of the plurality of baskets 219a, 219b, 219c is seated in the portafilter 218 using a plurality of mechanical switches of the espresso machine 200. Each of the plurality of baskets 219a, 219b, 219c is configured to depress a different combination of the plurality of mechanical switches when seated in the portafilter 218 docked in the portafilter dock 250. A signal received by the espresso machine's controller will be different based on which combination of the mechanical switches is depressed, thereby allowing the controller to identify which one of the plurality of baskets 219a, 219b, 219c is seated in the portafilter 218. If no signal is received, the controller is configured to determine that no basket is seated in the portafilter 218 and thus not allow a brewing process to begin.

In another implementation, the espresso machine 200 is configured to automatically detect which of the plurality of baskets 219a, 219b, 219c is seated in the portafilter 218 using color detection. For example, the espresso machine 200 can include an optical sensor configured to detect a color at a predetermined area, e.g., an area where the collars 223a, 223b, 223c are located. The collars 223a, 223b, 223c can thus be different colors to facilitate identification of baskets. The optical sensor is operatively coupled to the espresso machine's controller and is configured to transmit a signal indicative of the detected color. Based on the signal, the controller is configured to identify the basket, or that no basket is present, since different colors will result in different signals being transmitted from the optical sensor.

In another implementation, the espresso machine 200 is configured to automatically detect which of the plurality of baskets 219a, 219b, 219c is seated in the portafilter 218 using a barcode or other code. For example, the espresso machine 200 can include an optical sensor configured to detect a barcode or other code at a predetermined area, e.g., an area where the collars 223a, 223b, 223c are located. The collars 223a, 223b, 223c can thus have the barcode or other code thereon, e.g., printed, embossed, adhered thereto, etc. The optical sensor is operatively coupled to the espresso machine's controller and is configured to transmit a signal indicative of the detected code. Based on the signal, the controller is configured to identify the basket, or that no basket is present, since different codes will result in different signals being transmitted from the optical sensor.

In another implementation, the espresso machine 200 is configured to automatically detect which of the plurality of baskets 219a, 219b, 219c is seated in the portafilter 218 using an electrical sensor. The electrical sensor is configured to detect presence or absence of a material with a predetermined resistance, capacitance, or similar electrical characteristic. The electrical sensor is configured to detect the material at a predetermined area, e.g., an area where the collars 223a, 223b, 223c are located. The collars 223a, 223b, 223c can thus include the material. The electrical sensor is operatively coupled to the espresso machine's controller and is configured to transmit a signal indicative of the detected electrical characteristic. Based on the signal, the controller is configured to identify the basket, or that no basket is present, since different electrical characteristics will result in different signals being transmitted from the electrical sensor.

In another implementation, the espresso machine 200 is configured to automatically detect which of the plurality of baskets 219a, 219b, 219c is seated in the portafilter 218 using an infrared sensor. The infrared sensor is configured to detect a distance between surfaces, such as by including a time-of-flight sensor configured to measure a time taken for a photon to travel from the time-of-flight sensor to a surface of the basket, e.g., the collar thereof, and back to the time-of-flight sensor. The infrared sensor is operatively coupled to the espresso machine's controller and is configured to transmit a signal indicative of the detected distance. Based on the signal, the controller is configured to identify the basket, or that no basket is present, since different distances will result in different signals being transmitted from the infrared sensor.

The espresso machine 200 in this illustrated implementation includes a basket storage area configured to store the plurality of baskets 219a, 219b, 219c therein, which may help prevent the baskets 219a, 219b, 219c from being lost and/or may help ensure that a desired basket 219a, 219b, 219c is available when a user is ready for its use. FIGS. 3B and 3D illustrate a door 202i configured to be opened to access the basket storage area formed in the housing 202. The door 202i is hingedly attached to the housing 202 in this illustrated implementation but may be fully removable from the housing 202 in other implementations. The basket storage area can include an organization mechanism therein, such as one or more shelves, one or more hooks, etc., configured to facilitate organized storage of the plurality of baskets 219a, 219b, 219c therein.

Similar to that discussed above regarding the espresso machine 100 of FIG. 1A, the portafilter 218 having coffee grounds therein is configured to be removed from the espresso machine 200 for tamping of the coffee grounds using the tamp 220. In this illustrated implementation, the tamp 220 is removably coupled to the espresso machine 200 to allow the user to selectively remove the tamp 220 for tamping, but as mentioned above, the tamp can instead be non-removably coupled to the espresso machine or can be a standalone device that is not coupled to the espresso machine 200. FIGS. 3B, 3C, 3H, 3I, and 3Z show the tamp 220 coupled to the espresso machine 200. FIGS. 3AA and 3BB show the tamp 220 as a standalone element. FIG. 3CC shows the espresso machine 200 with the tamp 220 removed therefrom.

As shown in FIGS. 3CC and 3DD, the housing 202 of the espresso machine 200 includes a first cavity 202g formed therein that is configured to releasably seat the tamp 220 therein. A spring-loaded pin 252 protrudes into the first cavity 202g. The pin 252 is biased into the first cavity 202g. FIGS. 3CC and 3DD also show that the housing 202 includes a second cavity 202h formed therein that is configured to releasably seat the filter 217 therein. The second cavity 202h is located vertically above the first cavity 202g in this illustrated implementation, but the first and second cavities 202g, 202h can be located in the housing 202 relative to one another at any of a variety of locations.

As shown in FIGS. 3AA and 3BB, the tamp 220 includes a groove 220a extending circumferentially therearound. The pin 252 is configured to releasably seat in the tamp's groove 220a to help hold the tamp 220 within the first cavity 202g. The groove 220a extending fully around the tamp 220 is configured to allow the tamp 220 to be seated in the first cavity 202g at any rotational position relative to the housing 202.

The tamp 220 is configured to be inserted into the portafilter 218 through the upper opening of the portafilter 218, with or without the funnel 217 removably coupled thereto. A bottom surface 220b of the tamp 220 is configured to be pressed down and on coffee grinds in the portafilter 218 to form a puck. The bottom surface 220b of the tamp 220 is smooth and solid, which may help form a uniform, compressed puck of coffee grinds.

The tamp 220 includes an upper housing 220c and a lower housing 220d. The lower housing 220d includes the tamp's bottom surface 220b. The upper housing 220c is movably coupled to the lower housing 220d. A spring 220e that is internal to the tamp 220 is operably coupled to the upper and lower housings 220c, 220d and biases the upper housing 220c upward in a direction away from the lower housing 220d. With the tamp 220 inserted at least partially into the portafilter 218 with the tamp's bottom surface 220b contacting the coffee grinds in the portafilter 218, the upper housing 220c is configured to be pressed downward by a user to help apply pressure to the coffee grinds to form the puck. The upper housing 220c being pressed downward overcomes the biasing force of the spring 220e to allow the upper housing 220c to move downward relative to the lower housing 220d. When the user releases pressure on the upper housing 220c, the biasing force provided by the spring 220e is configured to cause the upper housing 220c to move back upward. In some aspects, the spring 220e can also provide haptic feedback to the user to indicate that the correct tamp force has been achieved and also to limit over tamping.

Similar to that discussed above with respect to the espresso machine 100 of FIG. 1A, the portafilter 218 having the tamp 220 removed therefrom and having tamped coffee grounds therein is configured to be positioned by a user below the group head 214 and re-coupled to the espresso machine 200 to allow water to pass through the group head 214 into the portafilter 218, e.g., before being dispensed as brewed espresso into a cup or other container positioned on the drip tray 208. As shown in FIG. 3EE, the group head 214 includes a bayonet mechanism 214a that is configured to mate with the bayonet mechanism 218a of the portafilter 218.

Also similar to that discussed above with respect to the espresso machine 100 of FIG. 1A, water is configured to pass out of the first solenoid valve to the group head 214. The group head 214 includes a plurality of holes 214b, as shown in FIG. 3EE, through which the water is configured to pass at high pressure into the portafilter 218 containing a tamped coffee puck therein. The group head 214 is an E61 group head in this illustrated implementation, although other types of group heads may be used.

Figures 5B, 6A:
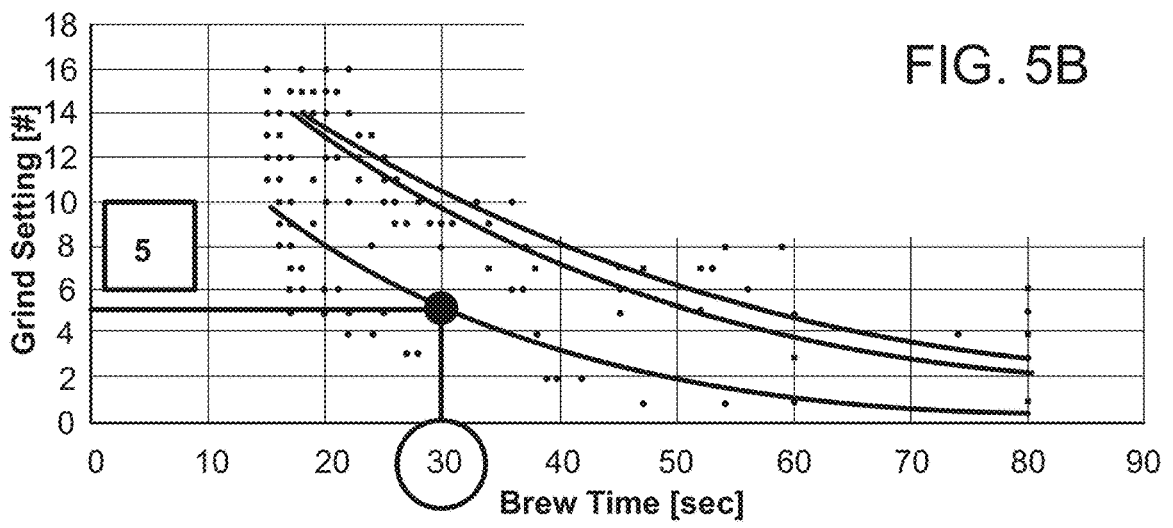
FIG. 5B shows a determined optimal grind size in the graph of FIG. 5A.
FIG. 6A is perspective view of another implementation of an espresso machine.
Figure 6B:
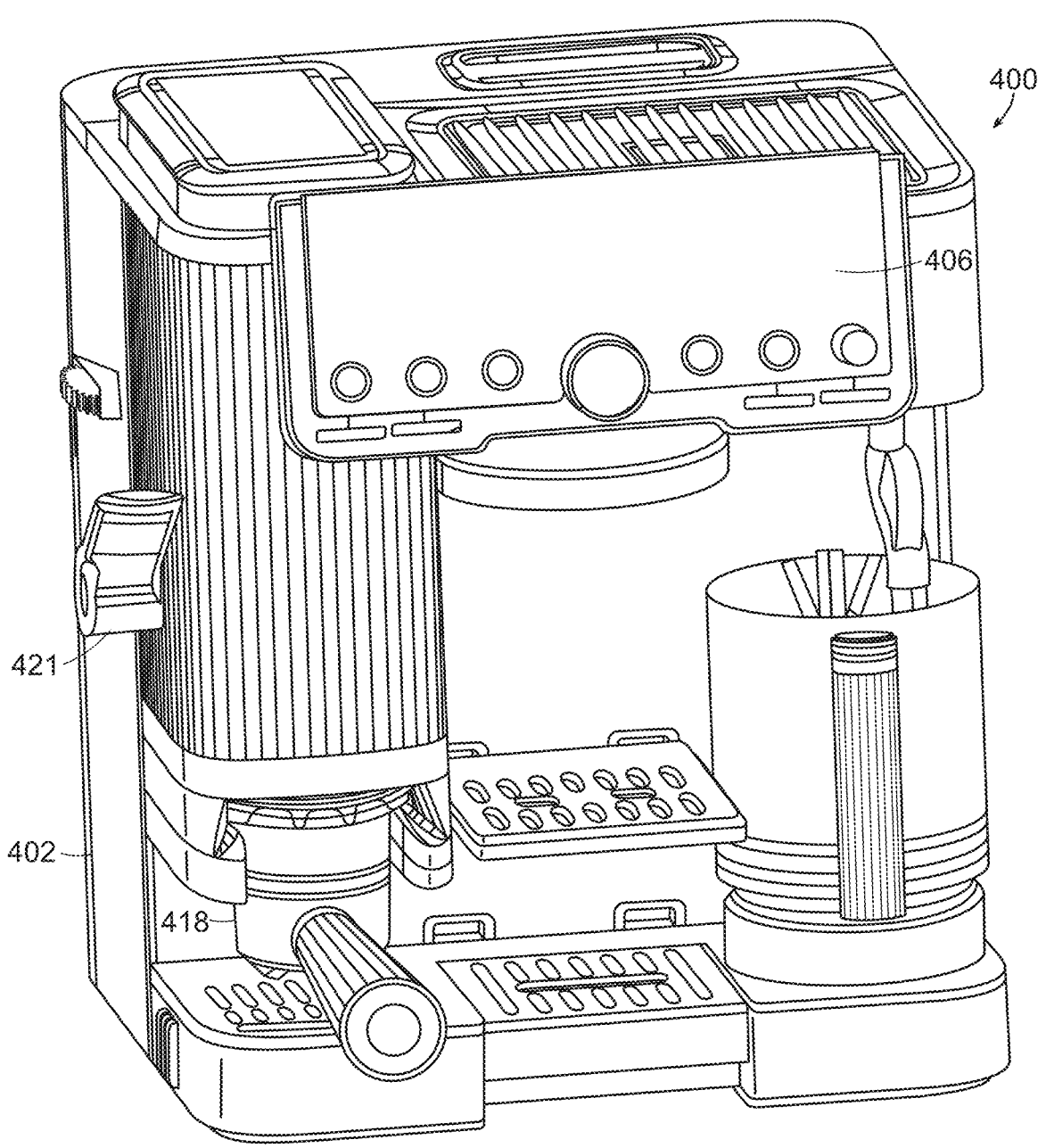
FIG. 6B is another perspective view of the espresso machine of FIG. 6A.
Figure 6C:
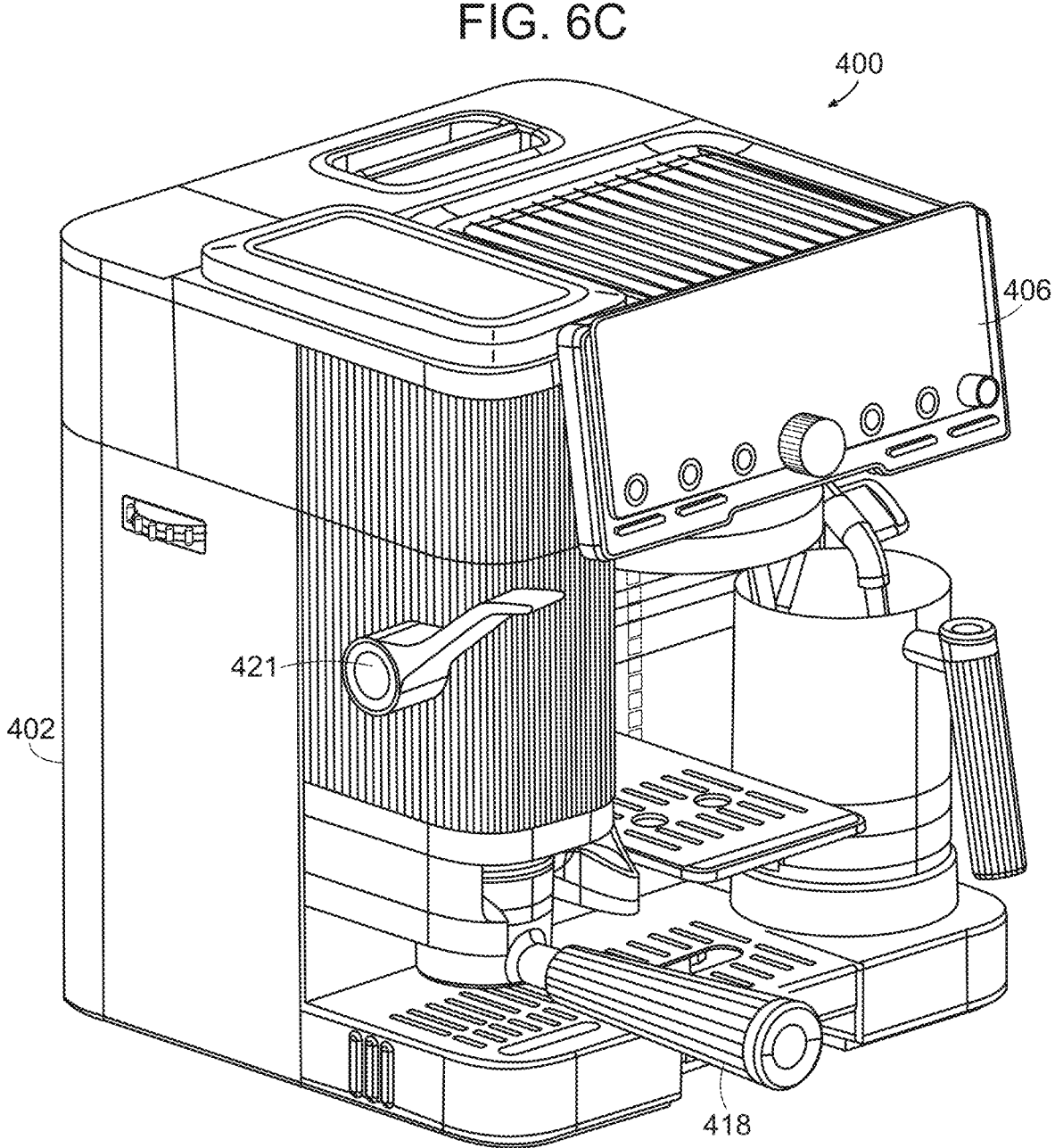
FIG. 6C is yet another perspective view of the espresso machine of FIG. 6A.
Figure 7A:
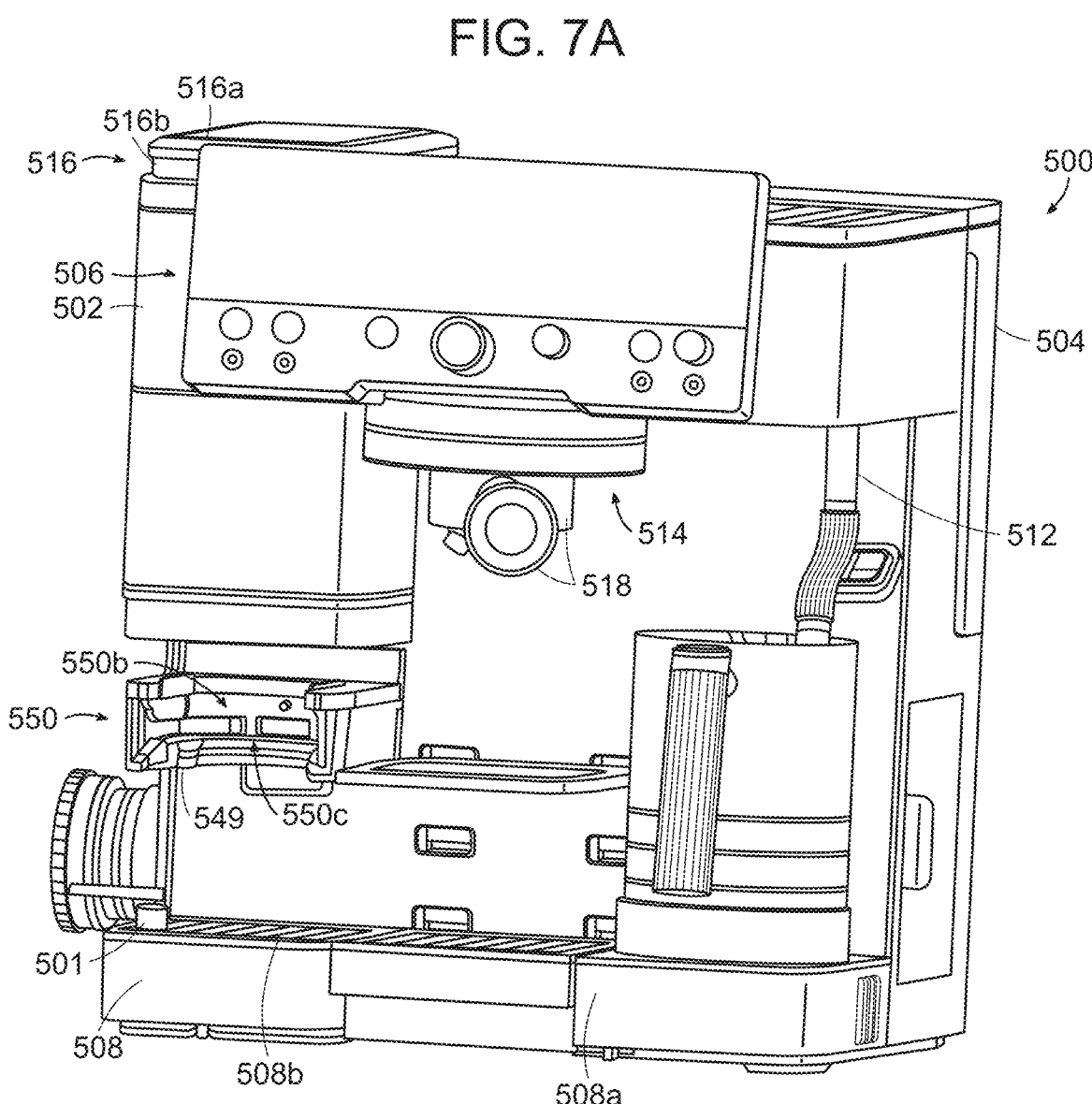
FIG. 7A is a perspective view of another implementation of an espresso machine.

In an exemplary implementation, an espresso machine, such as the espresso machine 100 of FIG. 1A, the espresso machine 200 of FIGS. 3A-3D, the espresso machine 400 of FIGS. 6A-6C, the espresso machine 500 of FIG. 7A, or other espresso machine, is configured to determine a grind size for grinding of coffee beans by a grinder of the espresso machine. In some implementations, the espresso machine is configured to determine the grind size on demand in response to a request for a grind size recommendation input to the espresso machine by a user, e.g., via a user interface of the espresso machine. In such implementations, the espresso machine is configured to provide the determined grind size as a recommendation to the user, e.g., via a user interface of the espresso machine, so the user can decide whether or not to use the recommended grind size or to use a user-selected grind size, e.g., as selected using a grind size adjustment mechanism of the espresso machine. For example, a user can select the "grind IQ" button of the user interface 128a of FIG. 2B to request a recommended grind size, and the determined grind size can be provided to the user via the user interface 128a as a numerical value representing a recommended grind size. Grind size can be additionally or alternatively provided to a user in another way, such as via text on a user interface indicating grind setting, e.g., "extra fine," "fine," "fine-medium," "medium," "medium-coarse," "coarse," or "extra coarse."

In some implementations, the espresso machine is configured to determine the grind size only in response to a user input requesting a recommended grind size. User experience may thus be improved by allowing user choice. In other implementations, the espresso machine is configured to determine the grind size automatically as part of a brewing and dispensing process. The espresso machine may therefore dynamically determine a grind size for a user-selected beverage and provide the recommended grind size to the user without a user having to make a request for a recommended grind size while still allowing the user to decide whether to use the recommended grind size or to use another, user-selected grind size.

Figure 4A:
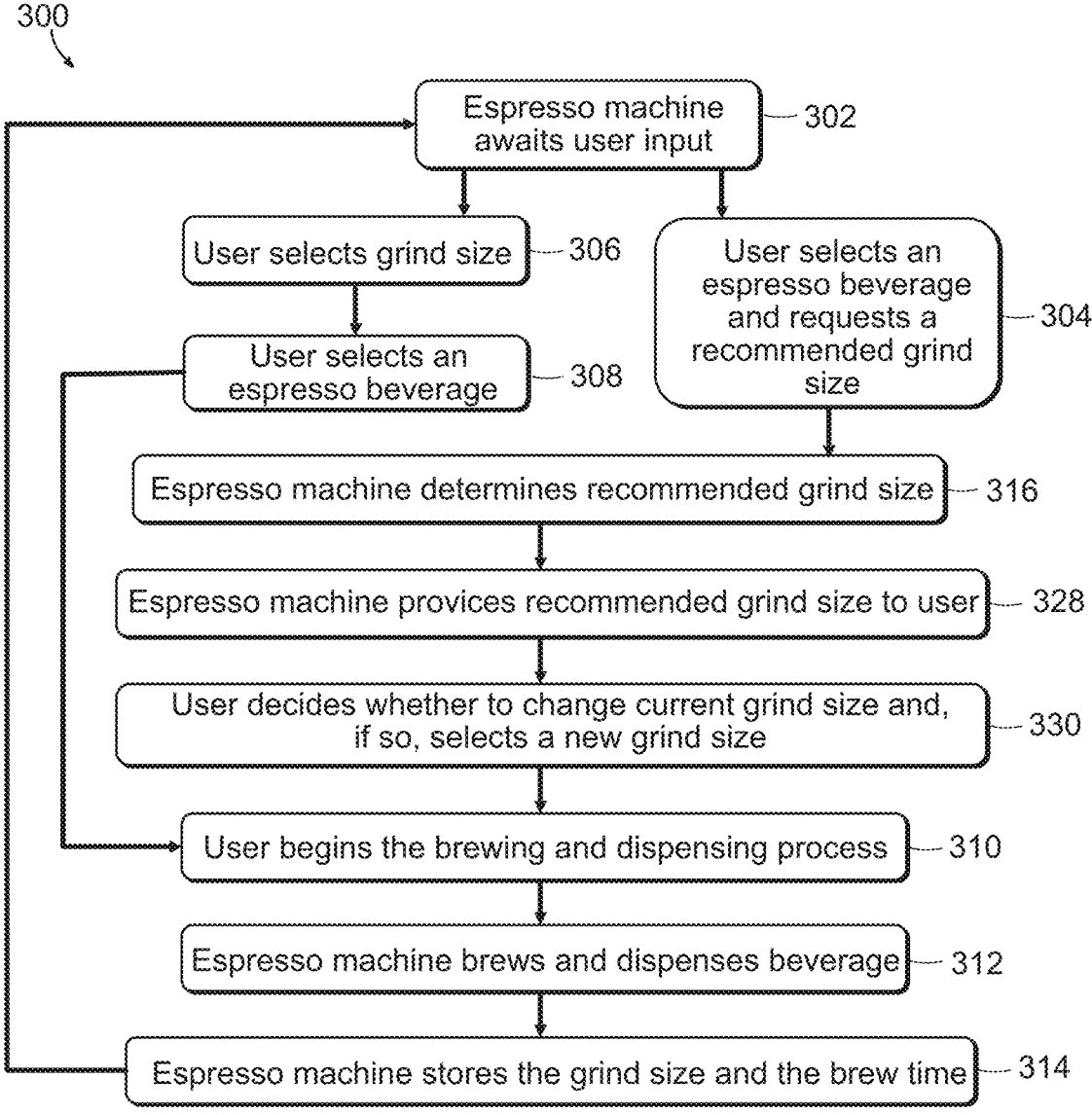
FIG. 4A is a flowchart of one implementation of a method of using an espresso machine configured to recommend a grind size for grinding of coffee beans by a grinder of the espresso machine.

FIG. 4A illustrates one implementation of a method 300 of using an espresso machine configured to recommend a grind size for grinding coffee beans by a grinder of the espresso machine. The method 300 is described with respect to the espresso machine 200 of FIGS. 3A-3D for ease of explanation but can be similarly performed with respect to another espresso machine (e.g., the espresso machine 100 of FIG. 1A, the espresso machine 400 of FIGS. 6A-6C, the espresso machine 500 of FIG. 7A, or other espresso machine).

The method 300 includes the espresso machine 200 awaiting 302 user input that is input to the espresso machine 200 via the espresso machine's user interface 206. In some instances, as discussed above, user input to the espresso machine 200 includes a user selecting 304 an espresso beverage (which may be an espresso or a sprover-style drink) and requesting 304 a recommended grind size for the selected 304 beverage. In such implementations, the user can, but does not need to, select a grind size, e.g., using the wheel 222, because the espresso machine 200 will inform the user of a recommended grind size so the user can then use the recommended grind size in adjusting the wheel 222 if desired from the wheel's current position. The user's espresso beverage selection 304 can include multiple inputs as discussed above, such as an espresso type, a beverage size, a brew type, and a beverage volume.

Sometimes a user may not want to receive a recommended grind size, such as if the user is an experienced user of the espresso machine 200, if the user just brewed a same beverage for which the espresso machine 200 provided a recommended grind size, or other reason. In such instances, as also discussed above, user input to the espresso machine 200 includes a user selecting 306 a grind size, e.g., using the wheel 222, and selecting 308 an espresso beverage (which may be an espresso or a sprover-style drink). The user's espresso beverage selection 308 can include multiple inputs as discussed above, such as an espresso type, a beverage size, a brew type, and a beverage volume. FIG. 4A shows beverage selection 308 occurring after grind size selection 306, but beverage selection 308 can occur before grind size selection 306.

After the user selects 306 a grind size and selects 308 an espresso beverage, the user begins 310 the brewing and dispensing process by providing a "start" input to the espresso machine 200, such as by pressing a "start grind" button on the user interface 206 similar to the "start grind" inputs available on the user interfaces 128, 128a of FIGS. 2A and 2B. The espresso machine 200 then brews and dispenses 312 the selected espresso beverage in accordance with the user's selected 306, 308 grind size and beverage. Before the espresso is dispensed 312 to a cup or other container via the group head 214, the user uses the portafilter 218 and the tamp 220 as discussed above. The user may also opt for the espresso machine 200 to form frothed milk for pouring into the cup or other container containing the dispensed 312 espresso.

The espresso machine 200 stores 314, e.g., in the memory of the espresso machine 200, the grind size used in brewing 312 the selected espresso beverage as well a time length of the brewing 312. The espresso machine 200 is configured to subsequently use the stored 314 grind size and brew time length in determining recommended grind size, as discussed further below.

The espresso machine 200 then awaits 302 a next user input for a next beverage formation and dispensing process.

Figures 4B, 5A:
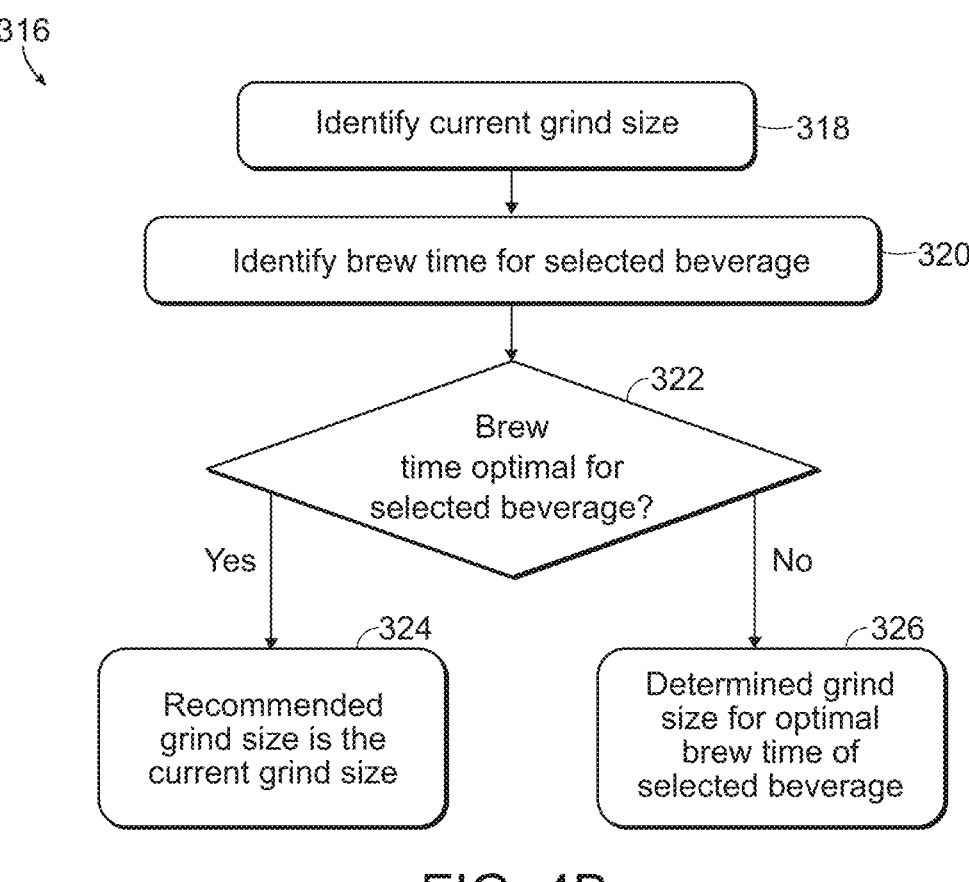
FIG. 4B is a flowchart of one implementation of a portion of the method of FIG. 4A.
FIG. 5A is one implementation of a graph plotting grind size versus brew time.

In instances in which the user input to the espresso machine 200 includes the user selecting 304 an espresso beverage and requesting 304 a recommended grind size for the selected 304 beverage, the method 300 includes the espresso machine 200 determining 316 a recommended grind size. FIG. 4B illustrates one implementation of a method of determining 316 a recommended grind size.

As shown in FIG. 4B, determining 316 a recommended grind size includes identifying 318 a current grind size and identifying 320 a brew time for the selected beverage. The espresso machine 200, e.g., the controller thereof, identifies 318 the current grind size from, for example, a signal transmitted from the encoder 244 to the controller. The espresso machine 200, e.g., the controller thereof, identifies 320 the brew time by, for example, looking the current coffee bean type (e.g., as input via the user interface 206) up in a lookup table stored in the espresso machine's memory that correlates coffee bean types with brew times. The values stored in the lookup table are pre-stored in the memory, e.g., during manufacturing, and can be experimentally determined values. FIG. 4B shows the current grind size identification 318 occurring before brew time identification 320, but current grind size identification 318 can occur after brew time identification 320.

After identifying 318, 320 the current grind size and the brew time for the selected beverage under fixed water delivery, the espresso machine 200, e.g., the controller thereof, determines 322, using the identified 318 current grind size, whether the identified 320 brew time is optimal for the selected beverage. Based on the selected size, the espresso machine 200, e.g., the algorithm thereof, calculates the suggested grind size by looking at the current grind size and brew time for the selected beverage. The espresso machine 200, e.g., the controller thereof, considers the grind sizes and brew times stored 314 previously for espresso beverages previously brewed by the espresso machine in determining whether the identified 320 brew time is optimal for the selected beverage. Each grind size and brew time for a previously brewed espresso beverage defines a data point on a plot of grind size versus brew time for fixed water delivery to the group head 214. The espresso machine 200, e.g., the controller thereof, determines which plot of prior data points is closest to the identified 320 brew time and the identified 318 current grind size. The plots can be stored in the espresso machine's memory as a matrix of values. Multiple size of matrices can be used for different types of espresso beverages if it is required.

The espresso machine 200, e.g., the controller thereof, identifies an optimal brew time for the selected espresso type by, for example, looking the selected espresso type up in a lookup table stored in the espresso machine's memory that correlates each possible selectable espresso type with a brew time. The values stored in the lookup table are pre-stored in the memory, e.g., during manufacturing, and can be experimentally determined values. For example, the lookup table can indicate 20 seconds brew time for single, 30 seconds brew time for double, and 40 seconds brew time for quad. For another example, the lookup table can indicate 20 seconds brew time for single, 30 seconds brew time for double, and 55 seconds brew time for quad.

The espresso machine 200, e.g., the controller thereof, compares the identified optimal brew time with the plot determined to be closest to the identified 320 brew time and the identified 318 current grind size. If the identified optimal brew time corresponds on the plot to the current selected grind size, then the recommended grind size is determined 324 to be the current grind size. If the identified optimal brew time does not correspond on the plot to the current selected grind size, then the recommended grind size is not determined to be the current grind size and is instead determined 326 to be the grind size corresponding to the identified optimal brew time.

FIG. 5A illustrates one implementation of a graph of grind size versus brew time. In one example, the identified 320 brew time is 50 seconds, the identified 318 current grind size is 2 (e.g., on a fine to coarse scale including at least seven numerical values representing different grind levels), and the identified optimal brew time is 30 seconds since the user selected a double in this example. A bottom curve 332 in FIG. 5A is closest to the identified 320 brew time and the identified 318 current grind size as the bottom curve 322 extends close to grind size 2 (Y axis) and brew time 50 seconds (X axis). The bottom curve 322 indicates that to achieve the optimal brew time of 30 seconds, a grind size of 5 should be used, as shown in FIG. 5B. The espresso machine 200, e.g., the controller thereof, thus determines 326 in this example that the recommended grind size is 5.

Referring again to FIG. 4A, after the espresso machine 200, e.g., the controller thereof, determines 316 the recommended grind size, the espresso machine 200 provides 328 the recommended grind size to the user. The recommended grind size can be provided 328 in one or more ways, such as visually, e.g., by being displayed on the user interface 206, and/or audibly, e.g., announced via a speaker of the espresso machine 200.

Now informed of the recommended grind size, the user decides 330 whether or not to change the current grind size.

If the recommended grind size is the same as the current grind size, the user will typically decide 330 to not change the current grind size. If the recommended grind size is not the same as the current grind size, the user will typically decide 330 to change the current grind size to the recommended grind size, but such a change is at the user's discretion.

After the user decides 330 whether or not to change the current grind size and changes the current grind size if desired, e.g., by moving the wheel 222, the user begins 310 the brewing and dispensing process similar to that discussed above.

In some implementations, such as in the method 300 of FIG. 4A, an espresso machine is configured to allow a user to select whether or not to receive a recommended grind size from the espresso machine. In such implementations, the espresso machine is configured to allow a user to input a grind size, such as by using a grind size adjustment mechanism. Also in such implementations, the user decides whether or not to receive a recommended grind size and, if so, the user decides whether or not to follow the recommendation. The espresso machine may thus provide the user with control that allows the user to make their own decision regarding grind size, which may be desirable for some users, such as users with espresso brewing training and/or significant espresso brewing experience. If recommended grind size is not requested, a time may be reduced between a first user input for a beverage and the beverage being dispensed because the espresso machine does not need to determine a recommended grind size, provide a recommended grind size to a user, or wait for a user to input a start command after being provided the recommended grind size, which may improve overall user experience.

In other implementations, an espresso machine is configured to automatically determine grind size without user input of a grind size. In such implementations, the espresso machine may omit a grind size adjustment mechanism because the espresso machine is configured to automatically select a grind size as part of the brewing and dispensing process. The espresso machine can, however, include a grind size adjustment mechanism to allow for user adjustment of grind size as discussed herein and also include a user-selectable setting for automatic grind size. For example, the espresso machine's user interface can include an "auto grind size" button to request that the espresso machine automatically select a grind size. The "auto grind size" button may be available in addition to a "grind IQ" button to request a recommended grind size. By allowing a user to instruct the espresso machine to automatically select a grind size, a time may be reduced between a first user input for a beverage and the beverage being dispensed because the espresso machine does not need to provide a recommended grind size to a user or wait for a user to input a start command after being provided the recommended grind size, which may improve overall user experience.

FIGS. 6A-6C illustrate another implementation of an espresso machine 400 configured to brew and dispense espresso. The espresso machine 400 in this illustrated implementation is also configured to dispense water, to froth milk (e.g., dairy milk or a non-dairy milk substitute), and to brew and dispense sprover-style drinks. The espresso machine 400 of FIGS. 6A-6C is generally configured and used similar to the espresso machine 200 of FIGS. 3A-3D, and thus similar to the espresso machine 100 of FIG. 1A. Particular elements of the espresso machine 400 of FIGS. 6A-6C are thus not specifically discussed since they are similar to that discussed above regarding the espresso machine 200 except as discussed below.

Figure 6D:
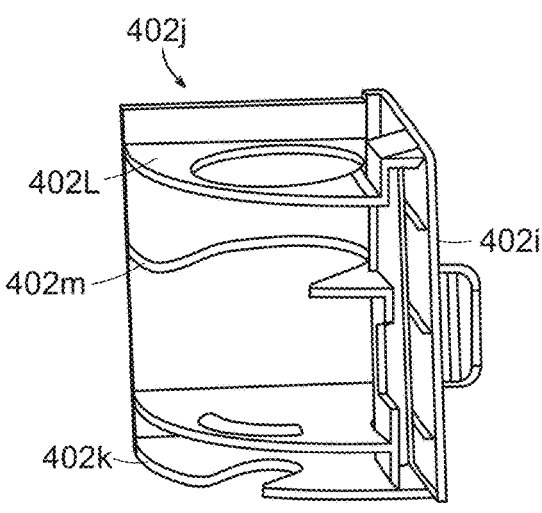
FIG. 6D is a perspective view of a basket storage area of the espresso machine of FIG. 6A.

The espresso machine 400 includes a door 402*i* configured to be opened to allow access to a basket storage area 402*j*, similar to that discussed above regarding the espresso machine 200 of FIGS. 3A-3D. FIG. 6D illustrates the door 402*i* separated from the espresso machine's housing 402 for purposes of illustration. In this illustrated implementation, as shown in FIG. 6A, the door 402*i* is hingedly attached to the housing 402.

FIG. 6D illustrates one implementation of an organization mechanism in the basket storage area 402*j*. The organization mechanism includes a plurality of shelves each configured to hold one of a plurality of baskets similar to the plurality of baskets 219*a*, 219*b*, 219*c* discussed above. A bottom shelf 402*k* is configured to hold the first basket, a top shelf 402L is configured to hold the second basket, and a middle shelf 402*m* is configured to hold the third basket.

In this illustrated implementation, a tamp 420 of the espresso machine 400 is non-removably coupled to the espresso machine 400, and a portafilter 418 of the espresso machine is configured to remain coupled to the espresso machine 400 for tamping. The tamp 420 (see FIG. 6E) is configured to be inserted into the portafilter 418 through an upper opening of the portafilter 418, with or without a funnel removably coupled thereto. A bottom surface 420*b* of the tamp 420 is configured to be pressed down and on coffee grinds in the portafilter 418 to form a puck. The bottom surface 420*b* of the tamp 420 is smooth and solid, which may help form a uniform, compressed puck of coffee grinds.

The tamp 420 includes an upper housing 420*c* and a lower housing 420*d*. The lower housing 420*d* includes the tamp's bottom surface 420*b*. The upper housing 420*c* is movably coupled to the lower housing 420*d*. A spring 420*e* (see FIG. 6G) that is internal to the tamp 420 is operably coupled to the upper and lower housings 420*c*, 420*d* and biases the lower housing 420*d* downward in a direction away from the upper housing 420*c*. The spring 420*e* extends vertically and is coiled around a central post 420*f* of the tamp 420. The lower housing 420*d* includes the central post 420*f*. The central post 420*f* extends upwardly toward the upper housing 420*c*.

The tamp 420 is operably coupled to a tamp handle 421. The tamp handle 421 extends from the housing 402 and is accessible to a user for operating the tamp 420. The tamp handle 421 is configured to be moved by a user to actuate the tamp 420 so the tamp's bottom surface 420*b* contacts and presses down coffee grinds in the portafilter 418. The tamp handle 421 is shown as a lever in this illustrated embodiment but can have another configuration, such as a knob.

Figure 6E:
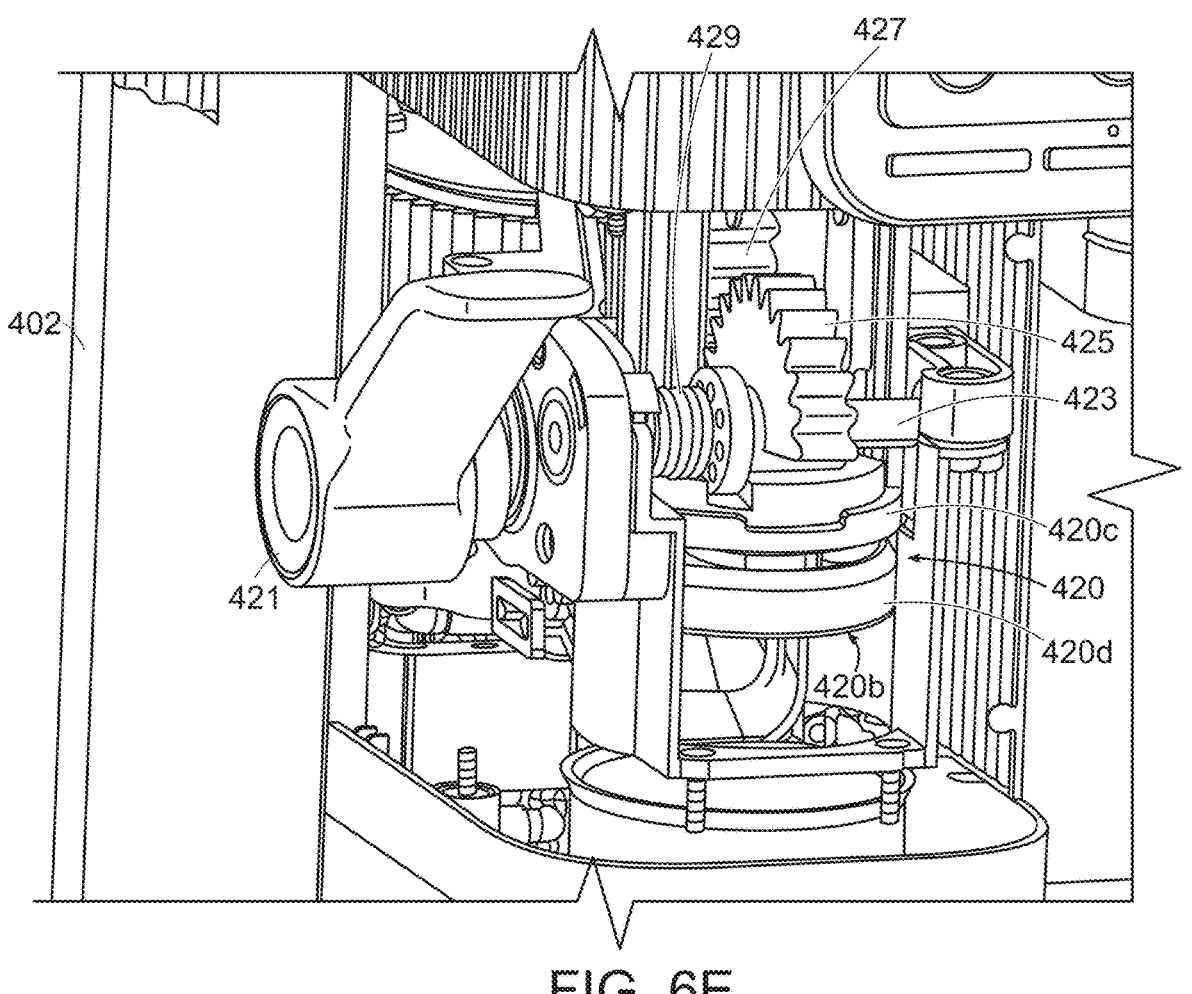
FIG. 6E is a perspective view of a portion of the espresso machine of FIG. 6A.
Figure 6F:
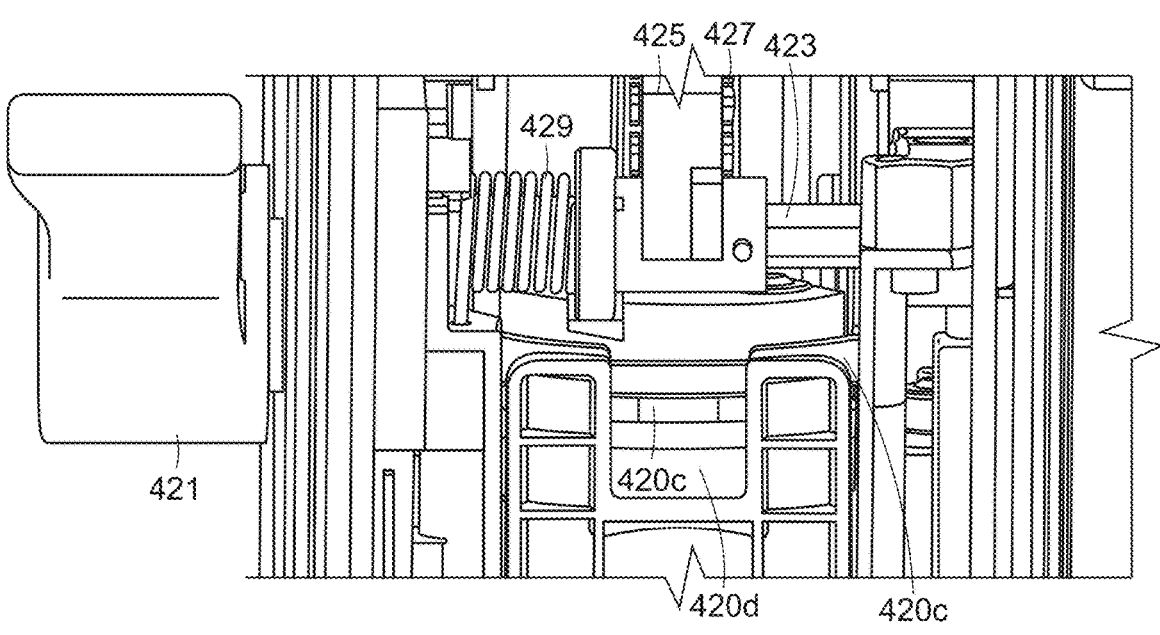
FIG. 6F is a cross-sectional view of a portion of the espresso machine of FIG. 6A.
Figure 6G:
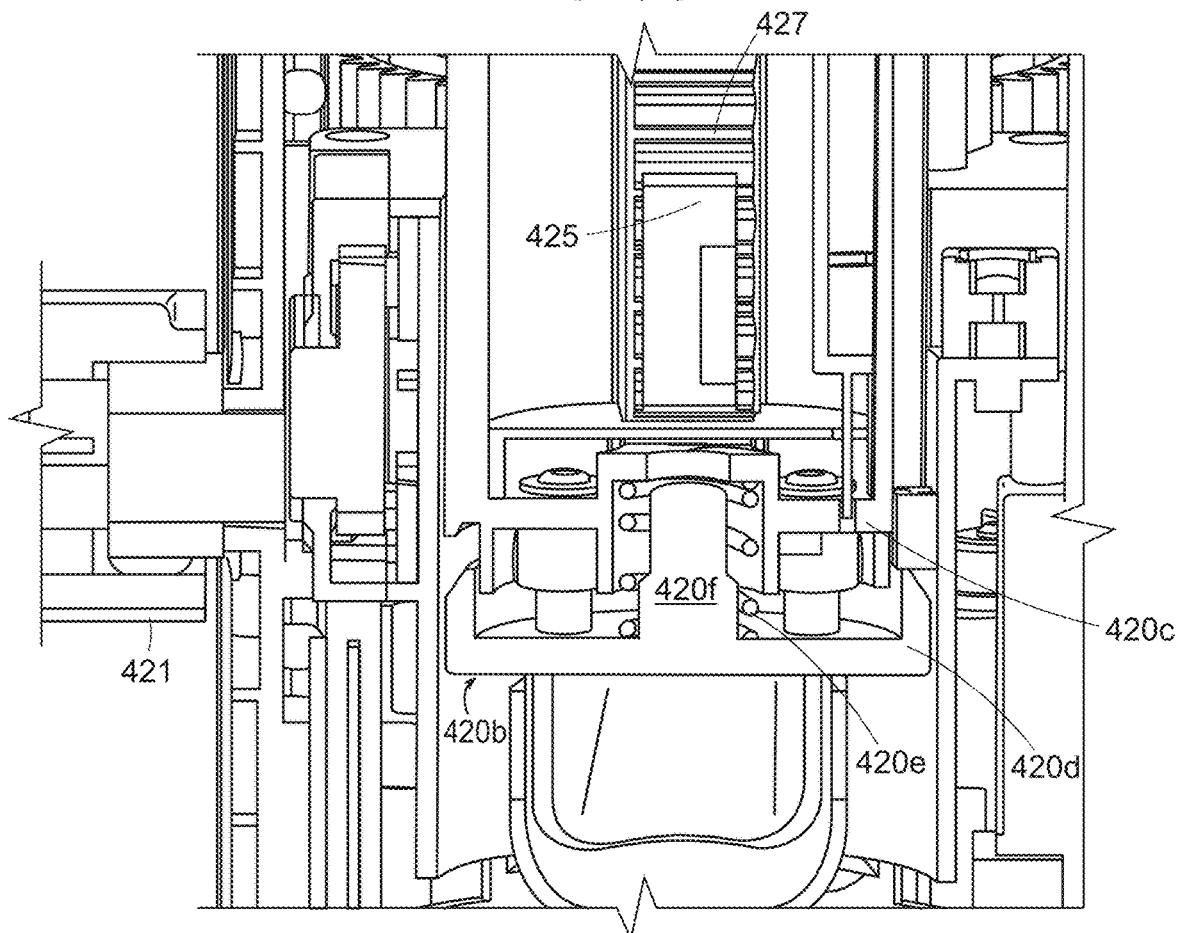
FIG. 6G is another cross-sectional view of a portion of the espresso machine of FIG. 6A.

As shown in FIGS. 6E and 6F, the tamp handle 421 is operably coupled to an elongate shaft 423. The elongate shaft 423 extends horizontally in the housing 402. The elongate shaft 423 is operably coupled with a pinion 425 that is operably engaged with a rack 427, e.g., with teeth of the pinion 425 engaged with teeth of the rack 427. The rack 427 extends vertically in the housing 402. The rack 427 is operably coupled to the tamp 420, e.g., the upper housing 420*c* thereof.

The actuation of the tamp handle 421 is configured to cause the elongate shaft 423 to rotate about a longitudinal axis defined by the elongate shaft 423. The rotation of the elongate shaft 423 is configured to cause the pinion 425 to correspondingly rotate. The rotation of the pinion 425 is configured to cause the rack 427 to move vertically, which causes the tamp 420 to correspondingly move vertically. The user's actuation of the tamp handle 421 to cause tamping causes the rack 427 to move downward and thus the tamp 420 to move downward to press down on coffee grounds in the portafilter 418. Initially, both the upper and lower housings 420*c*, 420*d* move downward. As the tamp 420, e.g., the bottom surface 420*d* thereof, begins to press on the coffee grounds, the force overcomes the biasing force of the spring 420*e* to allow the lower housing 420*d* to move upward relative to the upper housing 420*c*. In this way, over-tamping may be prevented, as over-tamping coffee grounds may adversely affect coffee beverage quality.

The tamp handle 421 is configured to be moved manually by a user from a resting or non-tamping position, shown in FIGS. 6A-6C and 6E-6G, to a tamping position, in which the tamp 420 is pressing down on the coffee grounds in the portafilter 418. A spring 429 operably coupled to the tamp handle 421 is configured to automatically return the tamp handle 421 to the resting position from the tamping position. The spring 429 is thus configured as a return spring. The spring 429 extends horizontally and is coiled around the elongate shaft 423, as shown in FIGS. 6E and 6F. The spring 429 is configured to be compressed in response to the elongate shaft 423 being rotated in response to the actuation, e.g., pressing down, of the tamp handle 421. A user's release of the tamp handle 421 removes a force being applied to the tamp handle 421 and thus allows the spring 429 to decompress. The decompression of the spring 429 is configured to cause the elongate shaft 423 to rotate in an opposite direction, which is configured to cause the tamp handle 421 to move toward and return to the resting position. The tamp handle 421 is thus configured to move automatically to the resting position, which may help ensure that the tamp handle 421 is in a ready position for a next tamping operation.

The espresso machine 400 is configured to notify a user when the tamp 420 has moved to the tamping position. The notification is configured to signal the user that tamping has occurred properly and completely and that the tamp handle 421 may be released. Over-tamping may thus be prevented.

Figure 6H:
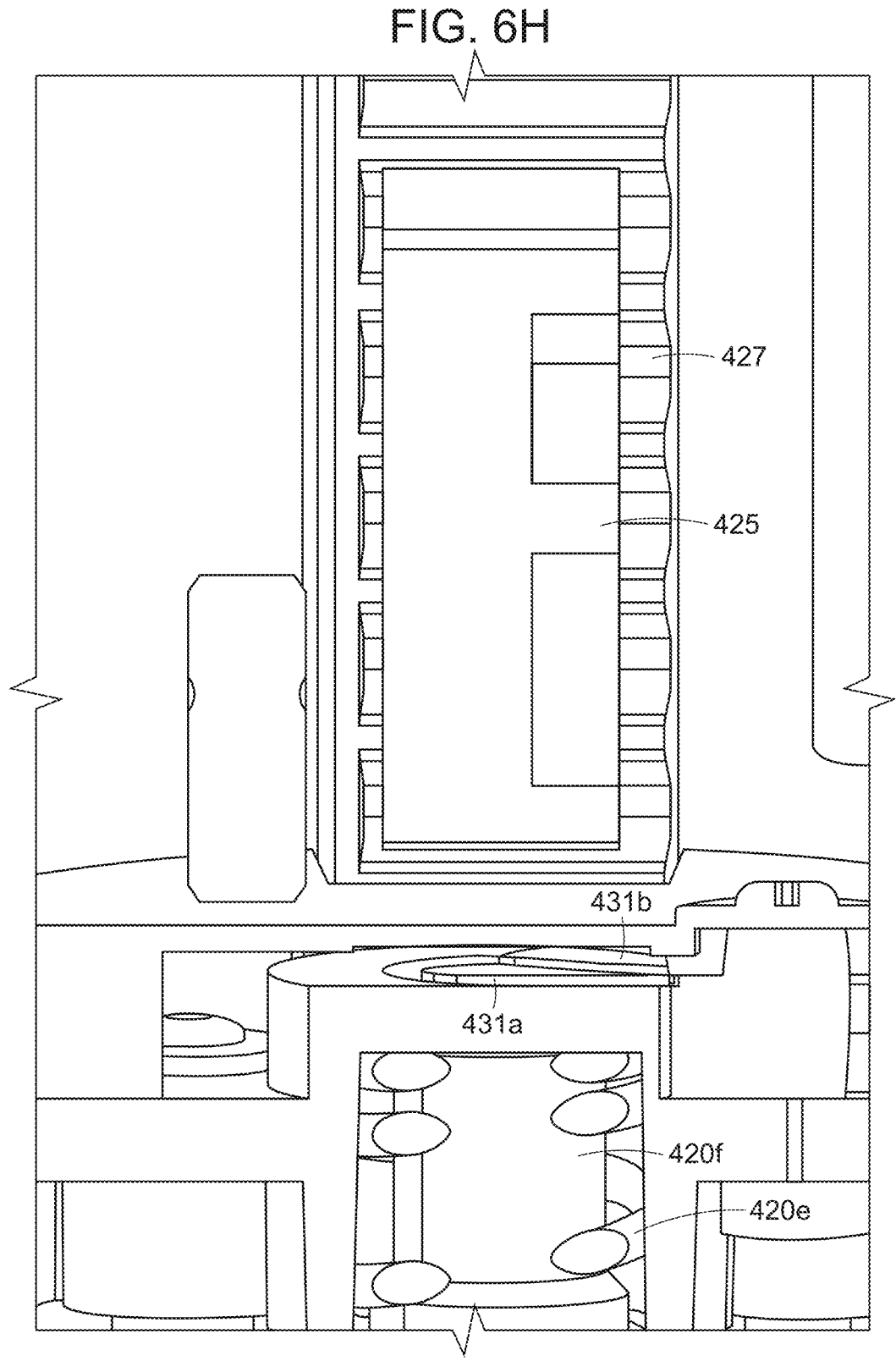
FIG. 6H is yet another cross-sectional view of a portion of the espresso machine of FIG. 6A.

As shown in FIG. 6H, the espresso machine 400 includes first and second electrical contacts 431*a*, 431*b*. The first and second electrical contacts 431*a*, 431*b* are located above the central post 420*f* of the lower housing 420*d*.

With the tamp 420 in the resting position, the central post 420*f* of the lower housing 420*d* does not contact the first and second electrical contacts 431*a*, 431*b*. As the tamp 420 moves from the resting position toward the tamping position, the central post 420*f* of the lower housing 420*d* moves upward toward the first and second electrical contacts 431*a*, 431*b*. When the tamp 420 reaches the tamping position, the central post 420*f*, e.g., an upper surface thereof, contacts the first and second electrical contacts 431*a*, 431*b*, which causes an electrical circuit to be completed. The central post 420*f* is conductive, such as by being formed of a metal or other conductive material, to allow completion of the circuit. The electrical circuit is operably coupled to the espresso machine's controller, e.g., by one or both of the electrical contacts 431*a*, 431*b* being electrically coupled with the controller. The controller is thus configured to receive a signal indicative of the electrical circuit being completed, thereby indicating to the controller that tamping has been completed. In response receiving the signal indicative of the electrical circuit being completed, the controller is configured to cause the notification to be provided to a user. The notification can be audible and/or visual, such as by a beep sounding and/or a light illuminating on a user interface 406 of the espresso machine 400.

FIG. 7A illustrates another implementation of an espresso machine 500 configured to brew and dispense espresso. The espresso machine 500 in this illustrated implementation is also configured to dispense water, to froth milk (e.g., dairy milk or a non-dairy milk substitute), and to brew and dispense sprover-style drinks. The espresso machine 500 of FIG. 7A is generally configured and used similar to the espresso machine 400 of FIGS. 4A-4C, and thus similar to the espresso machine 200 of FIGS. 3A-3D and the espresso machine 100 of FIG. 1A. Particular elements of the espresso machine 500 of FIG. 7A are thus not specifically discussed since they are similar to that discussed above regarding the espresso machine 200 except as discussed below.

Figure 7B:
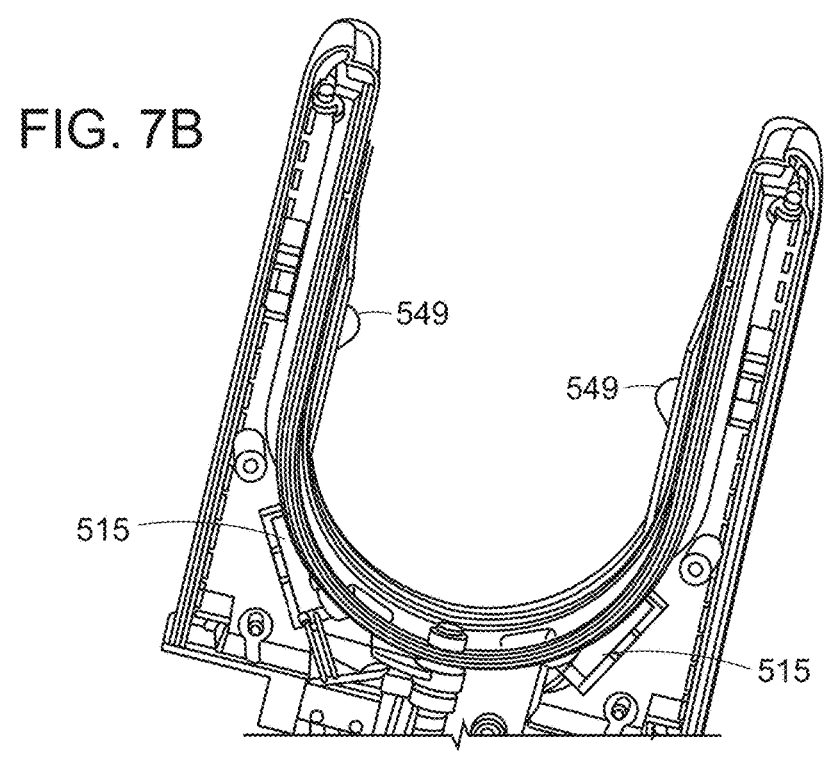
FIG. 7B is a perspective view of a portion of the espresso machine of FIG. 7A.

As shown in FIGS. 7A and 7B, the espresso machine 500 includes a portafilter retention feature 549 configured to help retain a portafilter 518 in a portafilter dock 550. The portafilter retention feature 549 in this illustrated implementation includes a pair of opposed retention fingers extending into a space 550b defined by the portafilter dock 550 (one of the two retention fingers is obscured in the views of FIG. 7A). The retention fingers are resilient members, such as rubber or other material, configured to facilitate gripping and non-slippage of the portafilter 518 relative to the portafilter dock 550. FIG. 7A shows the portafilter 518 removably coupled to a group head 514 of the espresso machine 500. The portafilter 518 and the portafilter dock 550 are discussed further in U.S. patent application Ser. No. 18/652,309 entitled "Beverage Machine Filters And Portafilters" filed on May 1, 2024 [Atty. Dkt. No. 057664-657001US], U.S. patent application Ser. No. 18/652,415 entitled "Beverage Machine Portafilters" filed on May 1, 2024 [Atty. Dkt. No. 057664-657002US], and U.S. patent application Ser. No. 18/652,514 entitled "Coffee Tamping" filed on May 1, 2024 [Atty. Dkt. No. 057664-657003US], which are hereby incorporated by reference in their entireties.

The portafilter dock 550 in this illustrated implementation also includes railing 550c (see FIG. 7A) extending along the inner surface 550a. The railing 550c is configured to further help retain the portafilter 518 in the portafilter dock 550. In other implementations, the espresso machine 500 includes only one of the railing 550c and the portafilter retention feature 549, or includes neither the railing 550c and the portafilter retention feature 549.

FIG. 7B also shows a reed switch 515 that is generally configured and used similar to the reed switches of the espresso machines 200, 400 discussed above in relation to detecting which of a plurality of baskets is seated in a portafilter.

As shown in FIG. 7A, the espresso machine 500 includes a hopper 516 that is generally configured and used similar to the hopper 216 of FIGS. 3R and 3S discussed above. Similar to a hopper 416 of the espresso machine 400 shown in FIGS. 5A-5C, the hopper 516 extends above a top surface of a housing 502 of the espresso machine 500, as shown in FIG. 7A.

Figure 7C:
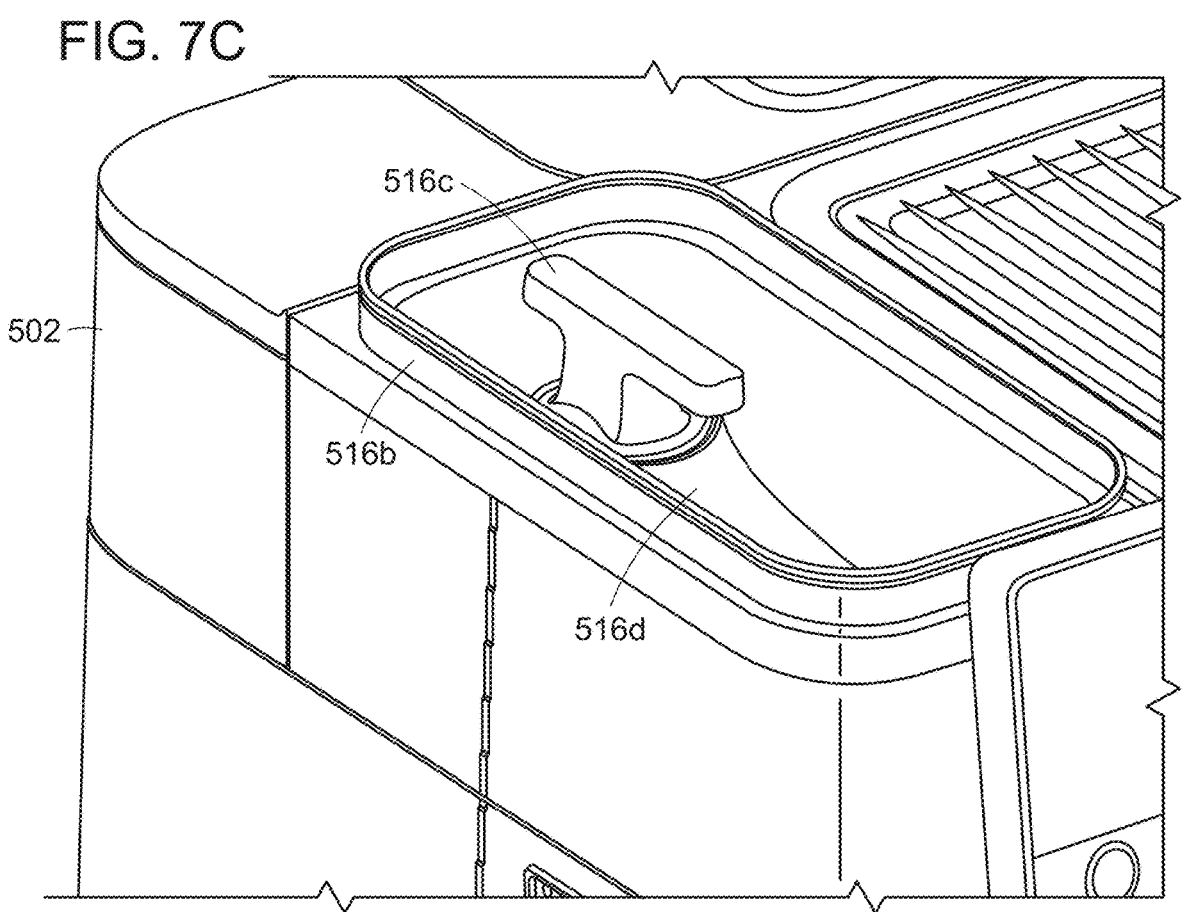
FIG. 7C is a perspective view of a portion of the espresso machine of FIG. 7A with a lid of a hopper removed.
Figure 7D:
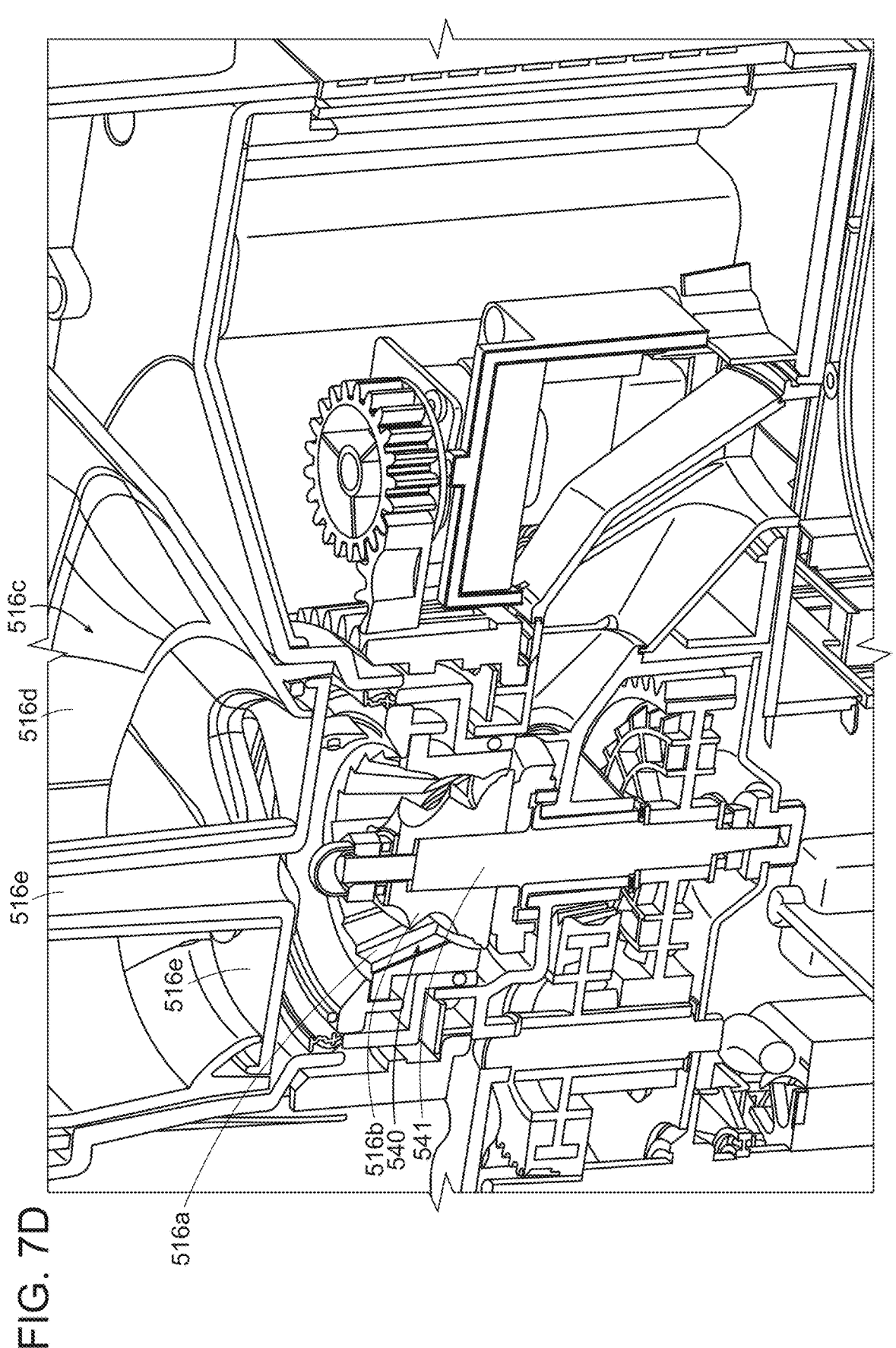
FIG. 7D is a cross-sectional view of a portion of the espresso machine of FIG. 7A.
Figure 7E:
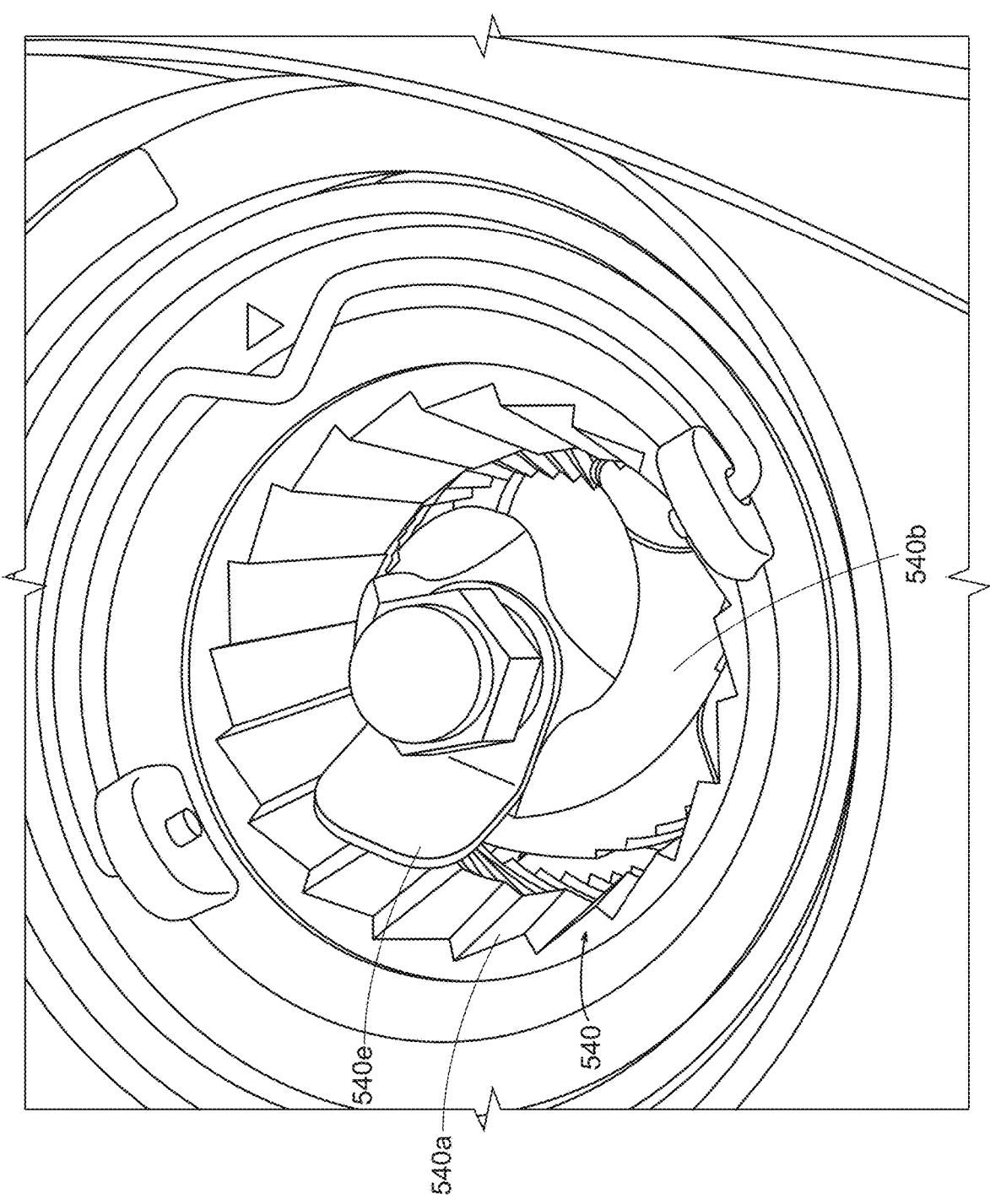
FIG. 7E is another perspective view of a portion of the espresso machine of FIG. 7A.

As shown in FIGS. 7A, 7C, and 7D, in this illustrated implementation, the hopper 516 includes a lid 516a, a main body 516b, a cavity 516c, a funnel portion 516d, a rotor 516e, and a locking handle 516f. Similar to that discussed above, when the rotor 516e is in the open position, coffee beans in the hopper 516 are allowed to pass through the funnel opening into a grinder 540 of the espresso machine 500 (see FIGS. 7D and 7E), and when the rotor 516e is in the closed position, coffee beans in the hopper 516 are prevented from passing through the funnel opening into the grinder 540.

The grinder 540 in this illustrated implementation includes an agitator 540e (see FIG. 7E) configured to agitate coffee beans in the grinder 540 during the grinding process. With the rotor 216e open, it is possible in some circumstances, e.g., due to coffee bean size, number and/or orientation of coffee beans falling into the grinder 540, and/or other factor(s), for coffee beans to build up or be in a logjam in the grinder 540 under the aligned openings through which the coffee beans fall into the grinder 540. The build up or logjam of coffee beans may hinder effective grinding because at least some coffee beans may not be properly positioned relative to the grinder's outer and inner burrs 540a, 540b to be ground between the outer and inner burrs 540a, 540b. The agitator 540e is configured to help disperse the coffee beans in the grinder 540 to break up any such build up or logjam of coffee beans in the grinder 540.

The agitator 540e is operably coupled to the inner burr 540b in a fixed position relative thereto. In this illustrated implementation, the agitator 540e is operably coupled to the inner burr 540b by being attached to a shaft 541 (see FIG. 7D) disposed in and in a fixed position with respect to the inner burr 540b similar to the shaft 241 of FIG. 3U that is disposed in and in a fixed position with respect to the inner burr 240b.

The inner burr 540b (and the shaft 541 to which the inner burr 540b is attached) is configured to rotate relative to the outer burr 540a, as discussed above. The agitator 540e is thus configured to rotate with the inner burr 540b (and the shaft 541) relative to the outer burr 540a.

The agitator 540e can have a variety of configurations. In this illustrated implementation, the agitator 540e includes a rigid member (made of metal and/or other rigid material) in the form of an upwardly extending flap.

Figure 7F:
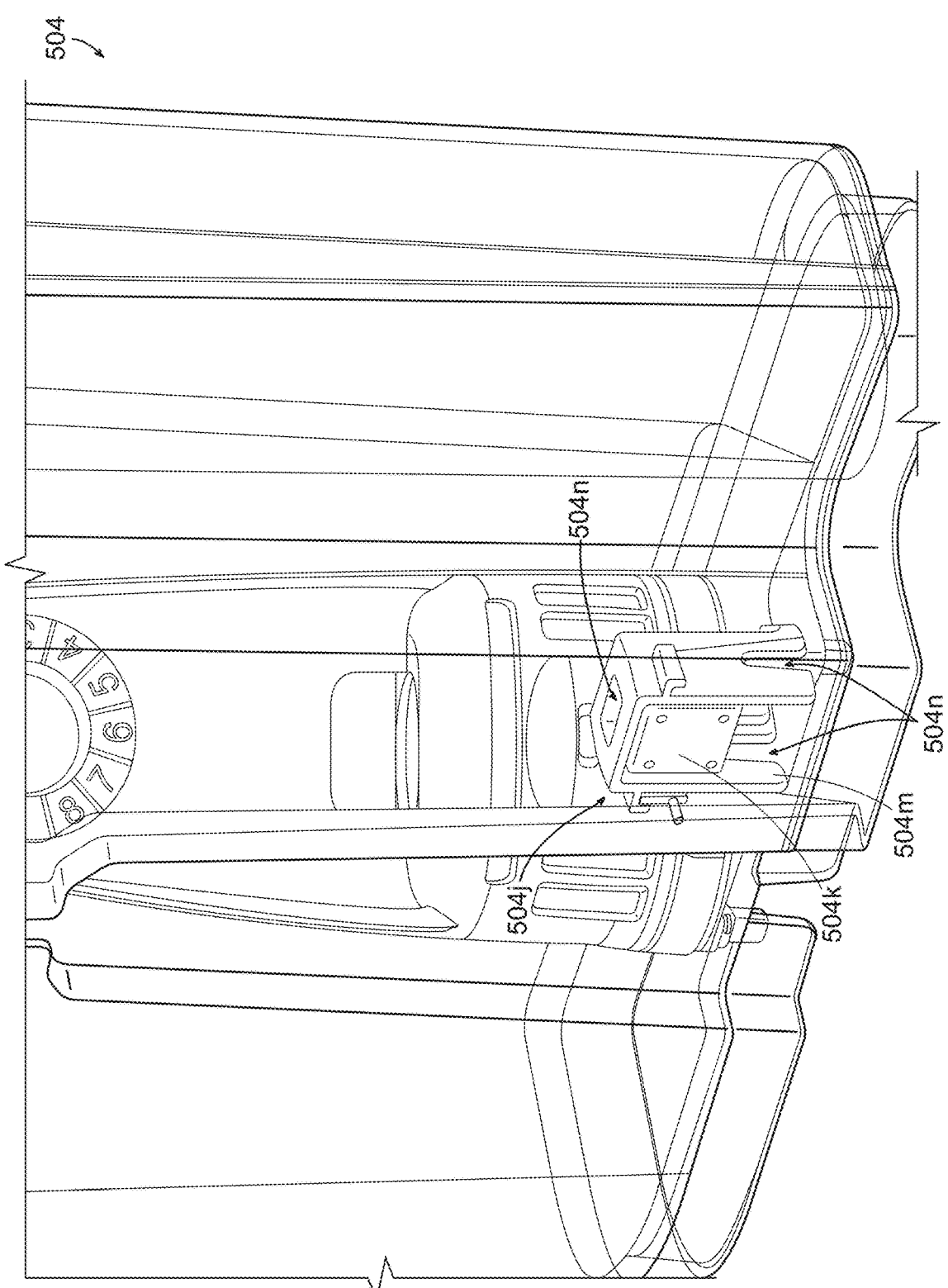
FIG. 7F is a partially transparent view of a portion of a reservoir configured to removably couple to the espresso machine of FIG. 7A.

FIG. 7A also shows a reservoir 504 of the espresso machine 500 removably coupled to the housing 502 of the espresso machine 500. FIG. 7F shows the reservoir 504 as a standalone element. The reservoir 504 in this illustrated implementation includes a liquid level sensor 504j that is generally configured and used similar to the liquid level sensor 204j of FIG. 3H discussed above. The liquid level sensor 504j includes a float 504k including a magnet (obscured in FIG. 7F), a housing 504m having at least one opening 504n therein, and a Hall effect sensor (obscured in FIG. 7F). The housing 504m has three openings 504n in this illustrated implementation but can have another number of openings 504n, and the opening(s) 504n can be in locations other than those shown in FIG. 7F on a top and on opposed sides of the housing 504m.

Figure 7G:
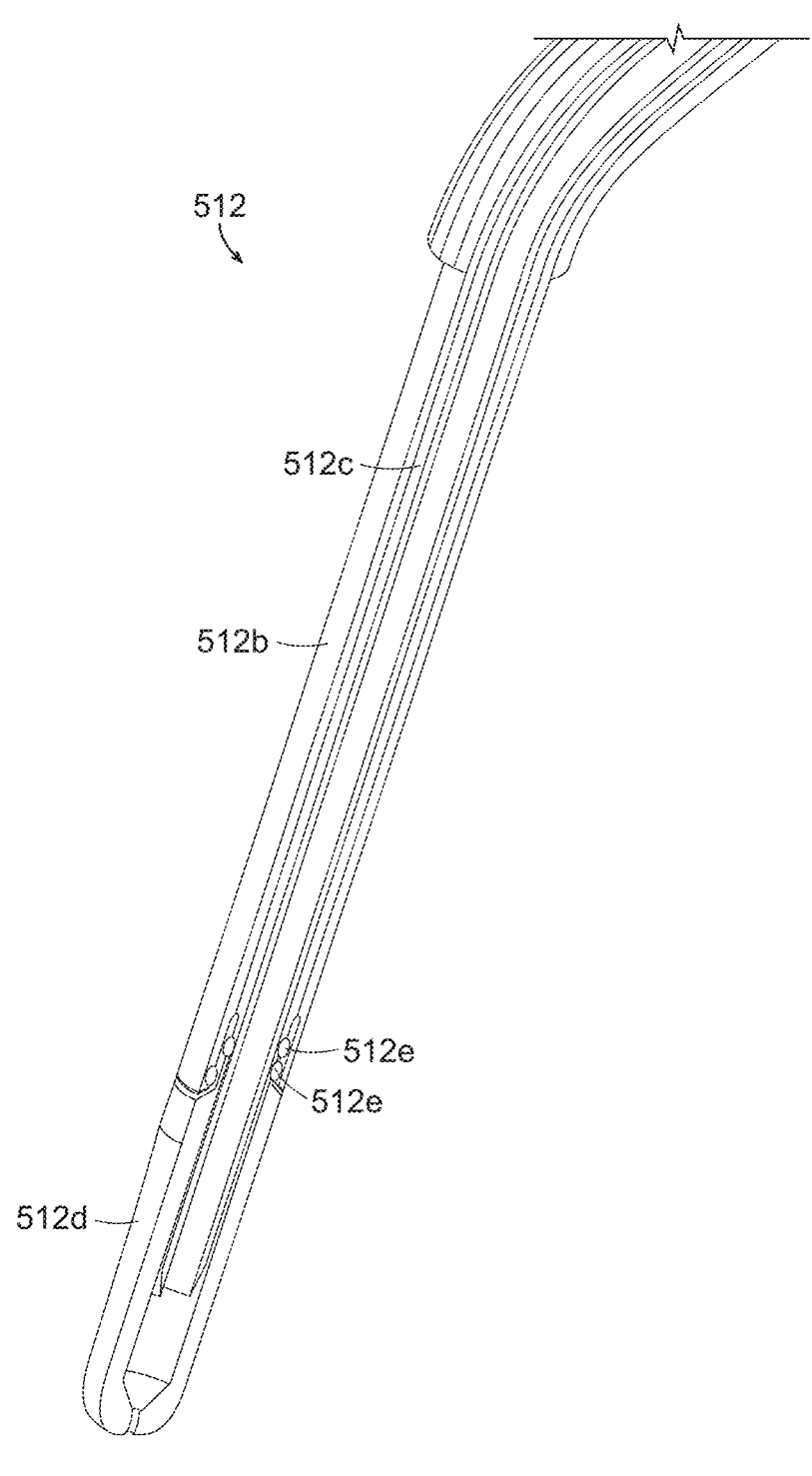
FIG. 7G is a cross-sectional view of a portion of a steam frother arm of the espresso machine of FIG. 7A.

FIGS. 7A and 7G show a steam frother arm 512 of the espresso machine 500 that is generally configured and used similar to the stream frother arm 212 of FIG. 3A discussed above. As shown in FIG. 7G, the steam frother arm 512 includes an outer tube 512b and an inner tube 512c disposed coaxially within the outer tube 512b. Fluid flows in the steam frother arm 512 in a passageway of the inner tube 516c and thus within a passageway of the outer tube 512b in which the inner tube 512c is disposed.

The outer tube 512b is a metal (e.g., stainless steel or other metal), conductive tube. The outer tube 512b being metal may help the steam frother arm 512 be easy to clean externally by a user and/or help the steam frother arm 512 retain its shape. The inner tube 512c is a polymer (e.g., polytetrafluoroethylene (e.g., Teflon™) or other polymer), non-conductive tube. The inner tube 512c may help prevent the outer tube 512b from becoming too hot for a user to touch, especially during longer froth processes, and/or may help prevent internal wear of the steam frother arm 512 due to repeated use since the polymer of the inner tube 512c is more resistant to such wear that the metal of the outer tube 512b. In an exemplary implementation, an air gap is present between the outer and inner tubes 512b, 512c, which may help prevent heat transfer from the inner tube 512c to the outer tube 512b.

The steam frother arm 512 includes an exit opening that is obscured in the figures. The exit opening is formed in a tip 512d of the steam frother arm 512. The tip 512d can be removably coupled to the outer and inner tubes 512b, 512c, which may facilitate cleaning of the tip 512d. Alternatively, the tip 512d can be non-removably coupled to the outer and inner tubes 512b, 512c, which may help prevent loss of and/or damage to the tip 512d.

The steam frother arm 512 includes one or more seals 512e between the tip 512d and the outer tube 512b to help prevent any steam leaks from the steam frother arm 512 and to help prevent any unintentional fluid ingress into the outer tube 512b. The steam frother arm 512 also includes one or more seals 512e between the tip 512d and the inner tube 512c to help prevent any steam leaks from the steam frother arm 512 and to help prevent any unintentional fluid ingress into the inner tube 512c. The seals 512e are each an o-ring in this illustrated implementation, but other types of seals may be used.

The stream frother arms of the espresso machines 200, 400 of FIGS. 3A and 6A each include a metal, conductive tube that is generally configured and used similar to the outer tube 512b of FIG. 7G but does not have an inner tube disposed therein, which may help ease the manufacturing process and/or may reduce cost. However, the stream frother arms of the espresso machines 200, 400 of FIGS. 3A and 6A can include such an inner tube.

The espresso machine 500 includes a drip tray fill level indicator configured to indicate a fill level of the espresso machine's drip tray 508, e.g., a fill level within a cavity 508c defined by a base 508a of the drip tray 508. A user may therefore be visually signaled by the espresso machine 500 when emptying the drip tray 508 is advisable so the drip tray 508 does not become completely full or overflow. Drip trays of other beverage machines described herein can similarly include a drip tray fill level indicator.

Figure 7H:
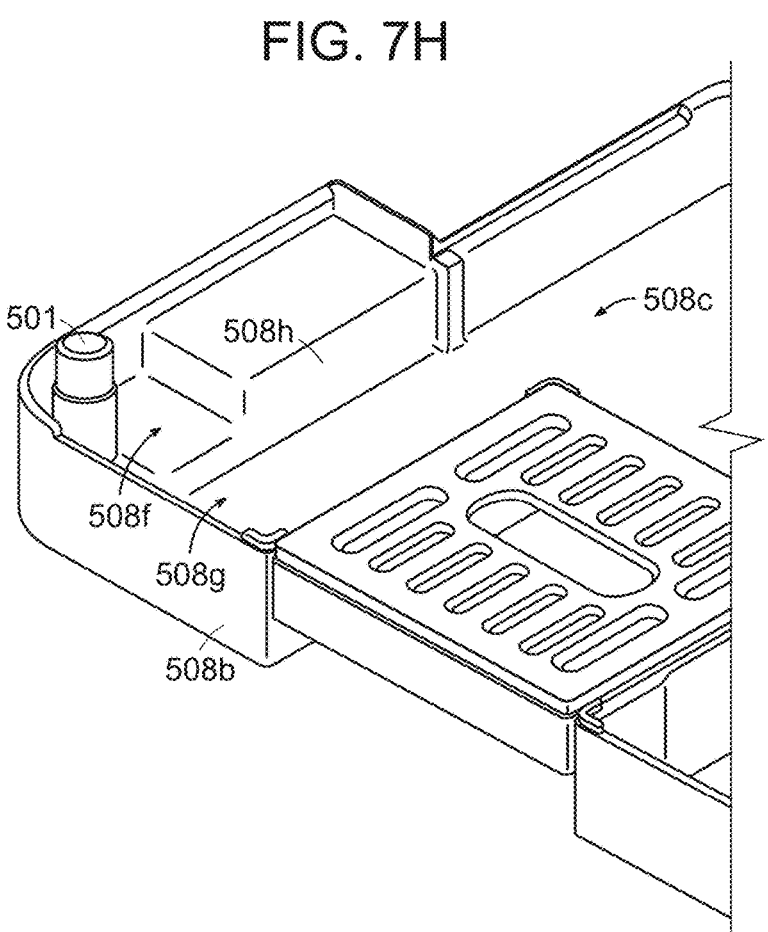
FIG. 7H is a perspective view of a portion of a drip tray configured to removably couple to the espresso machine of FIG. 7A.

As shown in FIGS. 7A and 7H, the drip tray fill level indicator in this illustrated implementation includes a pin 501 movably coupled to the drip tray 508. The pin 501 is configured to float in liquid, such as by being a hollow, polymer member. A height of the pin 501 relative to the drip tray 508, e.g., how much the pin 501 extends vertically above a top surface of a lid 508b of the drip tray 508, is configured to show the fill level of the drip tray 508. The higher the pin 501 relative to the drip tray 508, the more full the drip tray 508. In other words, the more the pin 501 extends vertically above the top surface of a lid 508b of the drip tray 508, the more full the drip tray 508. With the drip tray 508 empty, the pin 501 is at its lowest vertical level. With the drip tray 508 full, the pin 501 is at its highest vertical level.

The pin 501 in the illustrated implementation is configured to rise gradually as the drip tray's fill level increases. In another implementation, the pin 501 is configured to rise abruptly to indicate that the drip tray 508 has reached a threshold fill level. A user may be more likely to notice an abruptly risen pin 501 than a gradually rising pin 501 and thus be more likely to empty the drip tray 508 before the drip tray 508 becomes completely full or overflows. For example, in such an implementation, a first portion 508f within the cavity 508c is walled off by a wall from a second, adjacent portion 508g of the cavity 508c. For example, an internal wall 508h of the drip tray 508 can be extended in a forward direction to wall the first portion 508f off from the second portion 508g.

The first and second portions 508f, 508g of the cavity 508c are in communication with one another. When the second portion 508g of the cavity 508c becomes full enough with liquid to reach a top of the wall walling the second portion 508g of the cavity 508c from the first portion 508f of the cavity 508c, the wall can no longer prevent the liquid from entering the first portion 508f from the second portion 508g. The liquid spills over the wall to enter the first portion 508f from the second portion 508g. The pin 501 therefore rises to indicate that the drip tray 508 has reached a threshold fill level.

The pin 501, whether configured to rise gradually or abruptly, is a mechanical drip tray fill level indicator. Instead of or in addition to a mechanical drip tray fill level indicator, the drip tray 508 (or other drip tray described herein) can include an electrical drip tray fill level indicator. The electrical drip tray fill level indicator is operably coupled with the espresso machine's controller. The controller is configured to, based on a signal received from the electrical drip tray fill level indicator, cause a drip tray fill level alert to a user, such as by a light, text, an audible sound, etc. provided via the espresso machine's user interface 506.

Figure 7I:
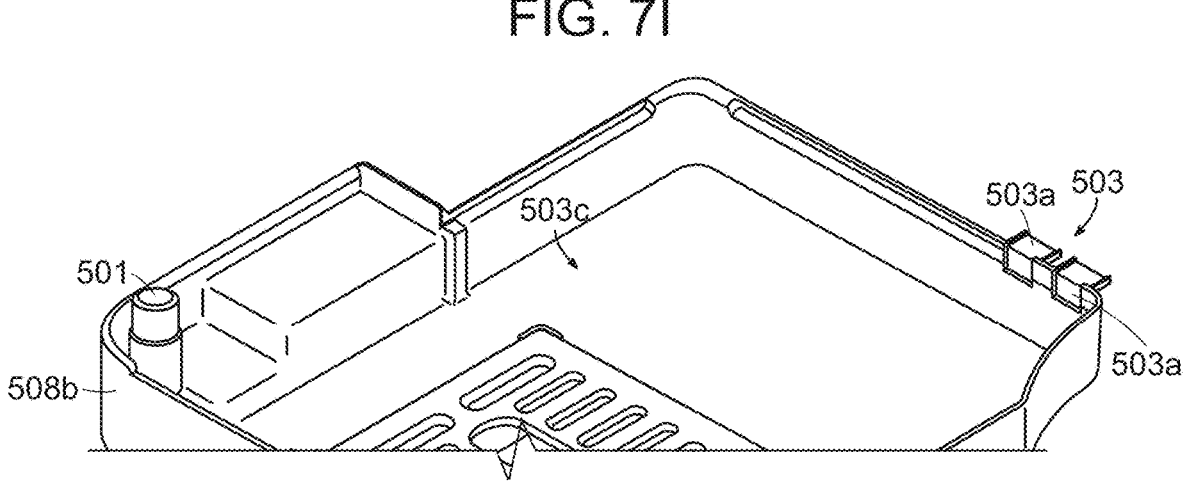
FIG. 7I is a perspective view of another portion of the drip tray of FIG. 7H.

FIG. 7I illustrates one implementation of an electrical drip tray fill level indicator 503. The electrical drip tray fill level indicator 503 in this illustrated implementation includes a pair of electrical contacts 503a, such as copper contacts or other conductive contacts. The pair of electrical contacts 503a are coupled to the drip tray 508 at a top of the drip tray's base 508b and in communication with the drip tray's cavity 508c. When the cavity 508c is empty, the pair of electrical contacts 503a are not in electrical communication with one another. When enough liquid fills the cavity 508c to reach a level of the pair of electrical contacts 503a, the liquid bridges the pair of electrical contacts 503a so the pair of electrical contacts 503a become in electrical communication with one another to complete a circuit including the controller. The controller thus receives a signal in response to the drip tray 508 being filled to a predetermined level defined by a location of the pair of electrical contacts 503a relative to the cavity 508c of the drip tray 508 in which liquid is collected.

Figure 8:
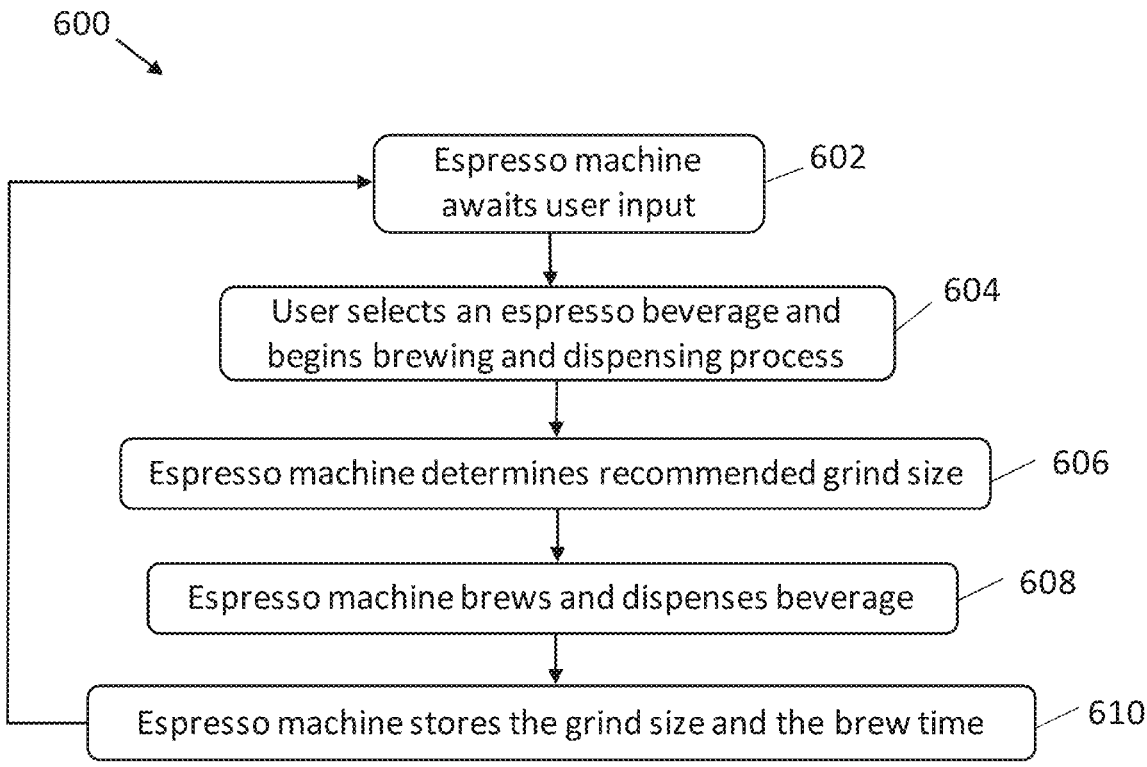
FIG. 8 is a flowchart of one implementation of a method of using an espresso machine configured to determine a grind size for grinding of coffee beans by a grinder of the espresso machine.

FIG. 8 illustrates one implementation of a method 600 of using an espresso machine configured to automatically determine grind size without user input of a grind size. The method 600 is described with respect to the espresso machine 200 of FIGS. 3A-3D for ease of explanation but can be similarly performed with respect to another espresso machine (e.g., the espresso machine 100 of FIG. 1A, the espresso machine 400 of FIGS. 6A-6C, the espresso machine 500 of FIG. 7A, or other espresso machine).

The method 600 includes the espresso machine 200 awaiting 602 user input that is input to the espresso machine 200 via the espresso machine's user interface 206, similar to that discussed above regarding FIG. 4A. Also similar to that discussed above, user input to the espresso machine 200 includes a user selecting 604 an espresso beverage (which may be an espresso or a sprover-style drink) and beginning 604 the brewing and dispensing process. The espresso machine 200, e.g., the controller thereof, determines 606 a recommended grind size similar to that discussed above regarding FIGS. 4A and 4B except that a current grind size is not selectable with the wheel 222 (which may be omitted in this implementation) but is indicated by a current setting of the grinder 240 as indicated by the encoder 244. The espresso machine 200 then brews and dispenses 608 the selected espresso beverage in accordance with the automatically determined 606 grind size and the user's selected 604 beverage. Before the espresso is dispensed 608 to a cup or other container via the group head 214, the user uses the portafilter 218 and the tamp 220 as discussed above. The espresso machine 200 stores 610, e.g., in the memory of the espresso machine 200, the grind size used in brewing 608 the selected espresso beverage as well a time length of the brewing 608. The espresso machine 200 is configured to use the stored 610 grind size and brew time length in subsequent determinations of recommended grind sizes, as discussed herein.

Various implementations of beverage machines are further described in, for example, U.S. patent application Ser. No. 18/651,936 entitled "Milk Frothing" filed on May 1, 2024 [Atty. Dkt. No. 057664-654001US], U.S. patent application Ser. No. 18/651,970 entitled "Preventing Coffee Bean Grinder Jamming" filed on May 1, 2024 [Atty. Dkt. No. 057664-655001US], U.S. patent application Ser. No. 18/652,309 entitled "Beverage Machine Filters And Portafilters" filed on May 1, 2024 [Atty. Dkt. No. 057664-657001US], U.S. patent application Ser. No. 18/652,415 entitled "Beverage Machine Portafilters" filed on May 1, 2024 [Atty. Dkt. No. 057664-657002US], U.S. patent application Ser. No. 18/652,514 entitled "Coffee Tamping" filed on May 1, 2024 [Atty. Dkt. No. 057664-657003US], U.S. patent application Ser. No. 18/652,049 entitled "Descaling Beverage Machines" filed on May 1, 2024 [Atty. Dkt. No. 057664-659001US], and U.S. patent application Ser. No. 18/652,063 entitled "Preparation Of Beverage Machines For Cold Beverage Brewing" filed on May 1, 2024 [Atty. Dkt. No. 057664-680001US], which are hereby incorporated by reference in their entireties.

The subject matter described herein can be implemented in analog electronic circuitry, digital electronic circuitry, and/or in computer software, firmware, or hardware, including the structural means disclosed in this specification and structural equivalents thereof or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, algorithm, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code).

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices). The processor and the memory can be supplemented by, or incorporated in, special purpose logic circuitry.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor-readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor). The modules described herein can be combined, integrated, separated, and/or duplicated to support various applications. Also, a function described herein as being performed at a particular module can be performed at one or more other modules and/or by one or more other devices instead of or in addition to the function performed at the particular module.

One skilled in the art will appreciate further features and advantages of the devices, systems, and methods based on the above-described embodiments. Accordingly, this disclosure is not to be limited by what has been particularly shown and described, except as indicated by the appended claims. All publications and references cited herein are expressly incorporated herein by reference in their entirety for all purposes.

The present disclosure has been described above by way of example only within the context of the overall disclosure provided herein. It will be appreciated that modifications within the spirit and scope of the claims may be made without departing from the overall scope of the present disclosure.

What is claimed is:

1. A system, comprising:
   a beverage machine comprising:
      a grinder configured to grind coffee beans,
      a user interface configured to receive a user input selecting a beverage for formation and dispensing from the beverage machine,
      a controller, and
      a memory storing instructions that, when executed by the controller, cause the controller to perform one or more operations comprising:

detecting a portafilter basket size of a portafilter basket seated in a portafilter of the beverage machine;

determining a predetermined optimal brew time for the selected beverage based on the detected portafilter basket size; and determining a recommended grind size of the coffee beans based on the predetermined optimal brew time for the selected beverage and based on a grind size and a brew time for a last beverage formed and dispensed by the beverage machine.

2. The system of claim 1, wherein the one or more operations further comprise providing the recommended grind size to a user via the user interface.

3. The system of claim 2, wherein the user interface is configured to receive a user input requesting a start of the formation and dispensing of the selected beverage; and the recommended grind size is provided via the user interface prior to the receipt of the user input requesting the start of the formation and dispensing of the selected beverage.

4. The system of claim 3, wherein the beverage machine further comprises a grind size adjustment mechanism operatively coupled to the grinder and configured to be manually adjusted by a user to adjust a grind size of coffee beans to be ground by the grinder.

5. The system of claim 4, wherein the grind size adjustment mechanism is configured to be manually adjusted by the user to adjust the grind size of coffee beans after the recommended grind size is provided and prior to a user input requesting the start of the formation and dispensing of the selected beverage.

6. The system of claim 5, wherein the grind size adjustment mechanism includes a rotatable wheel operatively coupled to the grinder.

7. The system of claim 6, wherein the beverage machine further comprises a gear train operatively coupled to the wheel and to the grinder;

the grinder includes a first burr and a second burr defining a space therebetween in which the coffee beans to be ground are configured to be located; and the rotation of the wheel is configured to adjust a size of the space and thereby adjust the grind size.

8. The system of claim 7, wherein the rotation of the wheel is configured to cause rotation of gears of the gear train and thereby cause the first burr to move relative to the second burr.

9. The system of claim 7, wherein the beverage machine further comprises an encoder operatively coupled to the controller and the gear train and configured to transmit a signal to the controller indicating a current grind size setting of the grinder.

10. The system of claim 1, wherein the user interface is configured to receive a user input requesting the recommended grind size; and the determining of the recommended grind size is configured to occur in response to the receipt of the user input requesting the recommended grind size.

11. The system of claim 1, wherein the user interface is configured to receive a user input requesting a start of the formation and dispensing of the selected beverage; and the determining of the recommended grind size is configured to occur automatically in response to the receipt of the user input requesting the start.

12. The system of claim 1, wherein the one or more operations further comprise causing the selected beverage to be formed and dispensed; and storing a grind size and a brew time of the beverage that is formed and dispensed.

13. The system of claim 12, wherein the user interface is configured to receive a second user input selecting a second beverage for formation and dispensing from the beverage machine; and the one or more operations further comprise determining a second recommended grind size of the coffee beans based on a predetermined optimal brew time for the selected second beverage and based on the stored grind size and brew time.

14. The system of claim 1, wherein the one or more operations further comprise causing the selected beverage to be formed and dispensed;

the one or more operations further comprise, prior to the causing of the selected beverage to be formed and dispensed, providing the recommended grind size to a user via the user interface;

the user interface is configured to receive a user input requesting a start of the formation and dispensing of the selected beverage; and the recommended grind size is provided via the user interface prior to the receipt of the user input requesting the start of the formation and dispensing of the selected beverage.

15. The system of claim 14, wherein the beverage machine further comprises a grind size adjustment mechanism operatively coupled to the grinder and configured to be manually adjusted by a user, after the recommended grind size is provided and prior to the user input requesting the start of the formation and dispensing of the selected beverage, to adjust a grind size of coffee beans to be ground by the grinder.

16. The system of claim 1, wherein the beverage machine further comprises a hopper configured to store the coffee beans; and the grinder is configured to receive the coffee beans from the hopper.

17. The system of claim 1, wherein the beverage machine is a coffee machine.

18. The system of claim 1, wherein the beverage machine is an espresso machine.

19. A method, comprising:

detecting a portafilter basket size of a portafilter basket seated in a portafilter of a beverage machine;

determining a predetermined optimal brew time for a selected beverage based on the detected portafilter basket size; and determining a recommended grind size of coffee beans based on the predetermined optimal brew time for a selected beverage and based on a grind size and a brew time for a last beverage formed and dispensed by the beverage machine;

wherein the beverage machine comprises:

a grinder configured to grind the coffee beans, a user interface configured to receive a user input selecting the beverage for formation and dispensing from the beverage machine, a controller, and a memory storing instructions that, when executed by the controller, cause the controller to perform the determining.

20. A system, comprising:

a grinder configured to grind coffee beans;

a controller; and a memory storing instructions that, when executed by the controller, cause the controller to perform one or more operations comprising:

detecting a portafilter basket size of a portafilter basket seated in a portafilter of a beverage machine; 5 determining a predetermined optimal brew time for a beverage selected by a user via a user interface of the beverage machine based on the detected portafilter basket size; and determining a recommended grind size of coffee beans 10 to be ground by a grinder of the beverage machine based on the predetermined optimal brew time for a beverage selected by a user via a user interface of the beverage machine and based on a grind size and a brew time for a last beverage formed and dispensed 15 by the beverage machine.

* * * * *